(12) United States Patent
Bailey et al.

(10) Patent No.: US 7,776,405 B2
(45) Date of Patent: Aug. 17, 2010

(54) ELECTROSPRAY NEUTRALIZATION PROCESS AND APPARATUS FOR GENERATION OF NANO-AEROSOL AND NANO-STRUCTURED MATERIALS

(75) Inventors: Charles L. Bailey, Cross Junction, VA (US); Victor Morozov, Manassas, VA (US); Nikolai N. Vsevolodov, Kensington, MD (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 430 days.

(21) Appl. No.: 11/561,138

(22) Filed: Nov. 17, 2006

(65) Prior Publication Data

US 2007/0113530 A1 May 24, 2007

Related U.S. Application Data

(60) Provisional application No. 60/737,392, filed on Nov. 17, 2005.

(51) Int. Cl.
*B05D 1/04* (2006.01)

(52) U.S. Cl. .................. 427/483; 427/458; 264/10; 264/115

(58) Field of Classification Search ................. 427/483, 427/458
See application file for complete search history.

(56) References Cited

U.S. PATENT DOCUMENTS 6,060,128 A * 5/2000 Kim et al. .................... 427/483
6,764,720 B2 * 7/2004 Pui et al. ..................... 427/479

\* cited by examiner

*Primary Examiner*—Frederick J Parker
(74) *Attorney, Agent, or Firm*—David Grossman; David Yee; Edgar Rodriguez

(57) ABSTRACT

The claimed invention describes methods and apparatuses for manufacturing nano-aerosols and nano-structured materials based on the neutralization of charged electrosprayed products with oppositely charged electrosprayed products. Electrosprayed products include molecular ions, nano-clusters and nano-fibers. Nano-aerosols can be generated when neutralization occurs in the gas phase. Neutralization of electrospan nano-fibers with molecular ions and charged nano-clusters may result in the formation of fibrous aerosols or free nano-mats. Nano-mats can also be produced on a suitable substrate, forming efficient nano-filters.

20 Claims, 45 Drawing Sheets

S110

Electrospray at least one first liquid substance by applying an electrical potential to the first liquid substance, creating a charged electrosprayed product

S115

Electrospray at least one second liquid substance by applying an opposite, electrical potential to the second liquid substance, creating an oppositely charged electrosprayed product and allowing the oppositely charged electrosprayed product to interact with the charged electrosprayed product to produce a neutral product

FIGURE 1

Air in

Positive cloud

Negative cloud

+

−

Aerosol out

FIGURE 4

Air in $I_1$   $I_2$ $P_1$   $P_2$

+   −

Positive cloud

Negative cloud

Metal grid

Aerosol out

FIGURE 8

"Stix-on" diluted 1:3 by acetone, against EtOH on a mesh wetted with a UV-curable glue 400 μm

Neutralization in contact with a conducting substrate in conventional method
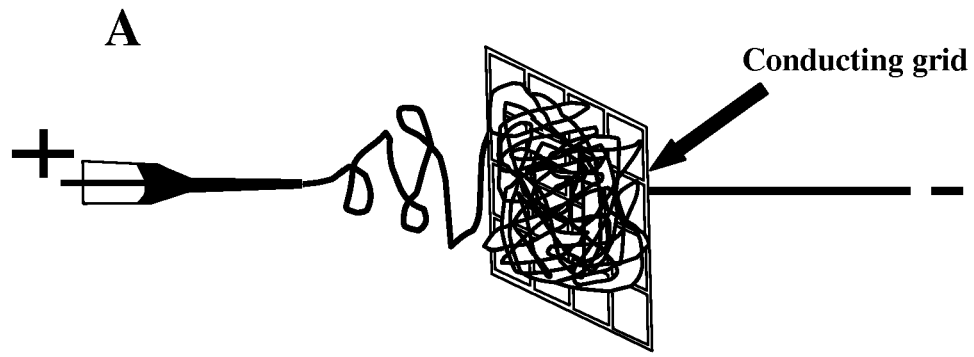
Neutralization with oppositely charged aerosol of counter-ions and clusters in the new method
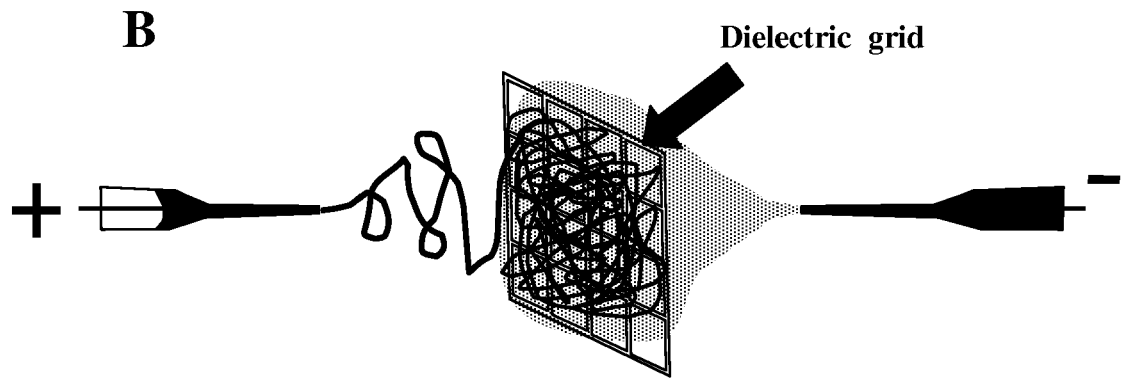
FIGURE 15

Electrostatic force squeezes the mat into a micron-thick film

*I. Manufacturing:*
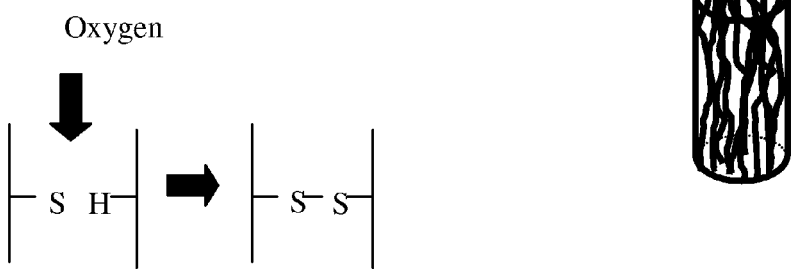
*II. Dissolution:*
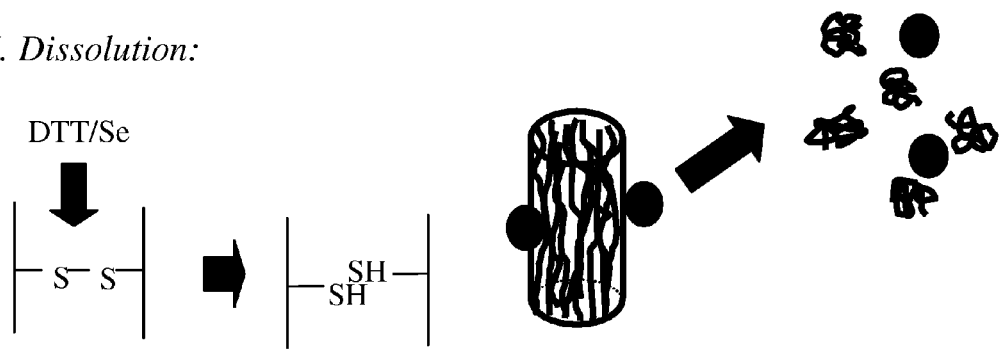
FIGURE 42

ELECTROSPRAY NEUTRALIZATION PROCESS AND APPARATUS FOR GENERATION OF NANO-AEROSOL AND NANO-STRUCTURED MATERIALS

CROSS REFERENCE TO RELATED APPLICATIONS

The present application claims the benefit of provisional patent application Ser. No. 60/737,392 to Morozov et al., filed on Nov. 17, 2005, entitled "Electrospray Neutralization Method and Apparatus for Nano-Aerosol Manufacturing," which is hereby incorporated by reference.

GOVERNMENT LICENSE RIGHTS TO CONTRACTOR-OWNED INVENTIONS MADE UNDER FEDERALLY SPONSORED RESEARCH AND DEVELOPMENT

This invention was made with government support under Grant No. DE-F C52-04NA25455 awarded by the United States Department of Energy. The government has certain rights in the invention.

BRIEF DESCRIPTION OF THE DRAWINGS

FIG. 1 shows an example of a flow diagram for producing nano-aerosols and nano-structured materials.

FIG. 4 shows an example of a nano-aerosol generator.

FIG. 8 shows another example of a nano-aerosol generator with electrode controller.

FIG. 15 shows an example of the formation of a nano-filter by polymer electro-spinning onto a mesh. In the conventional scheme A, charged nano-fibers become neutralized by transfer of charges to a conductive substrate. In the new method (schematized in B) nano-fibers are neutralized by counter-ions (produced in the right capillary).

FIG. 42 shows an example of the manufacture and dissolution of a nano-filter comprising of polymer chains cross-linked via reversible links (disulfide bonds).

DETAILED DESCRIPTION OF THE INVENTION

Figure 2:
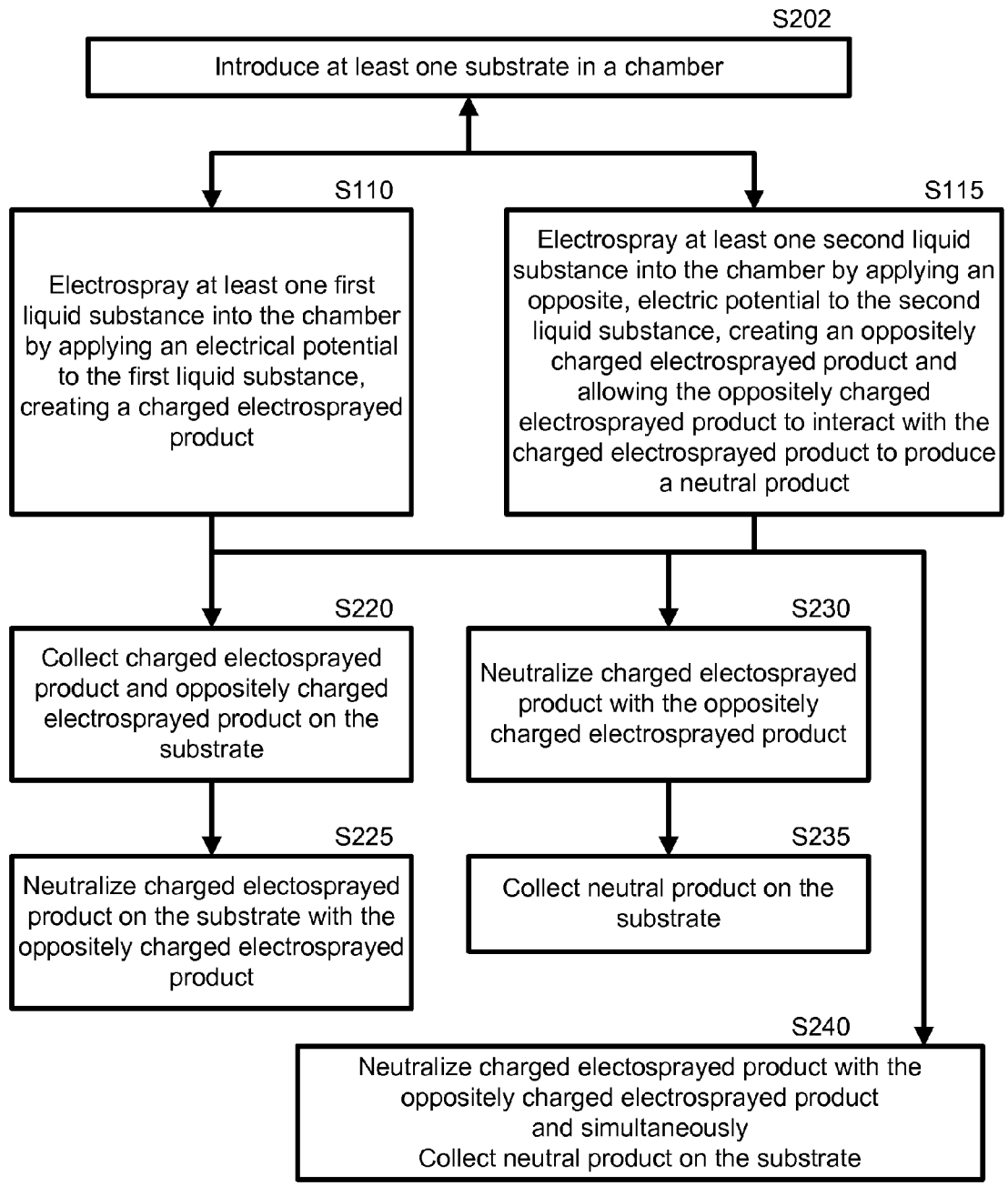
FIG. 2 shows another example of a flow diagram for producing nano-aerosols and nano-structured materials.
Figure 3:
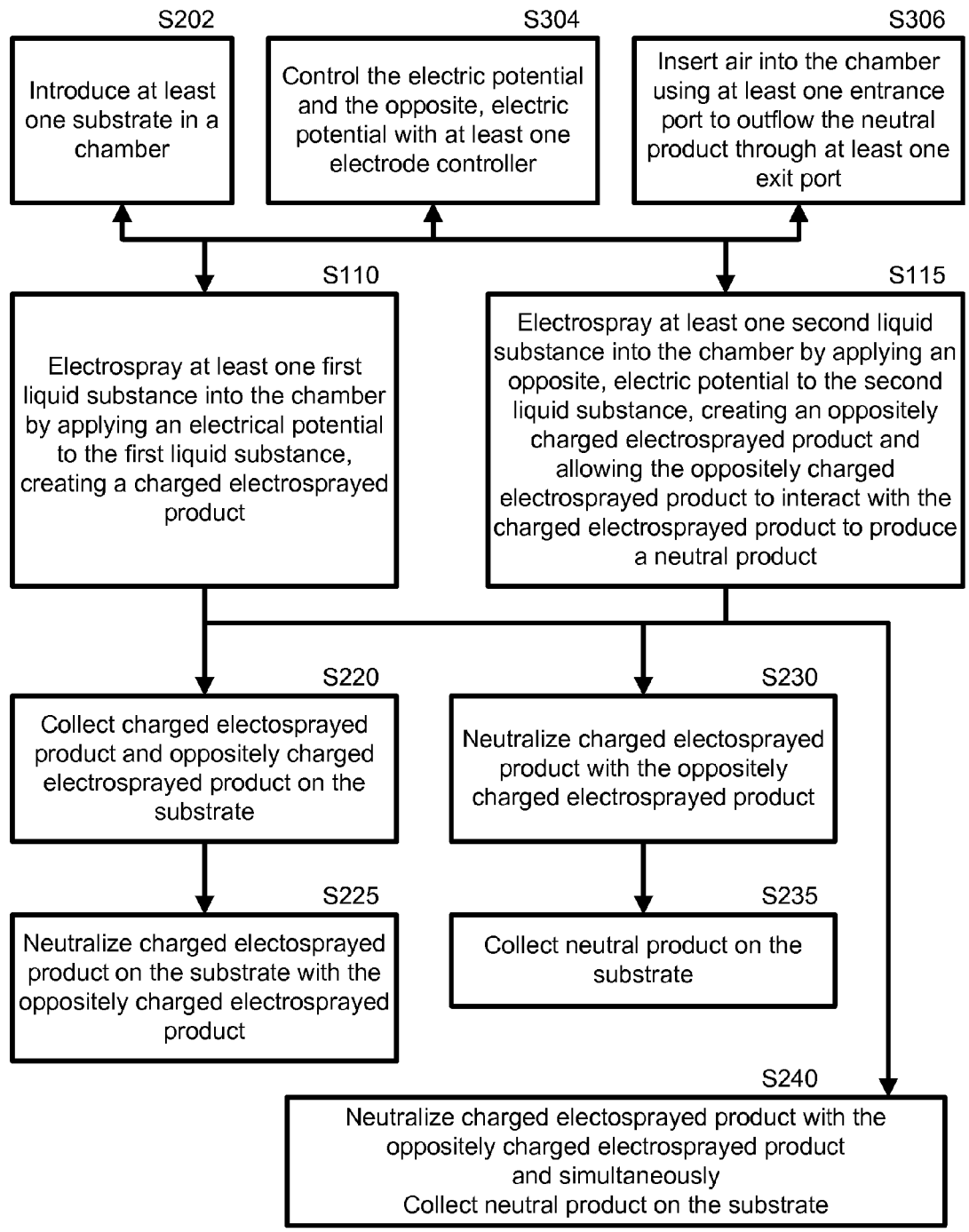
FIG. 3 shows yet another example of a flow diagram for producing nano-aerosols and nano-structured materials.

The claimed invention relates to producing nano-aerosol and nano-structured materials.

Various terms used herein may be defined as follows.

"Aerosol" is a suspension of non-volatile molecules, clusters or particles in a gas phase.

"Binary substances" are two compounds bound into one nano-structure or micro-structure form.

"Electrospinning" is a process in which a polymer solution or a polymer melt is turned into micro- or nano-fibers upon electrospraying. Typically, the polymer should be dissolved in a volatile solvent at a concentration above a certain threshold. This polymer-volatile solvent combination may also contain other components modifying its conductivity, surface tension and/or viscosity.

"Electrospraying" is a process of atomizing a charged liquid in a high electric field, which can be usually realized at a capillary tip having a small diameter.

"Filter" is a device for separating aerosol particles from air and may comprise of a mechanical support (e.g., mesh) and porous sieving layer. The porous sieving layer may comprise of fibers, in which the fibers may be glued to each other and/or to the supportive mesh.

"Nano-aerosol" is aerosol comprising of particles having at least one dimension at a nano-scale. Examples of nano-aerosols include, but are not limited to, solid nano-particles, flakes of nanometer thickness, fibers of nanometer diameter, nano-shells, gas-phase solutions of macromolecules, coated nano-particles, binary nanoparticles, and substances having special surfaces.

"Nano-fiber" is a fiber with a cross-section size in a nanometer scale.

"Nano-filter" is a device comprising of at least one nano-structured material that is 2-dimensionally or 3-dimensionally organized. An example of a "nano-filter" is a filter comprising of a nano-mat and a substrate. The substrate may, for instance, be a mechanical support (e.g., mesh). The nano-filter may be formed by attaching free nano-mats to porous substrates or by forming nano-mats directly on a porous substrate.

"Nano-mat" is a nano-structured material comprising of a plurality of layered nano-fibers.

"Nano-structured materials" is defined as any structured material produced by electrospraying. The material that may be electrosprayed include, but are not limited to, a suspension, solid particle, film, fibers, shells, filters, mats, webs, gas-phase solutions, coated substances, binary substances, and substances having special surfaces. A common feature of the material is that the material may also comprise of a plurality of elements having at least one dimension in a nanometer scale. Nano-particle (3 nano-dimensions), nano-fiber (2 nano-dimensions) and nano-film (1 nano-dimension) are examples of such elements. Examples of nano-structured materials include, but are not limited to, porous materials composed of baked nano-particles, nano-mats and nano-webs composed of a plurality of nano-fibers.

"Nano-webs" is a nano-structured material comprising of a plurality of nano-fibers that are not organized in a layer.

"Perforated sheet" is a thin fabric in which the diameter of each hole exceeds at least the thickness of the sheet.

"Perforated substrate" is a perforated sheet made of fabric-like woven fine wire (e.g., mesh), or plastic material with a plurality of holes in which the diameter of each hole exceeds the thickness of the sheet.

"Surface coating" is a process of depositing at least one surface modifier onto a surface of a substance. Nonlimiting examples of surface modifiers include molecules (e.g., proteins, DNA, RNA, salts, other organic and inorganic molecules), nano-particles, layer(s) of liquid, nano-fibers, molecular nano-aggregates, and non-volatile solvents.

"Surface functionalization" is the process where a substance is coated with a surface modifier for the recognition of analytes (coating with antibody molecules), fluorescence, stickiness (coating with a glue), inhibition of microbial growth (coating with antibiotics) etc.

I. INTRODUCTION

Among the known techniques for manufacturing nano-aerosols, the industrial-scale production condensation method is most widely used. In this method, gas mixture containing vapor of a substance is rapidly cooled to form numerous nano-crystalline particles [Swihart (2003)]. However, this method cannot be applied for manufacturing nano-aerosols from most polymer and biological molecules, as well as for organisms.

Nano-aerosols are usually obtained by drying microdroplets of solutions produced in different types of nebulizers (also referred to as "atomizers") [Hinds (1982)]. Some nebulizers employ compressed air, such as the DeVilbiss model 40 nebulizer. Others use ultrasonic vibrations [Hirabayashi, & De la Mora (1998)] and high pressure to produce microscopic droplets of solution.

An important characteristic of an atomizer is the size and uniformity of microdroplets generated. Mechanical atomizers (e.g., DeVibliss, ultrasonic) can be characterized by a broad range of droplet sizes [O'Callaghan, & Barry (1997)]. One way to obtain highly mono-disperse microdroplets is by using electrospray ("ES") atomization.

The phenomenon of instabilities of a charged liquid has been first described back in 1882 by Lord Rayleigh [Rayleigh (1882)]. When placed into a capillary connected to a high-voltage power supply, liquid may form a cone from which charged microdroplets can be ejected, producing a plume [Zeleny (1914)]. Since the first scientific description of the phenomena, many applications have been described, such as those reviewed by Michelson [Michelson (1990)]. ES deposition was widely used to prepare thin uniform coating surfaces with radioactive isotopes [van der Eijjk et al., (1973)]. Later ES-based generation of macromolecular ions revolutionized mass-spectroscopy of biological molecules [Kebarle & Ho (1997)]. After finding that ES process does not change either the size of deposited molecules [Morozov et al., (1993)], or inactivates, fragile DNA and protein molecules [Morozov & Morozova (1999)], ES deposition process was suggested as a means to manufacture microarrays [Morozov & Morozova (1999), (2002)] and to prepare cross-linked protein films for mechanical testing [Bukatina et al., (2002)].

Concentrated solutions of polymers in good solvents and polymer molts subjected to electrospraying can produce a variety of nano-structures, such as globules, fibers, branched fibers, and "beads-on-string" [Morozov et al., (1998)]. Electrospinning of nano-fibers and nano-tubes has been now described for many polymer materials and their combinations [see rev. of Li & Xia (2004)]. Electrospun polymer materials have demonstrated remarkable efficiency in capturing micron-sized aerosols in air filtration [Gibson & Schreuder-Gibson (2004)]. Electrospun collagen and other biologically relevant polymer materials have been used as a substrate for growing cells [Kwon (2004)]. ES phenomenon has been also used to generate nano-particles and quantum dots [Salata (2005)], as well as monodisperse droplets [De La Mora, et al., (1990)].

Although ES has been used to create monodisperse aerosols [De La More, et al., (1990)], stability of highly charged aerosols created by ES is low. This occurrence is due to aerosols' strong attractions to walls. Recognizing this fact, some authors have attempted to reduce the charging of ES-created aerosols via partial or complete neutralization. In one instance of a commercial ES aerosol generator, neutralization is performed in a special chamber with a radioactive isotope on walls. In another electro-hydrodynamic atomizer for drug solutions [Ijesebaert et al., (2001)], microdroplets of drug solution generated by ES were partially neutralized with small counter ions produced in corona discharge. However, even though these processes have shown in some partial neutralization of aerosol, currents in the atomizer and the neutralizing corona to control neutralization have not been measured independently.

Both these neutralization techniques suffer one obvious limitation when applied to production of biological aerosols. Neutralization is accompanied by exposure to highly reactive products of gas ionization, such as radicals, hot molecules, and atomic oxygen. Being highly reactive these products are capable of breaking covalent bonds and producing deep chemical modification, which may result in inactivation of fragile biological molecules and the killing of cells, spores, and viruses.

Another limitation among known neutralization techniques involves the exclusive use of small counter ions. Aerosol particles are usually completely formed in the ES process itself. Use of large ions, nano-clusters, and microdroplets to neutralize ES products would considerably extend the ability for producing aerosols with a complex structure, which cannot be made by electrospraying alone. The only example of using such approach known to the authors is the "Bipolar Coagulation Process" [Camelot et al., (1999)]. In this process, two oppositely charged clouds of microdroplets generated by ES were allowed to neutralize each other. Rapid mixing of the droplet contents after coalescence precipitates solid products, which then turns into solid particles upon further drying. It should be emphasized that the final product may be formed as a result of a reaction in collided droplets, which cannot be atomized directly due its insolubility. As advantages of the process, the authors pronounce that monodisperse droplets produced a homogeneous powder, and that the powder was compressed into spherical particles by surface tension.

The authors also envisaged another application of their technology, such as formation of solid microparticles by colliding droplets containing a monomer solution with droplets containing polymerization inductors. Covering solution droplets with polymer microparticles accompanied by drying the solution and forming coated solid microparticles may serve as another possible application.

It is evident that the prior art considers processes of coagulation of primary microdroplets formed in ES as a primary process. It does not separate reaction (e.g., coagulation) from neutralization. Furthermore, it does not contemplate using collisions and interactions between highly dispersed final products of electrospraying, such as small ions, macromolecular ions, and dry charged nano-clusters. Moreover, the prior art does not consider any applications connected with either the formation of biological aerosols or biological applications of such aerosols.

II. GENERATION OF NANO-AEROSOL AND NANO-STRUCTURED MATERIALS

Referring to FIGS. 1-4, 8, 14-17, 41-45, liquid substances may be charged and electrosprayed. These electrosprayed products may be neutralized with oppositely charged, electrosprayed products of other liquid substances to produce nano-aerosol and nano-structured materials. Products of electrosprayed liquid substances may include counter-ions, nano-clusters, nano-droplets and other electrosprayed substances. When neutralization occurs in gas phase, a variety of air-suspended neutral or weakly charged species may be produced. These include non-volatile molecules and macromolecules, solid nano-clusters, nano-shells, nano-fibers, nano-mats, as well as nano- and micro-droplets of non-volatile liquids. When neutralization happens on a substrate (e.g., mesh or plastic sheet), a film of a nano-structured material may be produced. Such material may be used as a filter, scaffold, surface coating, etc.

A plurality of conditions for electrospraying may exist. One, a non-volatile substance is often necessary. Two, the polymer concentration needs to be high enough. Three, solvents should be slightly conductive. By meeting such conditions, it is possible to generate aerosol, nano-aerosol and other nano- and/or micro-structural materials.

Referring to FIGS. 1-4, 7 and 8, one or more first liquid substances may be electrosprayed S110. First liquid substances may include a non-volatile substance, such as proteins, polysaccharides, DNA, RNA, synthetic polymers, salts, drugs, and other organic or inorganic molecules. Alternatively, the first liquid substances may also be a melted substance. Because first liquid substance may include solid particles, it should be evident that first liquid substances need not necessarily be in a pure liquid form. To electrospray first liquid substances, an electrical potential may be applied. Such application may generate a charged electrosprayed product. The charged electrosprayed product may be in a plurality of forms, including charged molecules, macromolecules, nano-clusters, charged fiber or nano-fiber, nano-structured materials, etc.

Likewise, one or more second liquid substances may be electrosprayed S115. Second liquid substances may be a volatile (e.g., pure) solvent. Examples of volatile solvents include, but are not limited to, water, alcohol, acetone, ether, formic acid, dichloroethane, dimethyl sulfoxide ("DMSO"), dimethylformamide ("DMF"), etc. Unlike first liquid substances, second liquid substances tend to have less components. However, it is quite possible that second liquid substances are also non-volatile substances. To electrospray second liquid substances, an opposite, electrical potential may be applied. Such application may generate an oppositely charged electrosprayed product. The oppositely charged electrosprayed product may be in a plurality of counter-ion forms. Examples of counter-ions include, but are not limited to, counter-charged molecules, macromolecules, nano-clusters, nano-droplets, etc.

To generate the electrical potential and opposite, electrical potential, at least one power supply may be used. Nonlimiting examples of the power supply include one or more batteries, AC-DC and/or DC/DC converters, power generator, solar cells, etc.

Both the charged electrosprayed product and oppositely charged electrosprayed product may be allowed to contact each other. The contact may result in a neutral or partially discharged product S225, S230, S240. The neutral product may be produced in an open or closed environment. Open environments can be referred to as space and/or open air. Closed environments can be referred to any enclosed environment, such as chambers, hoods, boxes, rooms, etc. Whichever environment is desired, the neutral product may be formed in the gaseous phase or on a surface of a solid. It is also possible that the neutral product can be formed in a liquid phase.

In the gaseous phase, air-suspended, neutral or weakly charged aerosols and materials may be created. These include, but are not limited to, non-volatile molecules and macromolecules, solid nano-clusters, nano-shells, nano-fibers, nano-mats, nano-droplets and microdroplets of non-volatile liquids.

In the solid phase (such as on a substrate), a film of nano-structured material may be created. This film can be used as a filter, scaffold or surface coating.

In one embodiment, the nano-aerosol and nano-structured materials may be produced in a chamber. The chamber may include at least one entrance port and at least one exit port. The entrance port may be used to introduce air, capillaries, electrosprayed material, etc. into the chamber. The exit port may be used to allow air, electrosprayed material, etc. to leave the chamber. Where capillaries are involved, at least one capillary is used to electrospray the first liquid substance into the chamber, and at least one capillary is used to electrospray the second liquid substance into the chamber.

As another embodiment, a substrate may be introduced into the chamber S202. This substrate, serving as a solid support, may be capable of collecting the neutral product. As yet another embodiment, the substrate may be a dielectric substrate. It is possible that the substrate is not electrically conductive. Moreover, the substrate may be perforated or non-perforated. An example of the substrate is a mesh.

There are a number of nonlimiting ways of neutralizing electrosprayed material and collecting neutral products. In one example, the charged electrosprayed product may first be collected on the dielectric substrate S220 and then neutralized by the oppositely charged electrosprayed product S225. Deposition and neutralization processes may be separated in time and/or space (e.g., be performed in different compartments of the chamber or in different subsequent steps). In another example, the charged electrosprayed product may be neutralized by the oppositely charged electrosprayed product in the air S230. This neutralization may be followed by collection on the dielectric substrate S235. In yet another example, it is also quite possible where neutralization and collection on the substrate occur simultaneously S240. Whichever way neutralization and collection on a substrate is achieved, it should be noted that again this process may occur in the open or closed environment.

As another embodiment, air may be introduced in to the chamber via an entrance port S306. Air may assist the charged electrosprayed product to come into contact with the oppositely charged electrosprayed product, or vice versa. Air may also assist in removing the neutral product, as well as air and non-contacted electrosprayed material, to exit the chamber.

As yet another embodiment, at least one electrode controller may be introduced S304. The electrode controller may be used to control the electrical potential, the opposite, electrical potential, or both.

An example of a nano-structured material that can be formed is a nano-mat, as part of a nano-filter. In general, a nano-mat comprises of a plurality of nano-fibers. Capable of being in a layered format, the nano-fibers may be produced by electrospinning a liquid substance (e.g., non-volatile substance, etc.) with an applied electrical potential S4310, as shown in FIG. 43. The result of this production should be charged, electrospun nano-fibers.

In one embodiment, the nano-fibers may be electrospun from polymers soluble in water and/or from water-insoluble polymers. The former may be used in bio-aerosol collection with subsequent release of captured aerosol into the water solution for assay.

In turn, the charged, electrospun nano-fibers may come in contact with an oppositely charged electrosprayed product (e.g., a non-volatile substance, pure volatile solvent, solution having at least one surface modifier (such as a glue-like substance), etc.) using an opposite, electrical potential S4315. The oppositely charged electrosprayed product may be a liquid, solid, gas, or some combination thereof. This contact may discharge the electrical charge(s) on the charged, electrospun nano-fibers. Such discharging may occur either in the air or on a dielectric substrate. As a result, neutralized nano-fibers may be produced.

The nano-fibers may be collected in a variety of ways. One way includes sifting via sieves. Another way involves absorption onto a solid surface. A further way of collection includes using a dielectric substrate. In each instance, the neutralized and collected fibers may be produced in an open or closed environment.

Created nano-mats may have a smooth surface. Alternatively, created nano-mats may have a rough (or "wooly") surface.

Another example of a nano-structured material that can be formed is a nano-filter. Essentially, a nano-filter comprises of a plurality of nano-mats and at least one perforated substrate. Each of the nano-mats may be produced as described above.

Figure 16:
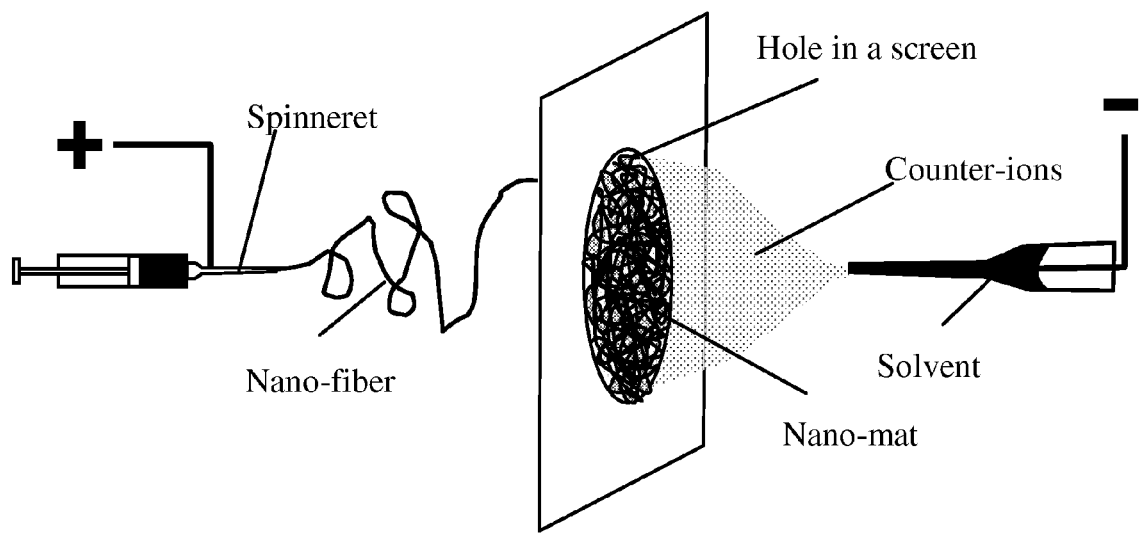
FIG. 16 shows the formation of free nano-mat in a hole dividing chamber into two compartments, followed by the free nano-mat's transfer to a supportive mesh.
Figure 43:
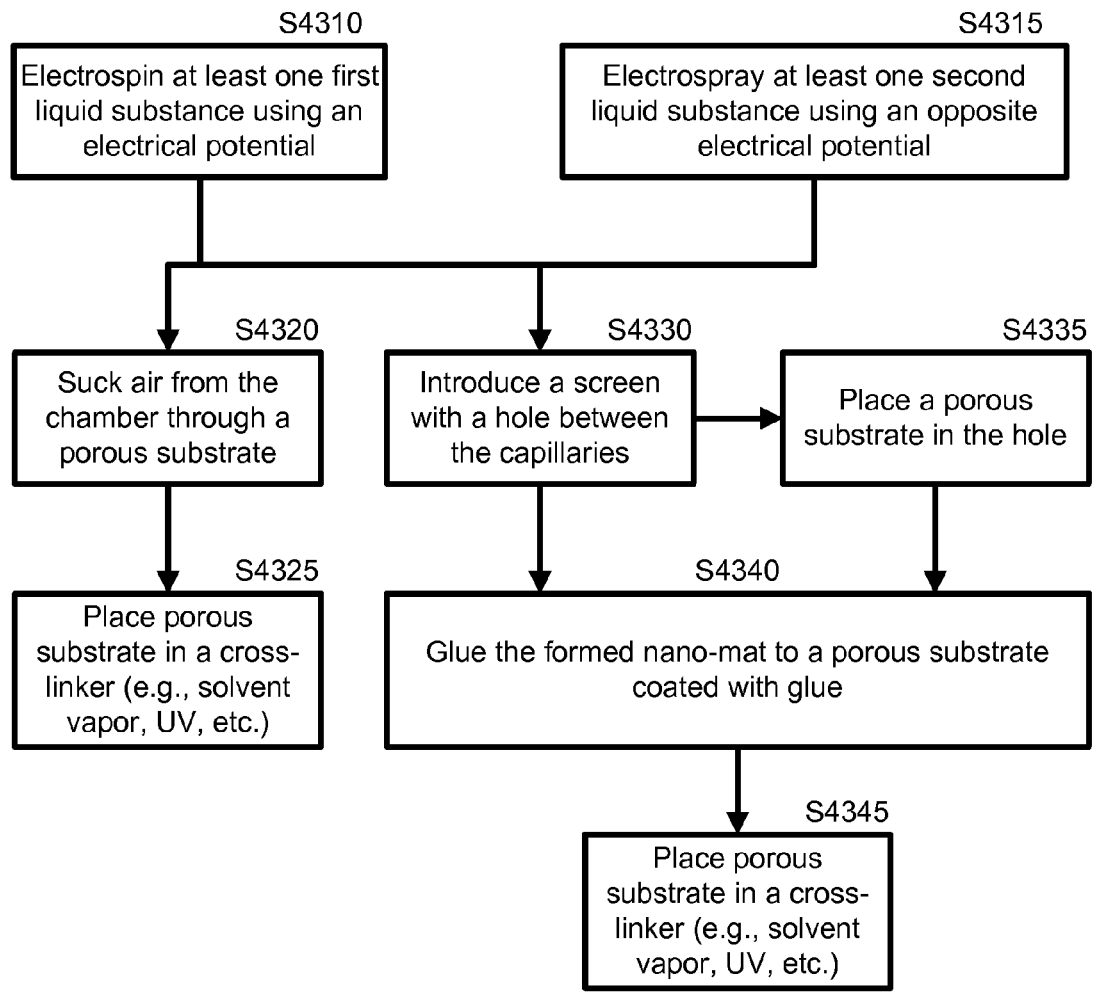
FIG. 43 presents an example of a flow diagram for manufacturing nano-filters using different electrospinning-neutralization techniques.

However, other numerous, non-limiting ways may be exercised to create the nano-mats. In one example, the nano-mats may be suspended on an opening of a frame, as shown in FIGS. 16, 41A and 43. In other words, a frame or screen may have a hole, where the nano-mats collect, interlace, interweave, etc. on the peripheral edge of the hole. Such suspension should be on the same plane as the frame or screen where the hole is located. This frame or screen may be introduced into between capillaries that may be used to electrospray the first and second liquid substances S4330. After suspension, the nano-mats may be glued onto a porous substrate (e.g., a mesh) S4340. Also, the porous substrate may be coated with glue. The porous substrate may then be placed in a cross-linker (e.g., solvent vapor, UV, etc.) S4345.

Alternatively, as another example, a mesh can be placed inside the hole of the frame or screen S4335. After this mesh collects nano-fibers, which may be neutralized, then it may be glued onto a porous substrate S4340. Also, the porous substrate may be coated with glue. The porous substrate may then be placed in a cross-linker (e.g., solvent vapor, UV, etc.) S4345.

In another example, charged, electrospun nano-fibers may be neutralized in the air. Afterwards, the neutralized nano-fibers may be sucked onto a porous substrate through the air S4320. The porous substrate can then be placed in a cross-linker S4325.

In yet another example, charged, electrospun nano-fibers may be deposited onto and neutralized on a substrate. This process may occur simultaneously. However, in this example, the substrate may be dielectric, as opposed to being just any porous material. Additionally, the substrate may be a perforated substrate. To help make the nano-fibers stick, the dielectric, perforated substrate may be coated with glue, such as epoxy glue, UV curable glue, photo glue, etc. The glue may aid in gluing and/or reinforcing the charged electrosprayed nano-fibers and/or neutralized nano-fibers on the dielectric substrate. The glue may also aid in collecting the neutralized nano-fibers onto the support. It should be noted that neutralizing may occur before or after the charged electrosprayed nano-fibers are deposited onto the dielectric substrate.

In another embodiment, nano-fibers may involve surface coating. In this process, the nano-fibers may be coated with a surface modifier for surface functionalization. One example of a surface modifier that can be used is glue. Gluing nano-fibers together may reinforce nano-mats.

To produce nano-aerosol and nano-structured materials, a nano-aerosol generator may be used. Multiple versions of the nano-aerosol generator may be created and designed to generate aerosols, nano-aerosols, and other nano-structured and micro-structured materials. The simplest nano-aerosol generator may comprise of at least two capillaries, at least two liquid substances and at least one power supply. Each liquid substance may contain liquid and/or solid particles.

At least two of the capillaries are a first capillary and a second capillary. The first capillary may be filed with a first liquid substance. The second capillary may be filled with a second liquid substance. Each of the first capillary and second capillary may be inserted into a chamber. Furthermore, at least two electrodes (such as platinum wire electrodes) may be connected to the power supply to introduce some electrical potential to each first liquid substance and second liquid substance. One electrode may be separately and singularly connected to the first capillary. Likewise, another electrode may be separately and singularly connected to the second capillary.

By applying electrical potential to the first liquid substance in the first capillary, the first liquid substance may be ejected into the chamber. Ejected first liquid substance may form a charged, electrosprayed product in the chamber. Similarly, by applying an opposite, electrical potential to the second liquid substance in the second capillary, the second liquid substance may be ejected into the chamber. Ejected second liquid substance may form an oppositely charged electrosprayed product in the chamber. Liquid in the capillaries may be transformed into a cloud of charged nano-sized or micron-sized droplets. Both these products may be allowed to interact to produce a neutral product.

As an embodiment, electrospray-produced nano-droplets and/or micro-droplets may be allowed to decompose and dry prior to neutralization in the chamber. Alternatively, these nano-droplets and/or micro-droplets may be neutralized before reaching the electrostatic stability limit upon drying.

The chamber may include a substrate for capturing the neutral product. Examples of the substrate include, but are not limited to, one or more metal or polyester meshes, plastic frames, and plastic or metal O-rings. Air may be introduced into the chamber via at least one entrance port to outflow the neutral product and/or air through one or more exit ports.

The rate of droplet jetting and generation (e.g., $\sim 10^7$ particles per second) may be controlled by changing voltage on the liquid substance, by changing electrical conductivity of the liquid substance, by applying pressure, using an external pump, etc. If a volatile solvent (such as water) is used in a non-saturated atmosphere, the solvent may evaporate from the micro-droplets. Evaporation may cause the droplets to lose their stability and disintegrate. In essence, a train of nano-droplets may be ejected.

In essence, as an embodiment, the nano-aerosol generator may also include one or more sensors and controllers. Examples of sensors include, but are not limited to, a thermometer, humidity meter, quartz crystal microbalance monitor of deposition, and light scattering device. Controllers may be used to regulate certain temperatures, humidity, gas composition and pressure inside the chamber.

As another embodiment, to control the electrical potential, one or more electrode controllers may be used. By controlling the electrical potential, it is possible to generate some charged products when both the charged, electrosprayed product comes in contact with the oppositely charged electrosprayed product.

It is generally well known in the art that a variety of charged products can be manufactured by electrospraying pure liquids, solutions and suspensions. Examples of charged products include, but are not limited to, (i) micron sized droplets, (ii) nano-sized droplets, (iii) charged suspended particles (e.g., cells, spores, etc.), (iv) nano-clusters of non-volatile compounds, (v) nano-fibers, (vi) nano-tubes, (vii) macromolecular ions, and (viii) ions of low mass.

However, what is novel is that such plurality of pure liquids, solutions, and suspensions can also be used to generate a variety of neutralized products. Any combination of these products can be use in the neutralization process. TABLE 1 shows potential aerosol products obtainable through neutralization of a variety of ES products with a variety of other oppositely charged ES products. Most combinations are presented in this table.

TABLE 1

List of Potential Aerosol Products Formed by Neutralization

| Initial Product | Neutralizing Counterion | Final Aerosol | Description, Advantages |
| --- | --- | --- | --- |
| Small ion | Small ion | Gas of neutral non-volatile molecules | Unusual molecules or complexes that cannot be produced in solution |
| Macro-molecular ions | Small ions | Gas phase solution of non-volatile macromolecules | This is a unique product of the present technology, useful for fundamental research and for many applications |
| Dry nano-clusters | Small ions | Nano-aerosol | Economic method for producing nano-aerosols from many materials |
| Droplets | Solvent small ions | Neutral solvent fog | No reactive molecules are introduced as in corona or isotope neutralization |
| Nano-fibers | Small ions | Free web or attached mat | Filters, free-floating absorbers |
| Macro-molecular ions | Macro ions | Gas phase solution of non-volatile complexes of macromolecules | This is a unique product of the present technology, useful for fundamental research and for many applications |
| Dry nano-clusters | Macromolecular ions | Coated aerosol | Aerosol particles coated with a layer of polymer molecules |
| Droplets | Macromolecular ions | Droplets with polymer surface | Producing nano-shells (polymer is not soluble in the droplets) |
| Nano-fibers | Macromolecular ions | Fibers with special surface | Filters, free-floating absorbers, glued webs |
| Dry nano-clusters | Dry nano-clusters | Binary nano-aerosol | A special aerosol is formed, e.g., dual particles, magnetic and fluorescent |
| Nano-fibers | Dry nano-clusters | Fibers with special surface | Filters, free-floating absorbers |
| Droplets | Dry nano-clusters | Droplets with special surface | Nano-shells |
| Nano-fibers | Nano-fibers | Web | Filters and free nano-mats |
| Droplets | Droplet | Neutral solvent fog | If immiscible, nonvolatile liquids are used. |

The same basic technology may be used to allow the manufacturing of a large number of different nano-particles and micro-particles, depending on materials and electrospraying conditions. It should be noted that the combinations in the above table are merely examples of potential products.

Some important aerosols include, but are not limited to, molecular aerosols, nano-aerosols, nano-shells, nano-fibers, nano-webs, and micro- and nano-fogs.

Figure 37:
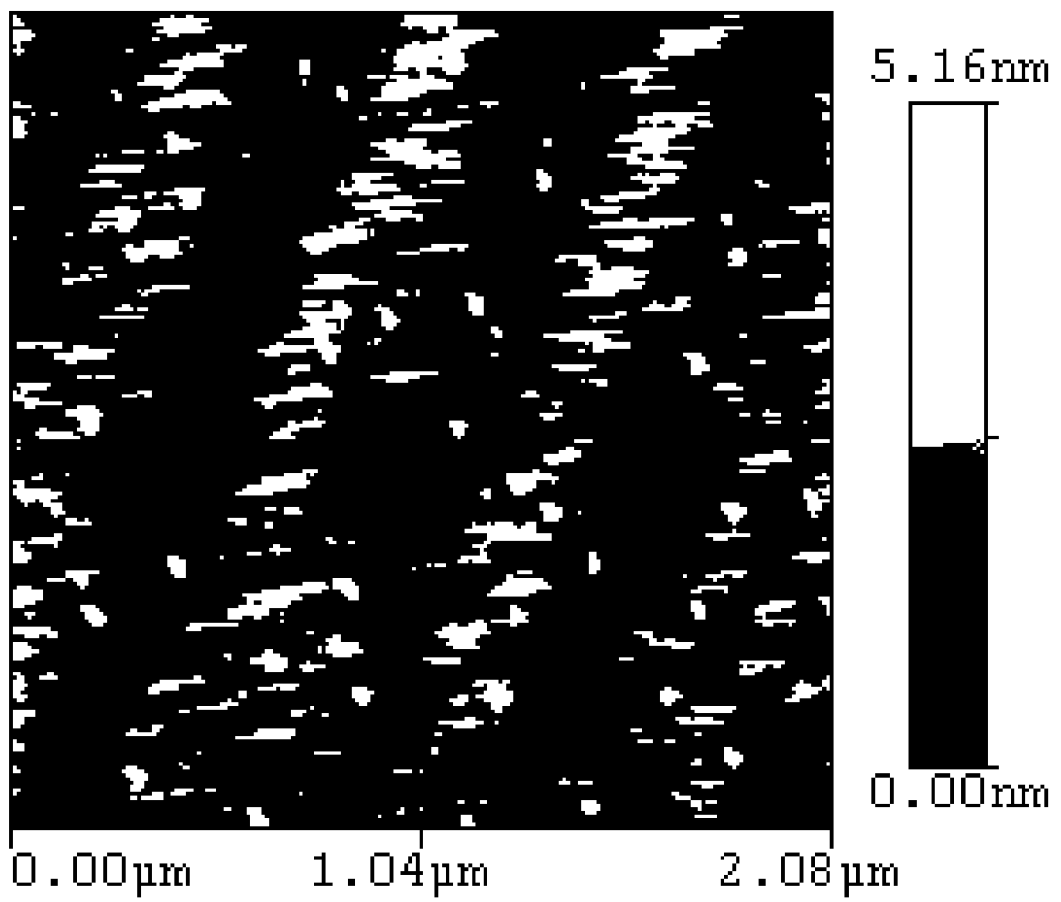
FIG. 37 shows molecular-sized nano-aerosol formed by neutralizing positively charged molecular poly(vinylpirrolidone) ions with negatively charged ions produced by electrospraying of absolute ethanol. Each dot has a size of a single collapsed PVP molecule.

Molecular aerosols are the type of aerosols that present a novel form of a gas phase solution of non-volatile molecules and macromolecules (e.g., polymers). The same process can also be used to produce non-equilibrium solution in organic non-conducting solvents. This solution tends to be unstable, since molecules may adsorb on walls of the chamber and aggregate. Nevertheless, these nano-aerosols and sub-nano-aerosols generally have a potential for several applications in spectroscopy, deposition, etc. For example, as shown in FIG. 37, aerosol of separate PVP molecules was produced by the claimed electrospray-neutralization process. Such air-suspended single molecules can be used, for instance, in drag delivery to lung and skin surface (e.g., in gene therapy to deliver DNA, or to deliver protective antibody molecules), in studies of molecular, vibrational modes, in mass spectrometry, etc.

Nano-aerosols are generally formed by neutralizing dry non-volatile residues obtained from an atomized solution by small ions, macromolecular ions, or other charged nano-aerosols. A great variety of potential products and applications may be contemplated for this type of aerosols. For instance, nano-particles with special optical (e.g., quantum dots), magnetic (e.g., nano-magnetics) and other properties may be manufactured. Thus, fluorescent nano-particles may be manufactured by coating nano-particles with a layer of antibodies upon neutralization. Such functionalized particles may be used as labels in immunoassay or hybridization-based DNA assay.

Figure 5:
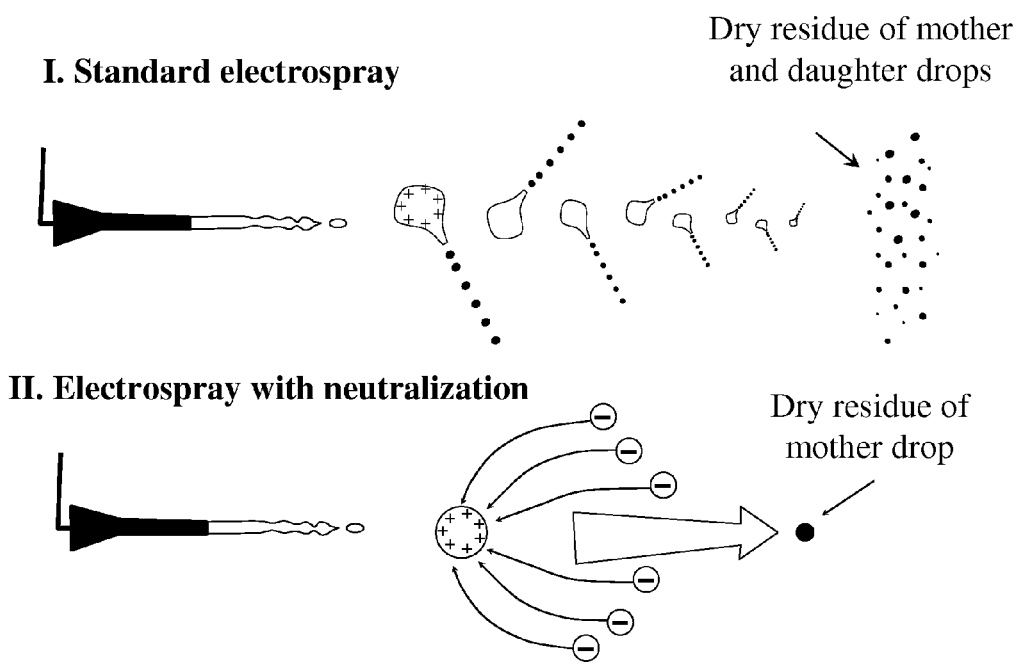
FIG. 5 shows a contrast of the fate of a droplet produced by standard ES versus ES-neutralization.

In many cases, formation of dry nano-aerosol can start with formation of charged micron-sized solution droplets, which may further evaporate and decay upon reaching the Rayleigh limit of electrostatic stability. Once this limit is reached, the resulting product may be dry, charged residues of the daughter nano-droplets, as presented schematically in the upper part of FIG. 5. This figure shows a major difference in the fate of a droplet produced by ES in the standard ES (upper scenario) and in ES with neutralization (lower scenario). A poly-disperse nano-aerosol is produced in dry atmosphere according to the first procedure. The second procedure yields a mono-disperse aerosol.

It appears evident that the size distribution of the formed dry aerosol can be controlled by regulating the rate of evaporation (e.g., by maintaining a certain level of humidity) and the speed of neutralization. In the limiting case, when the neutralization of droplets proceeds before they reach the Rayleigh limit, dry residue generally will include some or the entire dissolved content of each microdroplet, as illustrated in the Part II of FIG. 5.

Figure 6:
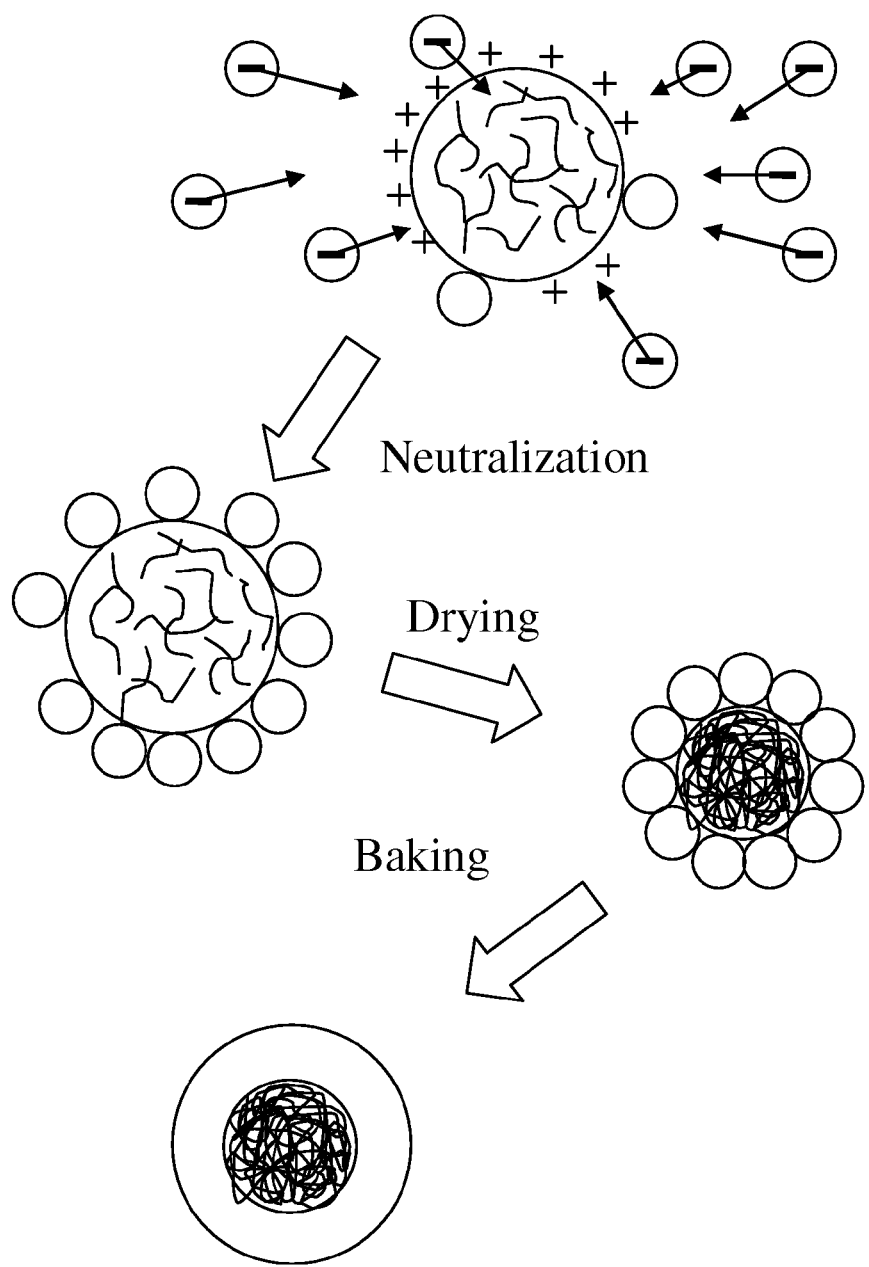
FIG. 6 portrays a general scheme for manufacturing coated particles.

Nano-shells can be produced by coating one or more nano-particles or nano-droplets (of a liquid substances with low volatility) with macromolecules or clusters. This coating is expected to produce a layer of material on the surface of the nano-particles. FIG. 6 illustrates an example of fabricating encapsulated nano-beads by electrospraying-neutralization technique. Microdroplets of polymer solutions may be neutralized by nano-clusters of insoluble material. Heating, exposure to a vapor in which the material of nano-clusters swells or dissolves, or UV irradiation may help the nano-clusters to coalesce into a solid layer. After evaporating solvent nano-clusters, a shell on the surface of a dried polymer particle may form.

The shell material can be baked using a variety of methods, such as by exposing to a vapor of a solvent in which the polymer (e.g., the material of nano-clusters) or other layer of the material is soluble, by heating, or by irradiation (e.g., ultraviolet irradiation, etc.). Exposure may allow for the swelling, dissolving, etc. of the polymer or other layer of the material. These methods may help the nano-clusters to coalesce into a solid layer. As a result of such treatment, the core material may become protected. Such shells may be useful in controlling the delivery of drugs. Semi-permeable micro- and nano-shells can be produced using this method. This technology may be used in the delivery of drugs. For example, enzymes and DNA molecules can be introduced in the blood stream without subjecting them to a direct attack from antibody molecules.

Nano-webs can be produced by neutralizing electrospun polymers with small ions, macromolecular ions, nano-clusters, and oppositely charged electrospun fibers. Free floating fibers, flocks of fibers, membranes, and web layers deposited onto a suitable substrate (e.g., polymer mesh) may be possible products, which could be used in highly efficient nano-filters and absorbers. They may be considered as nano-structured materials.

Figure 7:
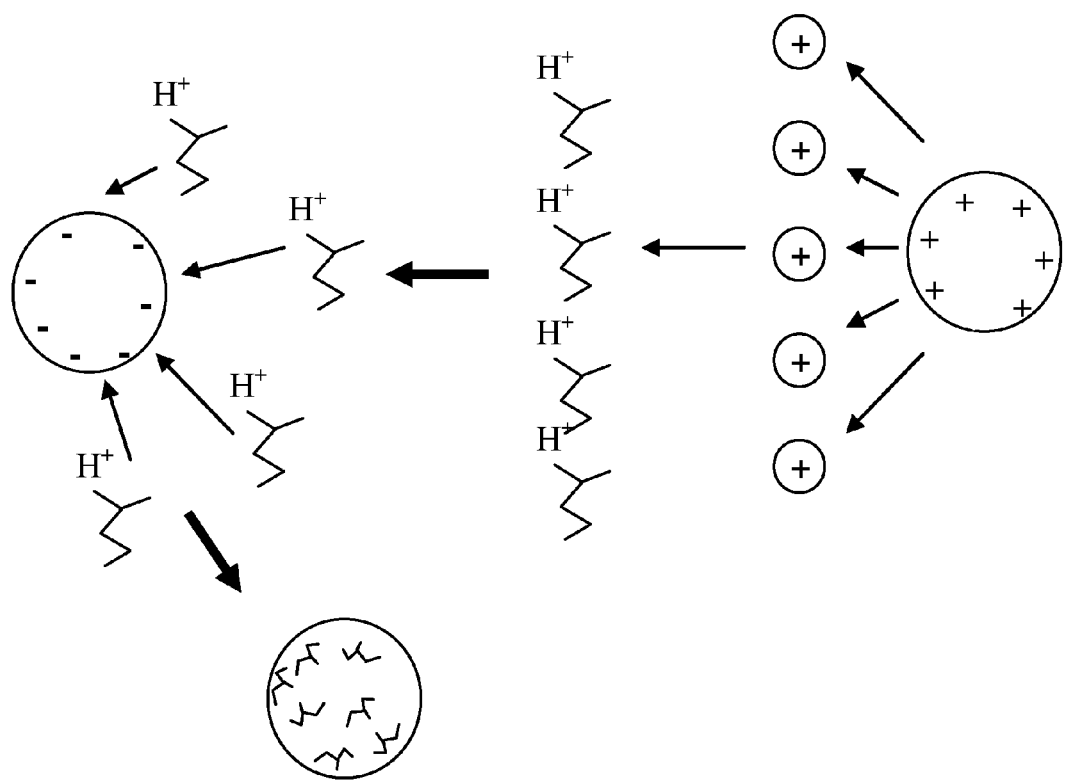
FIG. 7 shows neutralization of a charged electrospray-produced negative particle or droplet (left) with positively charged molecular ions produced by electrospraying of a pure solvent in a positive mode.

Micro-fogs and nano-fogs can be produced by neutralizing droplets of a non-volatile solvent or droplets of a volatile solvent in an atmosphere saturated with the solvent vapor. This production is schematically illustrated in FIG. 7.

Depending on the type of the neutralizing ions, the final product may be solvent droplets (i.e., small ions as neutralizers), shells filled with liquid (i.e., insoluble macromolecules or clusters as neutralizers), and/or complex liquid-in-liquid droplets (i.e., droplets neutralized with droplets of another immiscible solvent).

To further control the process of aerosol formation, the nano-aerosol generator may also include one or more sensors. Nonlimiting examples of control sensors include a thermometer and/or a humidity sensor, a quartz crystal microbalance monitor of deposition, and a light scattering device.

The nano-aerosol generator may also embody other features. These include a fan and a port for introducing probe surfaces. A microscopic slide may be inserted into the chamber through the port without opening the chamber. This slide may be used to collect aerosol samples for further analysis with optical or atomic force microscope ("AFM"). The fan may be used to distribute aerosol throughout the chamber.

In another embodiment, the process of aerosol formation can be controlled by using a chamber structure. For instance, in one version of the device, a metal mesh can be used and can be placed in the middle of the chamber between the capillary tips, as schematized in FIG. 8. Conductive O-ring, frames of different form or conductive body or chamber made of a conductive material may be considered as other embodiments of the chamber structure. Also, in this figure, $P_1$ and $P_2$ denote power supplies, whereas $I_1$ and $I_2$ stand for independently measured and controlled currents. These electrodes help allow one to independently control the injection of positive and negative charges, so that final aerosol leaving the chamber may be charged rather than neutral. This charge may be proportional to the difference in the currents, $I_1$ and $I_2$, running through the right and left capillaries, respectively.

Other methods of neutralization are also feasible. For example, separate chambers (e.g., two), each supplied by a sprayer and a counter electrode or ring, can be used to manufacture charged aerosols, which are then mixed in a third chamber.

Additionally, in some special devices, aerosol-forming and counter-ion-forming means can be introduced into a chamber as an array containing multiple capillary or other sprayers. Also, a chamber need not be necessary for the nano-aerosol generator that produces aerosols for atmospheric release.

It should be noted that the claimed invention by no means applies any limitations on the way the charged clouds are created. All known techniques of atomization resulting in formation of charged aerosols, such as air-assisted spraying, sonic-jet atomization and ultra-sound-assisted atomization, may be employed. Furthermore, the claimed invention does not provide any restriction on the media in which neutralization reactions occur. Both gas phase and liquid dielectrics may be employed.

Unlike currently known aerosol generators (e.g., De Vilbiss nebulizer and other similar instruments), the claimed invention does not require compressed air, high-power ultrasound, or a high speed motor to produce an aerosol. Therefore, it should be economical. The power consumption can be of the order of ~10 kV×1 µA=0.01 W. In essence, the claimed nano-aerosol generator can operate on a single AA battery and can possibly last run for hours.

Since electrospraying is known for its ability to reach the highest degree of atomization, it is expected that highly disperse nano-aerosols can be produced using the claimed invention. Such nano-aerosols can penetrate more deeply into lungs, making dispersed drugs more effective [Edwards et al. (2004)].

The claimed nano-aerosol generator can produce gas-phase solutions of non-volatile molecules, such as proteins, DNA, and drugs. The molecules can be further introduced into organisms via the skin or epithelium for gas-phase immunization or gene transfer.

In addition to operating with large liquid volumes, the claimed invention can operate with very small liquid volumes. For instance, liquid volumes can range from approximately 0.1 µL to approximately 100 µL. Regardless of the volume size, the aerosol particle size may be uniform within the order of approximately 10-20%. These particles can be controlled by changing ES parameters (e.g., voltage, flow rate, etc.), as well as the composition of the solutions. To create complex aerosols, different ES products can be combined.

III. RESIDUAL CHARGES ON ES-NEUTRALIZED AEROSOL

It is expected that the rate of neutralization of aerosol particles and fibers created by ES will likely vary depending on charge still left on the aerosol. An aerosol particle with $N_1$ elementary charges should attract oppositely charged ions having $N_2$ charges with a force of:

$$F=(N_1 N_2 e^2)/(4\pi \in_o r^2) \qquad (1).$$

The e is elementary charge, $\in_o$ is dielectric permittivity of vacuum and r is the distance between the particle and ion.

The rate in which a lighter and more mobile ion can approach the particle may be estimated from a differential equation in which friction force is counterbalanced by electric force:

$$X^2(dX/dt) = (N_1 N_2 e^2)/24\pi^2 \in_o \eta R) \qquad (2).$$

The η is the dynamic viscosity of air. R is the radius of the aerosol particle.

The solution of eqn. 2 may give the average time, T, it takes to reach the particle from a distance $X_o$:

$$T = X_o^3 (N_1 N_2 e^2)/8\pi^2 \in_o \eta R)^{-1} \qquad (3).$$

Considering a specific case of residual small charges with $N_1 = N_2 = 1$, and average distance between ions $X_o = 100$ μm (corresponding to $10^{12}$ particles/m³), one can estimate time of equilibration T=80 min for particles, 10 nm in diameter, T=24 min for R=3 nm, T=8 min for R=1 nm. These crude estimates show that some small residual charges may persist on aerosol particles for long time after generation.

Figure 9:
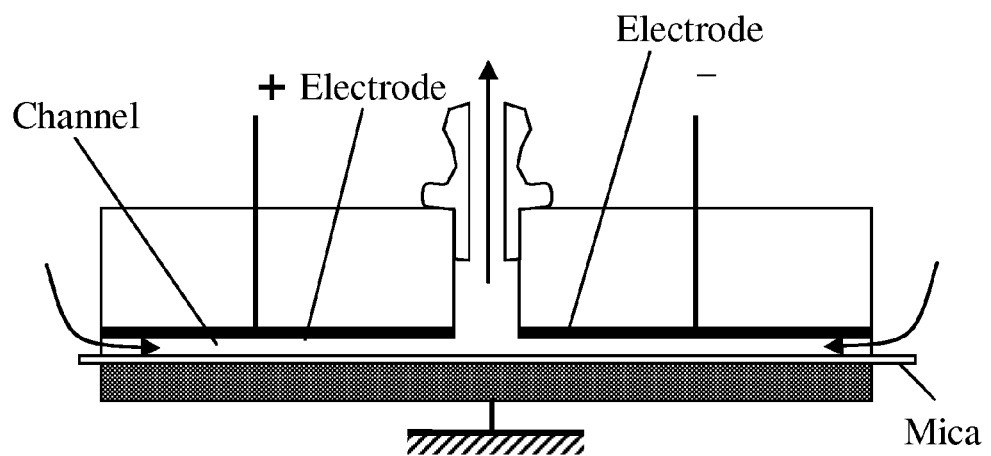
FIG. 9 shows an example of a flow cell used in capturing charged aerosol.

Charges on aerosol particles generated by ES-neutralization process may be measured to verify the theoretical predictions. A special gadget may be designed to allow electrostatic control of aerosol deposition on smooth surface of mica or glass for AFM observation. The schematic view of the gadget is presented in FIG. 9.

As shown in the figure, the air may be pumped through a central hole, allowing aerosol to move along two horizontal channels, b~195 μm high, ~2 mm wide and $L_o$~12 mm long each. The lower wall of the channel may be mica film. Although mica is dielectric, at moderate to high humidity, a layer of water plus dissolved potassium and carbonate ions tend to provide sufficient surface conductivity to keep the mica surface charged. The electric field direction may be opposite in the left and right channels.

Charged aerosol particles moving through the channel may be subjected to electrical force, making them move to or from the mica surface. Considering laminar air flow in the channel, the maximum possible path of a charged aerosol particle within the channel (from the channel entrance to its landing position) can be calculated using the following formula:

$$S_{max} = 4b^3 \pi RP/NeEL_o \qquad (4).$$

P is pressure difference at the ends of the channel. E is the strength of electric field. N is the number of charges on the particle.

Figure 4:
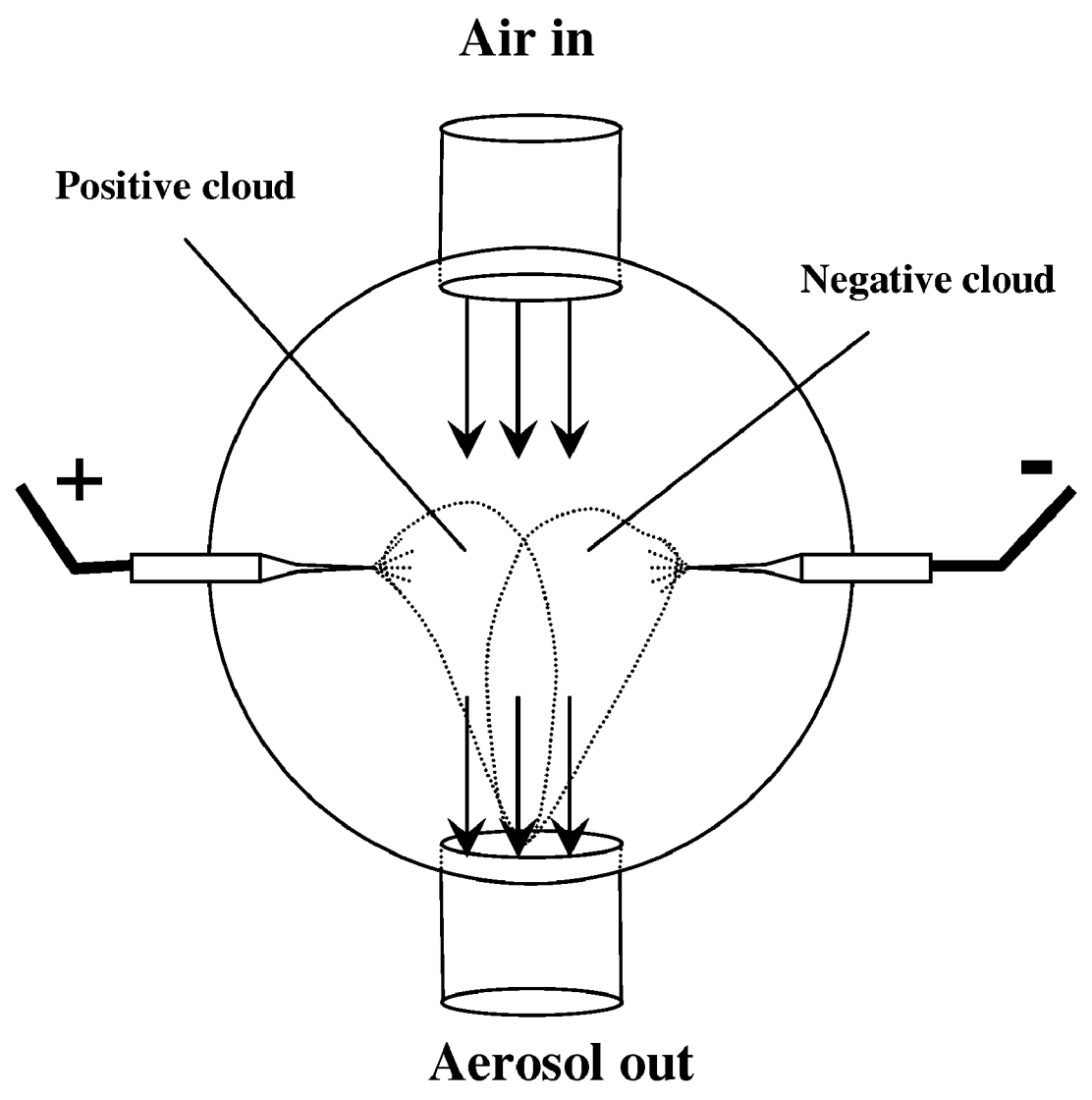

In one experimental embodiment, 0.05% solution of dialyzed ovalbumin ("OVA") was electrosprayed from a glass capillary against absolute ethanol in a chamber as shown in FIG. 4. Humidity of air in the chamber was 68%. Air pressure on the channel was kept 0.3 cm. Water and voltage applied to the flow channel may be 300 V. Freshly cleaved mica may be coated with poly(ethylene imine) ("PEI") to enable strong adhesion of captured particles. After mica was placed in a Petri dish with 25% glutaraldehyde ("GA"), excess NaCl may be added to keep water activity of the GA solution low. Mica sample may be kept in GA vapor for 5 min and then scanned in AFM using tapping mode. Scanning can be performed in air dried over silica-gel.

Aerosol particles were passively adsorbed on uncharged mica in the first experiment to characterize the size of Ova aerosol. Mica was placed in the chamber and exposed to aerosol for 11 minutes during ES-neutralization process at a current of ~40-~45 nA. Approximately 3 μL of Ova solution were sprayed during the experiment.

Figure 10:
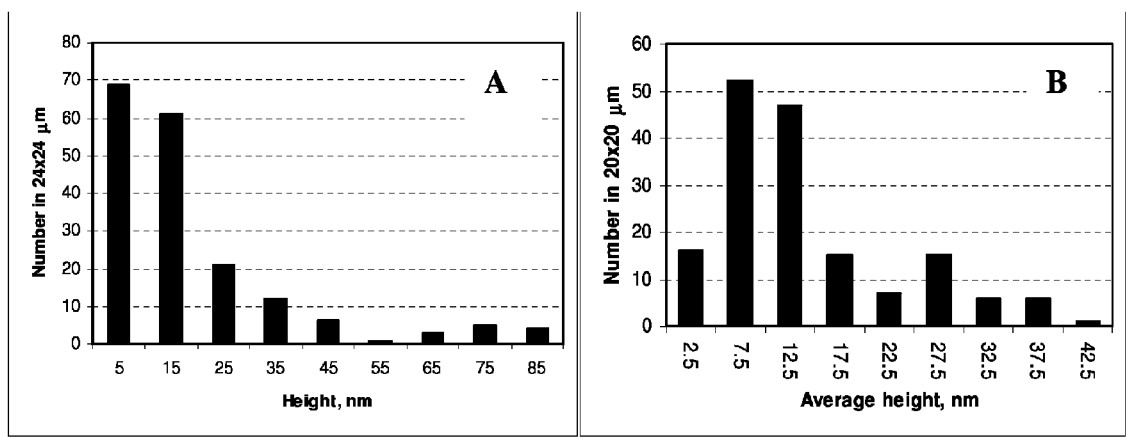
FIG. 10 shows histograms of height distribution of ovalbumin aerosol particles produced by electrospray neutralization method.

It can be seen from histograms in FIG. 10 that more than 70% of all particles have a height of less than ~20 nm, with a major peak at ~7-~9 nm. Occasionally, much larger particles are seen, with height up to ~200 nm.

When similar aerosol was captured on charged mica, notable distribution in the surface density and size of particles was observed. These data are presented in TABLE 2.

TABLE 2

Capturing Ova Aerosol onto Charged Mica[a].

| Distance[a], mm | Voltage on mica[b] | Density of particles ×10⁻⁴, mm⁻² | Average height, nm |
|---|---|---|---|
| 0.5 | +300 | 2.9 | 86 ± 43 |
| 1.0 | +300 | 2.4 | 135 ± 71 |
| 2.0 | +300 | 1.9 | 9 ± 4 |
| 3.0 | +300 | 1.4 | 6 ± 2 |
| 3.5 | +300 | 4.9 | 7 ± 4 |
| 5.0 | +300 | 1.2 | 4 ± 2 |
| 10 | +300 | 0.5 | 6 ± 2 |
| −5.0 | −300 | 0.02 | 3 − 10 |

Notes
[a]Distance from the channel entrance.
[b]Aerosol was collected for 5.5 min at a pressure of 0.3 cm $H_2O$.

According to the data, large particles with the AFM height of ~100 nm are mostly deposited very close to the channel entrance, not farther than ~1 mm from the entrance. Other common types of aerosol revealed, in AFM imaging, that particles with a height of ~4-~9 nm can penetrate much deeper into the channel, up to ~5-~7 mm under the conditions indicated. The Ova particles produced by applying positive potential to the Ova solution may deposit on mica as positively charged nano-particles. Very little particles can be found in the channel, where negatively charged particles were collected on mica. Since only ethanol ions and clusters were charged negatively in this experiment their capturing was not likely possible due to high volatility of ethanol.

Assuming that height represents aerosol diameter one can estimate maximum charge for such particles using eqn. 4:

$$N < 4\pi b^3 RP/S_{max} NeEL_o \qquad (5).$$

Particles with 2R=7 nm can penetrate by $S_{max}$=7 mm into the channel only if they bear one charge. Similar estimates for large particles, which could penetrate by 1 mm, tend only to give N~50. It may thus be concluded that while large aerosol particles are likely to be more charged or keep the charges longer, smaller nano-particles are likely to bear only one or no elementary charge.

IV. APPLICATIONS FOR NANO-AEROSOL AND NANO-STRUCTURED MATERIALS

Nano-aerosol and nano-structure materials may be applied in a plethora of situations. For example, nano-aerosols may be used to retain biological activities of atomized materials. It is expected that protein, DNA, and small drug molecules can survive ES atomization and subsequent neutralization. Survival would aid in the design(s) of simple economic bio-aerosol generators for a variety of applications. An example of such application is the introduction of anti-histamines into the lungs in the form of nano-aerosol particles.

In one embodiment, nano-aerosols may be molecular aerosols. The claimed nano-aerosol generator may allow the formation of a gas-phase "solution" of non-volatile reagents and macromolecules. A plurality of different applications may be envisioned for such unusual "solutions."

Gas-phase molecules can be used in fundamental studies to measure normal modes of their vibrations that may be dampened in dense solutions and in solid samples. Thus, infrared spectroscopy of gas-phase proteins should allow valuable information about elasticity and functional mobility of these molecules to be obtained.

Also, molecular aerosols with small residual charges tend also to be useful in mass spectrometry. It is well recognized that formation of multi-charged macromolecular ions of proteins and other polymers in electrospray ionization aggravates analysis of their mass spectra. Using partly discharged molecular aerosols may help reduce this aggravation.

Additionally, molecular aerosols made of reagents with special functions can also be used in gas-phase chemistry (e.g., to kill odor causing bacteria and disinfect areas filled with airborne pathogens). These applications may be achieved by using the claimed invention to produce a gas-phase "solution" of non-volatile reagents and macromolecules.

In another embodiment, nano-aerosols may be biological nano-aerosols. It is well known that nano-aerosols have the ability to penetrate deeply into lungs. This ability allows one to introduce nano-atomized drugs quickly and painlessly through the epithelium layer in lungs. So, for example, by integrating antihistamine drugs with nano-aerosols, the claimed invention can be used to administer this drug type through the respiratory system as biological nano-aerosols.

Similarly, in another embodiment, nano-aerosols may be used for gene transfection. Gas-phase DNA molecules may be used to deliver genes through the lung epithelium in gene therapy. It is important to emphasize that the cationic lipids, polymeric carriers (e.g., chitosan, chloroquine, and other transfection helpers, etc.) can be easily integrated into nano-aerosol particles generated by the claimed technology. These carriers can also be introduced into nano-shells. Not only can nano-shells help to increase uptake of the nano-particles, but they can also help prevent lysosomal degradation of DNA.

As another embodiment, nano-aerosols can be used in preventive care. In particular, nano-aerosols made of monoclonal or polyclonal antibodies specific for surface antigens in certain viral or cellular pathogen may be used in preventive treatment when these pathogens are present. It is expected that pathogens that bind antibody molecules within the mucus before reaching the epithelial monolayer will become less effective as infective agents and may become easy targets for phagocytes.

In yet another embodiment, nano-aerosols can be used as disinfectants. Similar to their use in emulsions (see, e.g., [Hamouda et al. (2000) and Hamouda et al. (2000)] for effects of lipid nano-emulsions), nano-aerosols prepared from oil or lipids can be used to inactivate aerosols of pathogens. The claimed invention may achieve this task because the residual charge on the oil or lipid nano-droplets can be well controlled. As in the case of other fabrications, the size of oil or lipid droplets can be regulated both by a plurality of parameters, such as electrical parameters, flow rate, solvents, additional substances that may reduce surface tension, etc.

In yet a further embodiment, nano-aerosols may also be used to create nano-fibers, which in turn may be used to produce nano-mats or other nano-structured materials. A net formed of nano-fibers electrospun from a polymer melt or solution has been previously shown to have effective capturing and low resistance to air flow. Up to about 99.9% of all aerosol particles with a diameter of between about 1 µm-about 5 µm may be captured [(Schreuder-Gibson, et al. 2002)]. The polymers may be electrospun onto an electrode (such as metal mesh screen) or a layer of conductive activated carbon spheres. Neutralization may be achieved via motion of charges from the fibers to the metal or carbon substrate.

Figure 13:
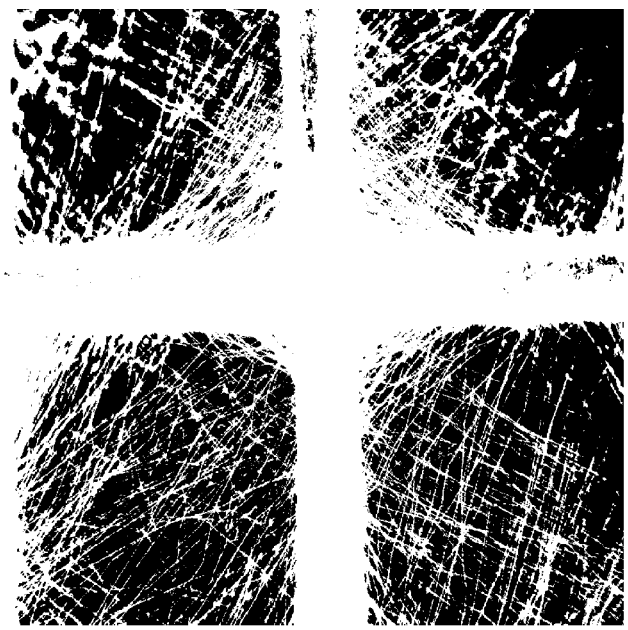
FIG. 13 shows an example of preferable landing of charged electrospun fibers on a conducting metal grid in a conventional method of filter manufacturing as depicted in FIG. 15A. The larger density of deposited fibers in the vicinity of the wire cross may be noted.

However, this known mechanism of neutralization may present certain limitations. Charges tend to move along the dielectric polymer fibers very slowly. Residual charges left on fibers may repel the landing of charged fibers, directing them instead to the conducting wires of the supporting mesh. A consequence of this neutralization mechanism is the substantially higher deposition of fibers in the areas adjacent to the conducting support, which tends to leave remotely positioned areas of the network not only poorly populated with fibers, but also transparent to aerosol. The latter may be seen in FIG. 13.

Figure 11:
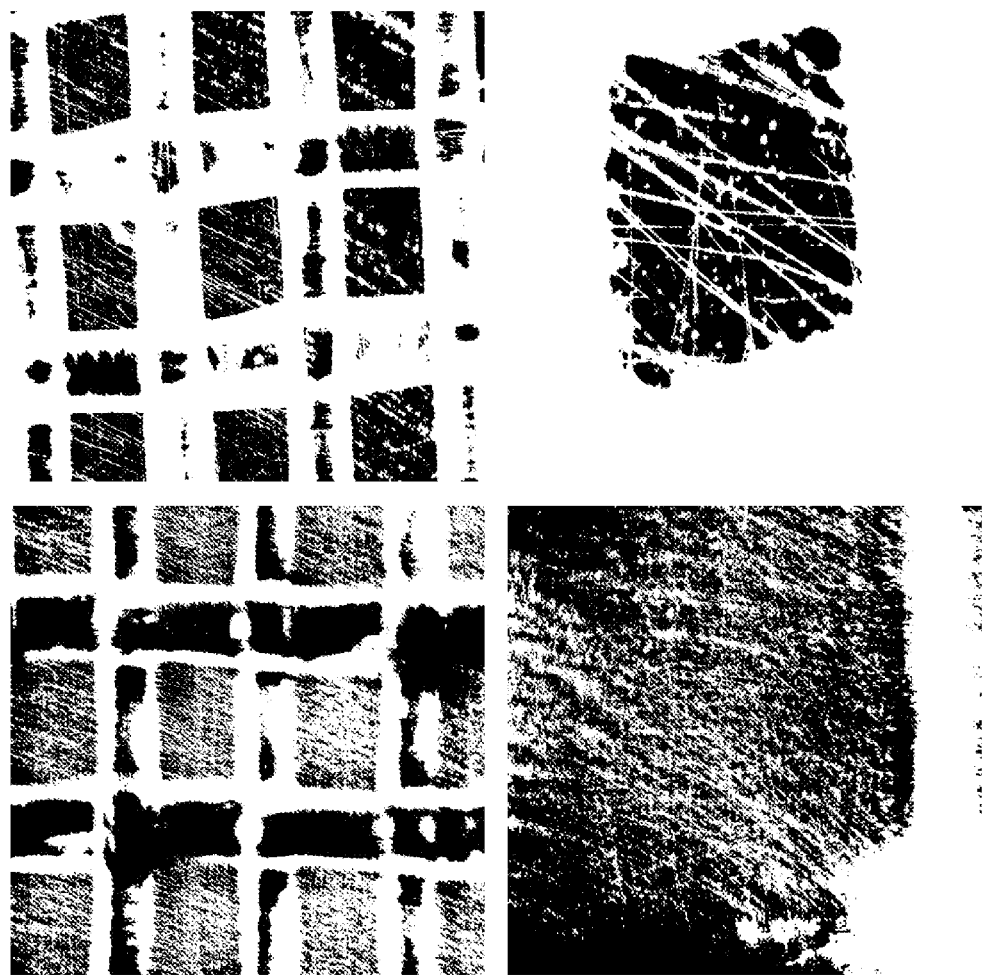
FIG. 11 shows an example of a nano-web formed by neutralizing electrospun PVP fibers with oppositely charged ethanol ions. Polyester mesh is used as a support for the nano-web.
Figure 12:
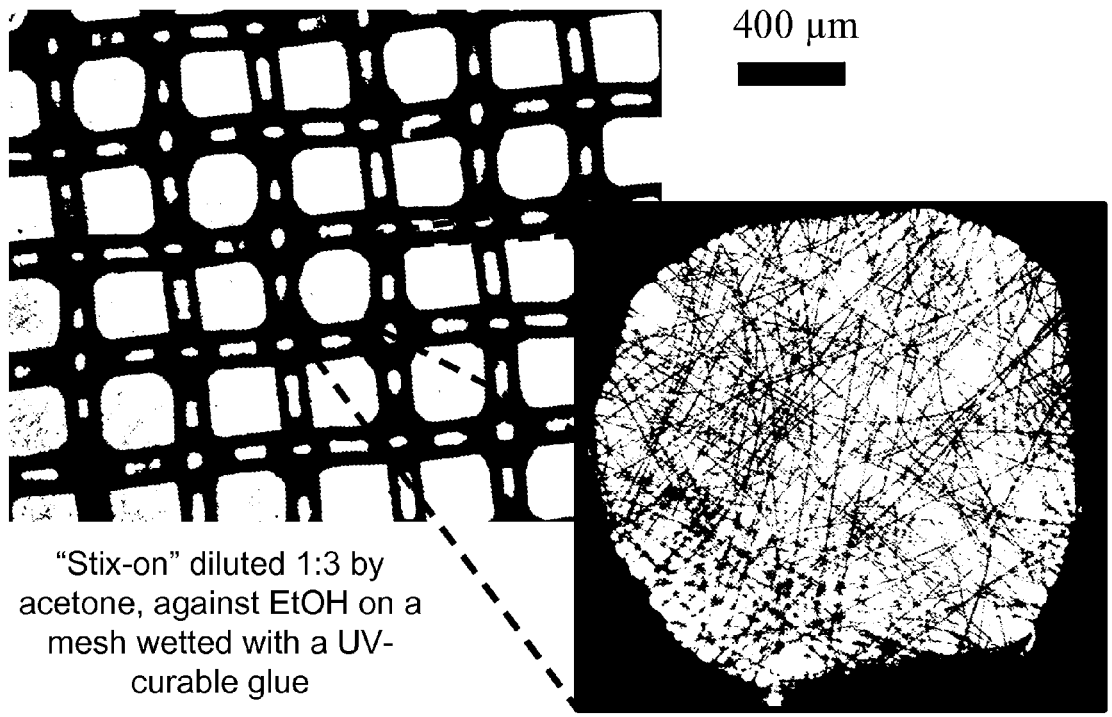
FIG. 12 shows an example of a filter manufactured from a commercial glue dissolved in acetone. Nano-fibers are glued to a polyester support (mesh) coated with UV curable glue.

In contrast, neutralization by gaseous ions tends to result in effective removal of most charges from fibers before landing on the substrate. Such removal may facilitate distribution of the fibers uniformly over the support, as seen in FIGS. 11 and 12. Thinner areas in the fiber network (such as those in a nano-mat) can be neutralized more effectively than thicker areas. In essence, more fibers may be attracted. As a result, defects may be repaired, and the thickness of the nano-mat can be kept uniform. Moreover, nano-fiber membranes can be self-assembled upon neutralization.

Figure 14:
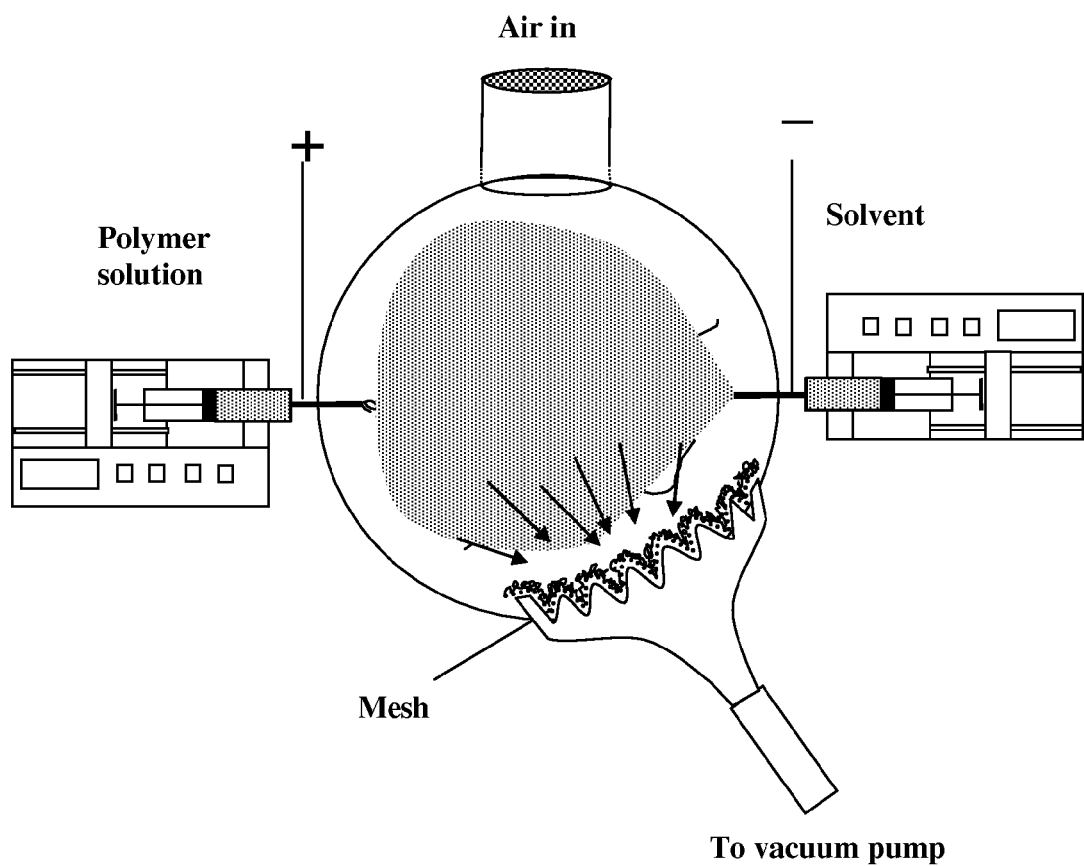
FIG. 14 illustrates filter fabrication by filtering nano-fibrous aerosol through a mesh.

In another embodiment, nano-fibers may be completely neutralized "in the air," as illustrated in FIG. 14, as opposed to using a mesh, as in FIG. 15B. Neutral nano-fibers may then be collected to form a nano-mat on a mesh by filtering fibrous aerosol. As illustrated in FIG. 14, polymer solution and pure solvent may be sprayed into a closed chamber, producing neutral fibers suspended in the air. When air is pumped through a suitable mesh, fibers may be deposited onto a mesh, making a nano-mat. The mesh can be coated, for instance, with a glue, to firmly fix the nano-mat to the mesh. Such gluing may result in a nano-filter. It should be noted that if it is desired to reinforce the neutral nano-fibers, they may also be glued together.

Since air tends to flow more rapidly through thinner parts of the nano-mat and through holes in the nano-mat, if the latter exists, the technology may provide uniform distribution of material over the entire nano-mat or nano-filter area and can "heal" defects. This technology has multiple advantages as compared to neutralization on mesh. One, mesh of any form may be used as a support, including internal surface of a long tube, for example. Deposition on such a complex concave surface is not likely performable with the arrangements illustrated in FIG. 15. Two, air resistance through the formed nano-mat or nano-filter can be easily controlled by measuring the pressure difference on the mesh, while keeping air flow constant, or by measuring the air flow rate under a given pressure on the nano-mat or nano-filter. Three, hierarchical filters can be naturally produced in which thick fibers at the bottom support thinner fibers at the top of the filter. Since thin fibers will tend to slip through the mesh at the beginning of the deposition, thick rigid fibers will likely be first deposited. These fibers may be followed by thinner fibers, when the distance between deposited thick fibers becomes smaller so that the gaps become capable of holding thin fibers. Such design may combine mechanical strength (due to thick fibers in the background) with high capturing efficiency towards aerosol particles. A network of thin fibers may be provided on top. Four, little to no preferential landing of fibers likely occurs, since the latter is likely to touch the mesh in a neutral form. In contrast, filters manufactured based on FIG. 15A show a different density in the middle of mesh cells and in the vicinity of wires (see FIG. 13 as an example).

Nano-mats introduced on the dielectric substrate, or even nano-filters, may have a rough surface. The lack of a compression mechanism schematized in FIG. 17 may result in fiber ends and trains of fibers protruding outside, making its surface appear "wooly." Cleaning such nano-mat or nanofilter from dust particles may be more difficult as compared with those fabricated using the technology visualized in FIG. 15B.

In manufacturing nano-mats or nano-filters, the surface of nano-fibers may be coated with a variety of surface modifiers. Nonlimiting examples include antibiotics (e.g., for preventing bacteria growth), glues and indicators for the presence of certain components in the air.

In another embodiment, FIG. 16 illustrates a free nano-mat suspended in a hole of a screen. The free nano-mat may be manufactured, as previously explained, by electrospinning nano-fibers from one side of a hole or array of holes in a perforated screen or mesh and neutralizing the electrospun nano-fibers with an oppositely charged electrosprayed product (e.g., counter-ions) from the other side. Free nano-mat refers to a nano-mat being suspended in the air and attached peripherally or at the edge of a substrate, as opposed to being deposited on the plane of the substrate as known in the art. An example of an apparatus suitable for such manufacturing, as well as an example of a nano-mat, are respectively presented in FIGS. 41A and 41B.

A nano-mat may also be supported, as opposed to being free. Generally, a supported nano-mat contacts the substrate in-plane.

In another embodiment, nano-aerosols may be used as nano-collectors (also referred to as "aerosol collector"). Electrospinning technology allows nano-mats to be used in filters manufactured out of polymers that tend to be soluble in water. After capturing aerosols from air, nano-mats may be dissolved in a buffer solution to liberate captured pathogens for further analysis. One advantage of such sacrificial filters involves extremely high efficiency at a low price. Their function may not be connected with any energy consumption. They can use natural air convection or wind to collect macro-particles and nano-particles. Such nano-filters may be used for routine analyses of aerosols in the environment, plants, farms, etc. In addition, such filters may be used in private homes to collect daily aerosols in search for allergens and other potentially hazardous aerosols. Moreover, as exhaled air often contains a great number of aerosol particles, nano-filters using the claimed invention can be used to collect these aerosols as probes for diagnostics of events happening deep in the airway.

Figure 18:
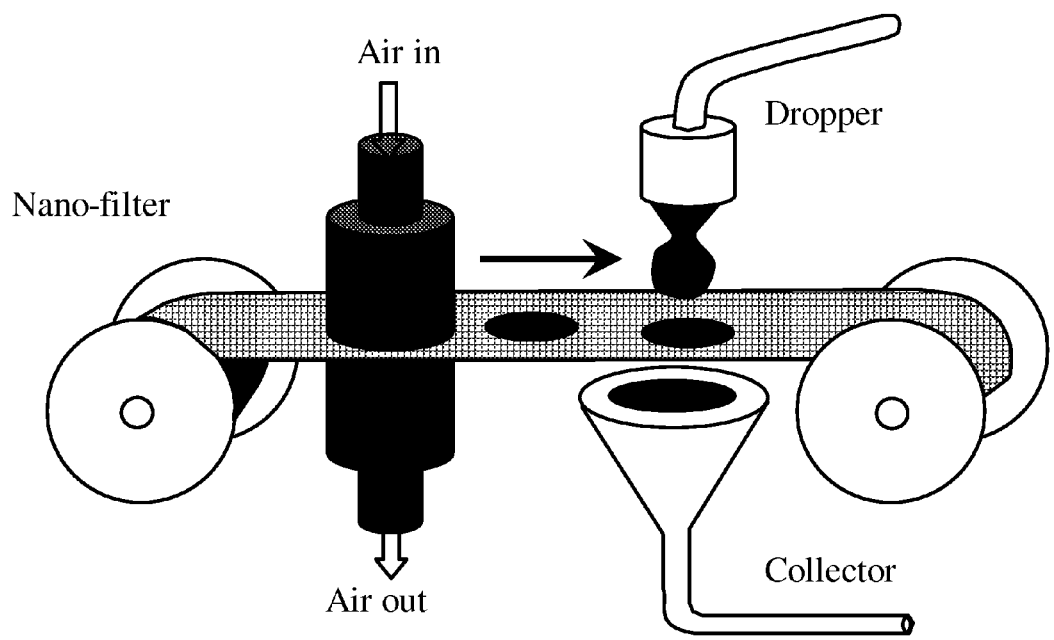
FIG. 18 shows an example of an aerosol collector based on the use of a water-soluble nano-filter.

The nano-collector may comprise of a nano-filter made of a water-soluble polymer. Illustrated in FIG. 18, a strip of the nano-filter deposited on a suitable substrate (e.g., polymer mesh) may be used to locally collect aerosol by pumping air through such filter. This part of the filter (i.e., nano-mat) may be dissolved by placing a droplet of a suitable liquid. Nano-mat material and aerosol particles on nano-fibers may be liberated into a small volume of liquid.

In determining the type of nano-filter to be used in the nano-collector, certain conditions ought to be considered. One, the nano-filter should be inert to keep pathogens and toxins intact, ready for immunoassay and other types of analysis. Two, the liquid used to dissolve the filter should be able to keep biological analytes in their native form. As these criteria may exclude organic solvents, examples of liquids include water solutions and water-based solutions. Examples of water-soluble polymers that can be considered as candidates include, but are not limited to, poly(vinylpirrolidones) ("PVP"), polyethylene glycols ("PEG"), polyvinyl alcohols ("PVA"), dextrans, carboxymethylcellulose ("CMC"), etc. These polymers tend not to interfere with immune reactions even when added at relatively high concentrations (up to about 1%). Three, the nano-filter should work in a variety of environmental conditions, both indoor and outdoor. Four, the nano-filter should also be stable upon storage. Five, the filter structure should allow air to be quickly pumped through a small filtering area (e.g., ~5-~10 mm in diameter) without the use or need of excessive pressure or vacuuming.

A problem that may arise concerns the contradictory requirement of stability at high humidity with solubility in water solutions. Possible solutions to this problem include the following. One, some polymers loose water solubility in response to changes in counter-ions (e.g., acidic form of alginic acid is insoluble in water, while sodium salt of the same polymer is water soluble). Thus, a nano-filter prepared from alginic acid is expected to be stable in humid atmosphere but soluble in a slightly basic buffer. Two, some polymers, like poly-N-isopropylacrylamide ("NIPAM"), change solubility with temperature. Three, a mild chemical reagent can be added to water to enhance polymer solubility. For example, introducing SH-groups into chains of a water-soluble polymer may allow the polymer to obtain insoluble nano-fibers due to introduction of inter-chain S—S bridges. Such fibers may then be dissolved in a water solution of beta-mercaptoethanol or some other reducing agent.

Figure 19:
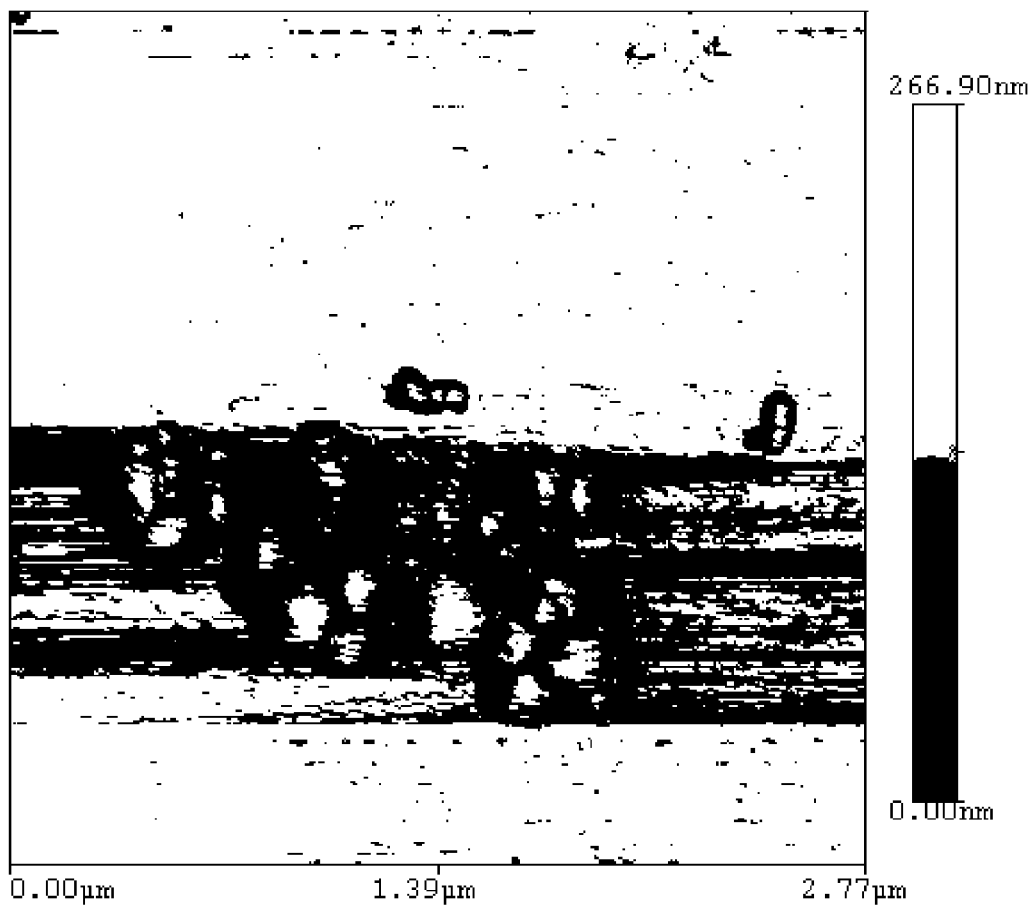
FIG. 19 shows nano-aerosol manufactured by neutralization of positively charged microdroplets of 1% solution of chicken albumin with negatively charged ethanol ions. The process was performed at a relative humidity of 85%.
Figure 20:
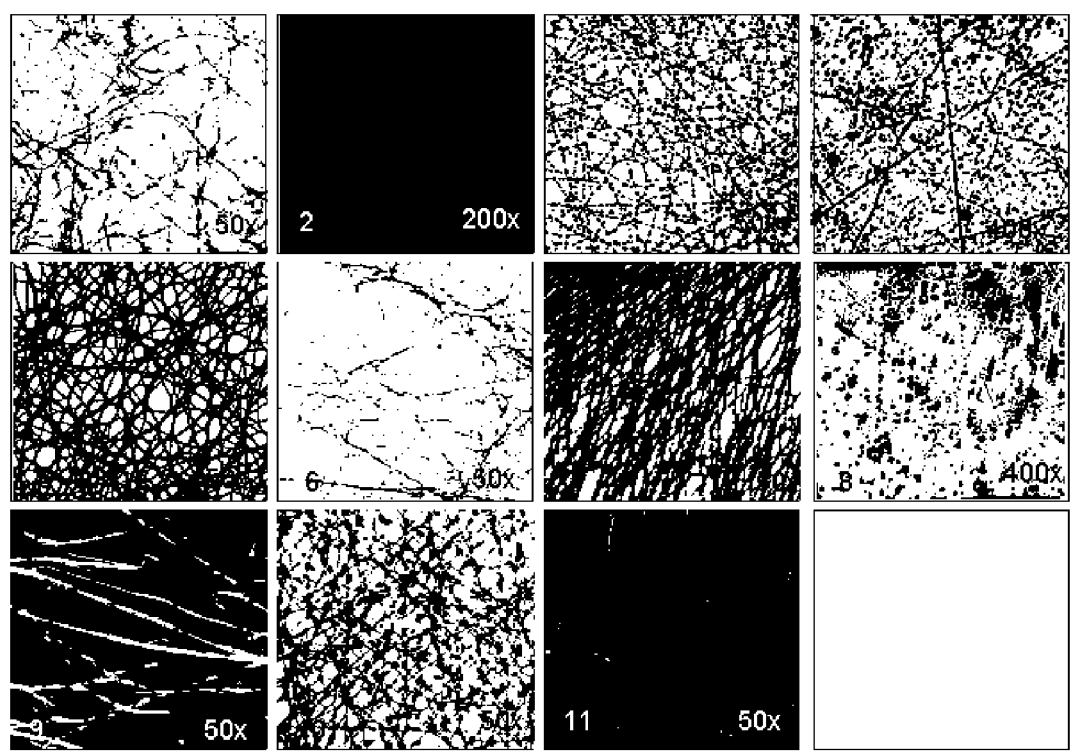
FIG. 20 shows optical images of nano-filter mats deposited onto a dielectric mesh from different polymer solutions listed in TABLE 3.

In yet another embodiment, nano-aerosols can be used in the formation of nano-beads. For instance, since ES-produced droplets of a solution can be neutralized before it reaches the electrostatic stability limit, the ejection of daughter nano-droplets as a mechanism of droplet decay may be avoided. As a result of solvent evaporation, droplet content can be concentrated in a final dry residue, as shown in the lower part of FIG. 5. Taking into account that mother droplets generated in the ES process are uniform within approximately 10% to approximately 15%, highly uniform nano-particles could be obtained. As shown in FIG. 19, highly spherical forms and smooth surfaces of the formed nano-particles can be distinguished from similar particles obtained from precipitation in solution. These spherical particles may be used as labels in different detection techniques (e.g., quantum dots) and in other applications.

In many biological applications, the surface of micro-beads and nano-beads are often coated and functionalized. Coating generally modifies surface properties of polymer materials (e.g., polystyrene, etc.) in such a way as to make it hydrophilic and charged. These properties help the polymer materials avoid bead aggregation in water solutions. Thus, in many cases, coated particles are often subjected to further modifications directed on obtaining specificity in binding certain molecules, bacteria, viruses, cells, etc. For example, antibody molecules may be adsorbed or covalently linked to the beads' surface. In contrast to conventional procedures (which employ wet chemistry), coating and functionalization procedures can be integrated using the claimed invention by neutralizing charged beads formed with electrosprayed hydrophilic polymers and/or antibody molecules. The procedure may also be applicable to manufacturing protected magnetic nano-beads. In one example of the manufacturing procedure, magnetic nano-domains are added to a bead-forming polymer solution. After drying the droplets, polymer nano-particles may be formed and may contain embedded nano-magnets. These nano-particles can be neutralized by another polymer, which coats their surface. Coating may prevent contact by the nano-magnets with the solution. As a variant of the technology, single magnetic domains can be coated by a polymer shell.

In yet a further embodiment, nano-aerosols may be used as nano-shells and/or nano-capsules. The same technique as described above for nano-beads can be employed in manufacturing nano-shells. Core nano-spheres may be formed from a sacrificial material (e.g., melamine formaldehyde, etc.) that is used in microcapsule formation in the Layer-by-Layer technique, as referenced by Radtchenko et al. (2002).

After neutralizing such nano-spheres with a suitable material and baking the material of cross-link polymer with thermal treatment (or some other treatment), as illustrated in FIG. 6, the particles in the core can be dissolved, thus liberating free capsules. Depending on the material of the nano-shell, these capsules may have different properties in terms of mechanical strength and penetrability to solvents and solutes. Specifically, such capsules can be used to slowly release drugs into the blood stream. Being filled with antibody molecules, such nano-particles can scavenge biological fluids in search of certain disease markers.

V. NANO-FILTERS

In designing nano-filters, various issues need to be addressed. These include stability under pressure, durability, and effects of humidity. Additionally, transport properties of the filters with respect to air need to be characterized. The same may need to be applied to their capturing efficiency as a function of aerosol size.

A nano-filter manufacturing apparatus may have components similar to that of the apparatus described above for nano-aerosol formation. The nano-filter manufacturing apparatus may have a chamber and a plurality of holes. At least one hole may be used for introducing air into the chamber. Two or more holes may be used for introducing ES capillaries. The chamber may also incorporate at least one port for introducing a substrate into the chamber. A distance controller may also be incorporated to control the distance between the capillary and substrate.

In another embodiment, a dielectric screen may be introduced between the capillaries. The screen may have a hole. The screen may also have a special port for its introduction into the chamber without a chamber opening.

In yet another embodiment, a mesh substrate may cover an opening in a channel connected to a vacuum pump. The chamber may have a special port for changing the substrate without opening the chamber.

A. Certain Materials for Manufacturing Nano-Filters

Numerous polymers may be used in developing nano-filters. Certain criteria may be used in selecting polymer materials. These include, but are not limited to, (i) water insolubility, (ii) lack of considerable swelling upon contact with water, (iii) solubility in common, inexpensive, low boiling point solvents, (iv) ability to produce strong fibers, and (v) ability to produce flexible fibers tolerant to mild strain. Highlighting examples of polymers used in developing nano-filters, TABLE 3 summarizes the materials and key conditions (e.g., solvent, concentration, etc.) tested. This table may also serve as a reference to optical images of the deposited fibers, as shown in FIG. 20.

Three typical patterns prevailed: straight fibers (similar to # 1, 2, 11 in FIG. 16), fibers with beads (#3, 4, 9, 10), and forked fibers (#5, 6, 7). The patterns depend on the volatility of the solvent, solution conductivity, and other factors, which must be optimized in search of the best manufacturing conditions.

TABLE 3

Summary of Polymers and Conditions Used in Manufacturing Nano-filters

| Polymer | Molecular weight | Vendor | Solvent | Conc. % w/w or w/v | Type of mat[b] |
|---|---|---|---|---|---|
| NC (Nitrocellulose, Cellulose nitrate) | 12 wt. % N Viscosity 20 cp | Aldrich, #547964, MO 63103 | Acetone 99.5% | 5 | 1 |
| CA (Cellulose acetate) | 50K | Aldrich, #419028, MO 63103 | Acetone 99.5% | 5 | 2 |
| PVC (Polyvinyl Chloride. | 233K | Aldrich, #346764, MO 63103 | Tetrahydofuran (THF), 99.9% | 5 | 3 |
| N1 (Nylon craft ribbon) | — | JKM Product Corp., NJ 08091 | Formic acid, 96% | 10 | 4 |
| PBD (Polybutadiene, cis) | 2,000K-3,000K 0.9 g/ml | Aldrich, #181-374, MO 63103 | THF, 99.9% | 10 | 5 |
| Stix-on (Adhesive) | — | Poxy Plus Inc., WI 53089 | Acetone 99.5% | (1/8)[a] | 6 |
| EZ RC (Rubber cement) | — | Monkey Grip Inc., IL 60016 | Chloroform<br>Hexane 99%<br>Acetone | (1/4)[a]<br>(1/4)[a]<br>10-40 | 7 |
| F-400 (Formula 400 Sealing/ Caulking | — | Merchant General Corp., FL 33765 | Chloroform, 99.9% | 4.5 | 8 |
| QG (Quick Grip, Adhesive) | — | Beacon Adhesives, NY 10550 | THF, 99.9% | 10 | 9 |
| CB (Craft Bond, Rubber Cement) | — | Elmer's Products, Inc., OH 43229 | THF, 99.9% | 10 | 10 |
| NM (Non woven material) | — | JKM Product Corp., NJ 08091 | Formic acid, 96% | 10 | 11 |

Notes

[a]Commercial solution was diluted by the solvent in the proportion indicated.

[b]Type of structure is presented under this number in FIG. 20.

B. Deposition Density

One of the most important characteristics of nano-filters is fiber density. This property determines air resistance and the capturing efficiency of the filter towards aerosol particles. Various techniques may be used to control the density of nano-filter deposit.

Figure 21:
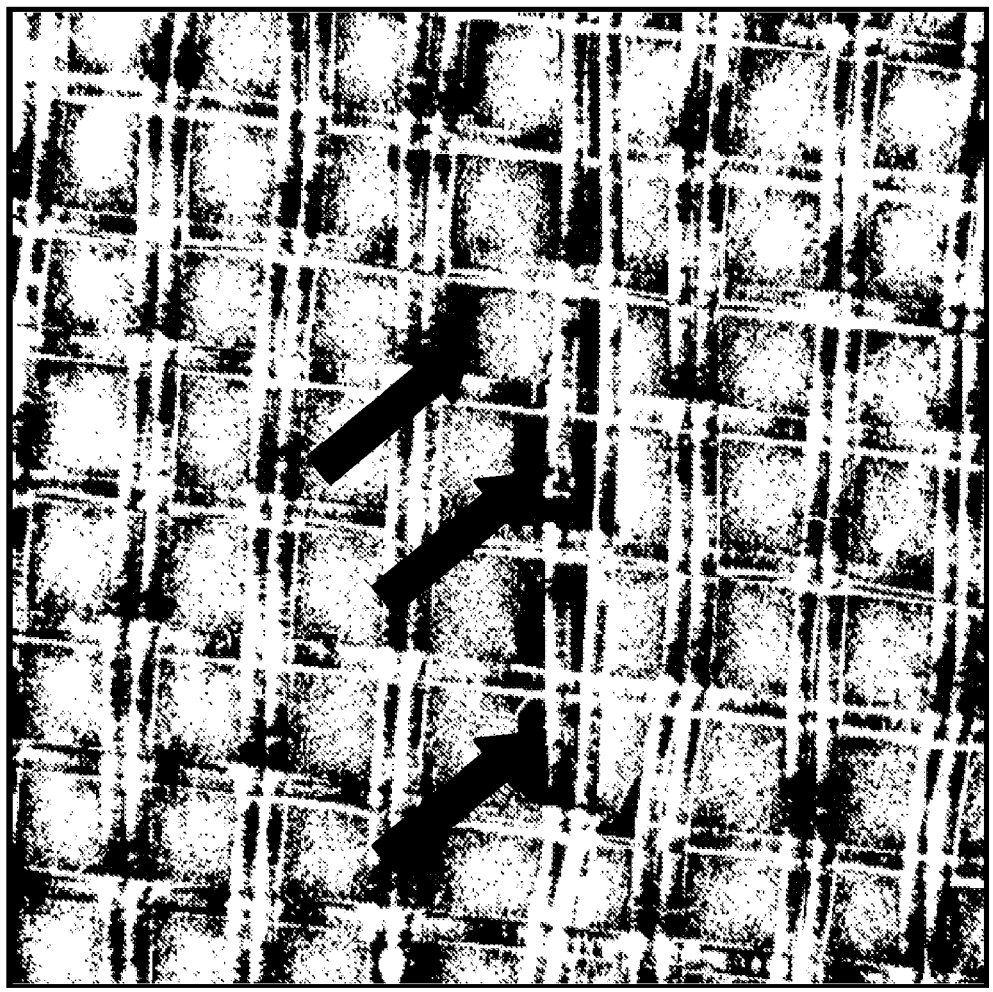
FIG. 21 shows an example of a nano-filter of electrosprayed glue, with defects created to enable measurements of the optical density of the deposited nano-mat. The brightness of the deposit was measured as a difference between average grey level of holes (dark areas, indicated by the arrows) and the intact cells. The image was taken under dark-field illumination.

An example of a technique to control the density of nano-fiber deposit is by light transmission or scattering. This optical method involves measuring scattered light intensity from the deposited layer of nano-filters. Images of the deposits may be taken at different filter locations. A small portion of the deposit may be intentionally destroyed with some sharp tip to provide a control density of bare cells. The holes, as indicated by the arrows in FIG. 21, illustrate examples of such control areas.

The brightness of the deposit may be measured as a difference between average gray level of cells covered with a layer of nano-fibers and that of control empty cells. As exemplified in FIG. 22, the radial distribution of the deposit brightness varies by less than ~10% within a central area with a radius of about 35 mm. Thus, about 20% of the total deposit area with a radius of about 70 mm may have a uniform density when deposition occurs from a capillary, which is not moved along the substrate surface.

This optical method has the ability to allow one to rapidly characterize the distribution of the deposit. However, limitations may also exist. For instance, changes in the fiber diameter and the fiber material can affect the intensity of the scattered light.

Compensating for such limitations, an improved technique may be employed. This technique involves direct weighing of nano-filters. As one example of practicing this technique, a piece of Scotch film having a size of 20 mm×20 mm may be weighed one or more times on a Cahn microbalance to determine its average weight within ±4 μg. The film may then be pressed to the nanofiber deposit. After pressing, the tape may be removed. Upon removal, deposit fragments should be transferred to the Scotch tape. The film with a layer of nano-fibers may then be weighed again, e.g., 4-5 times. The weight of fibers may be determined as the difference between the average weight of the loaded and initial Scotch tape.

Figure 22:
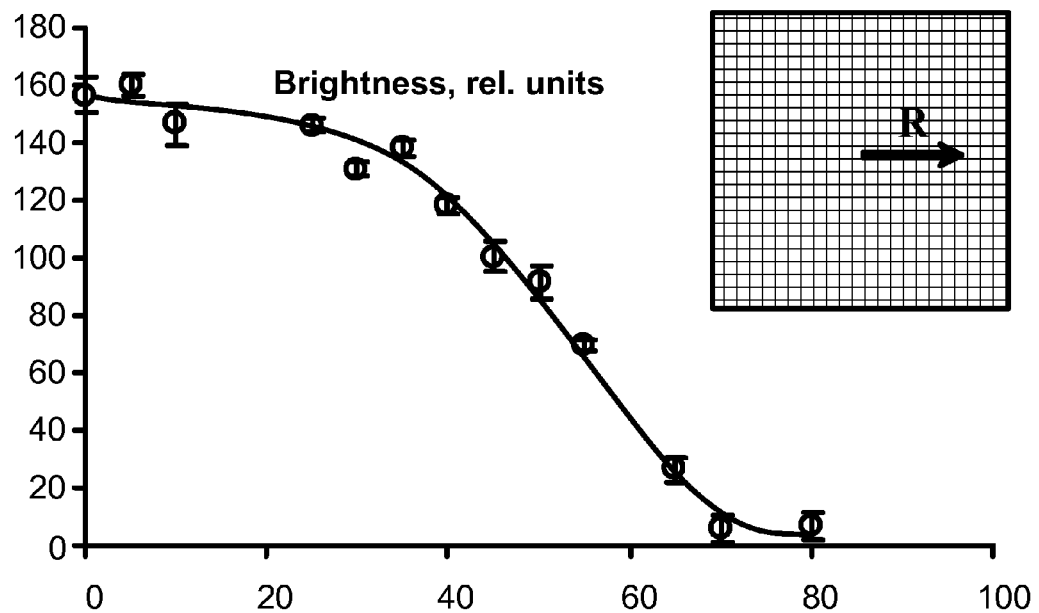
FIG. 22 shows the brightness of a nano-filter as a function of the distance from the center of deposit. Brightness was measured as described in the legend to FIG. 21. The inset illustrates the form of the deposit and defines the radius, R.

In the exemplified FIG. 22, the density of the deposit in the central area was found to be $(4\pm0.03)\times10^{-4}$ kg/m². Nano-filters with such deposition density are expected to have a Darcy flow resistance of ~$(5-7)\times10^7$ m$^{-1}$. They are also expected to capture about 99.9% of aerosol particles with a mean size of ~2-3 μm. Nano-filters with the size of a postal stamp may enable air flow of ~2 L/sec at a pressure of 5 cm of water column. These characteristics help allow the design of very small and effective protective filtering systems.

Figure 23:
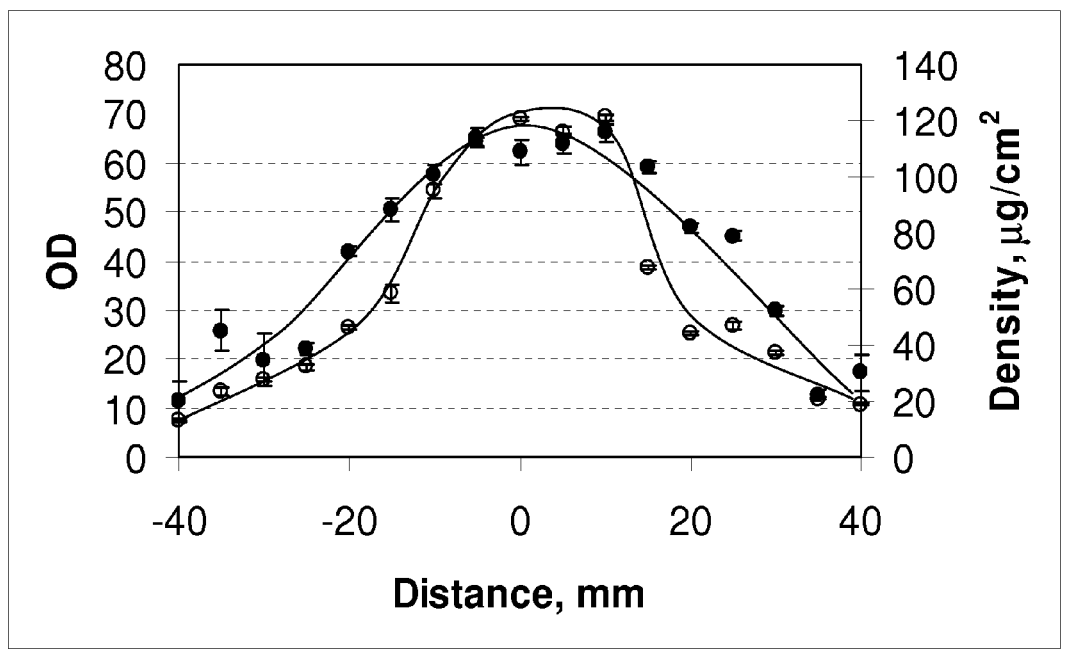
FIG. 23 shows radial distribution of the density of glue ("Stix-On") nano-fibers measured by light transmission (black circles) and by direct weighing (open circles).

Both these techniques may be used to characterize the surface distribution of nano-fibers produced from contact glue (e.g., "Stix On") diluted in acetone, 1:8 (V/V). FIG. 23 presents a radial distribution of the deposited material measured by the two methods.

Figure 24:
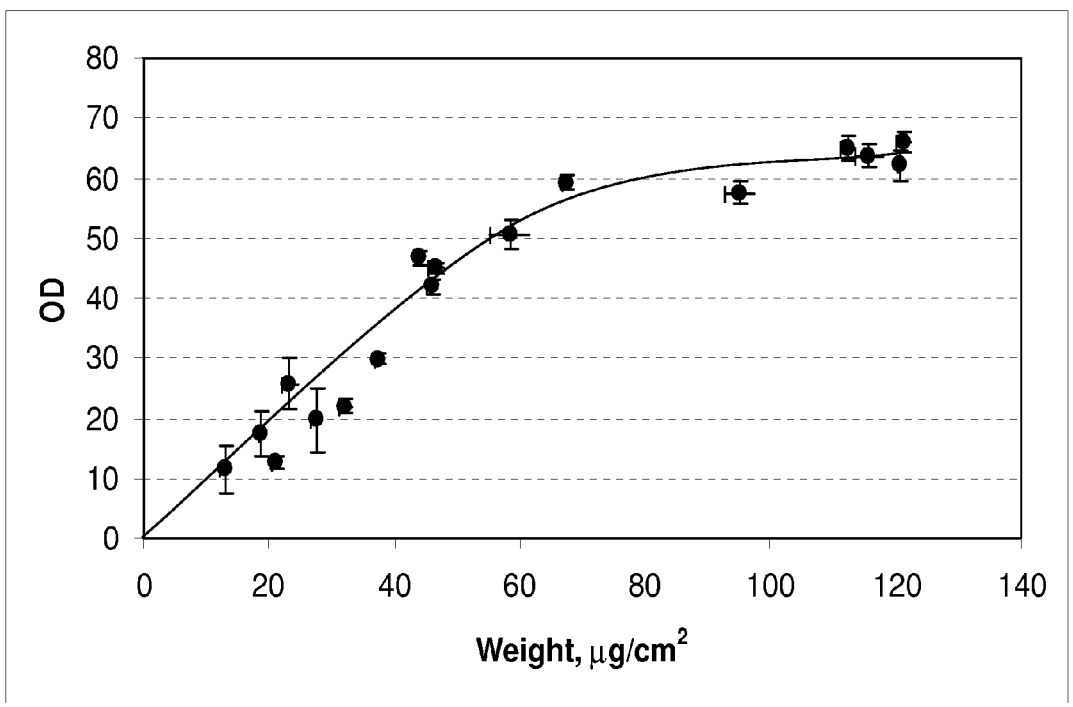
FIG. 24 shows a relation between the optical density ("OD") and mass density of the deposited "Stix-On" nano-fibers.

While the curves in FIG. 23 appear qualitatively similar, they differ quantitatively. The origin of such difference may be seen in FIG. 24, where the optical density ("OD") is plotted against mass density of the fibers. One can see that the OD increases proportionally to the mass density up to about 0.6-0.7 g/m². Any further increase in deposition increases the OD only slightly. Thus, OD can be used to characterize deposition density, provided deposition density is within the linear range. It should be noted that this dependence may be affected by the structure of the deposited fibers.

C. Aerosol Capturing Efficiency, Air Resistance, and Critical Pressure

Important practical characteristics of any filtering material include aerosol capturing efficiency, air resistance, and critical pressure. To measure these parameters, simple devices may be used.

Figure 25:
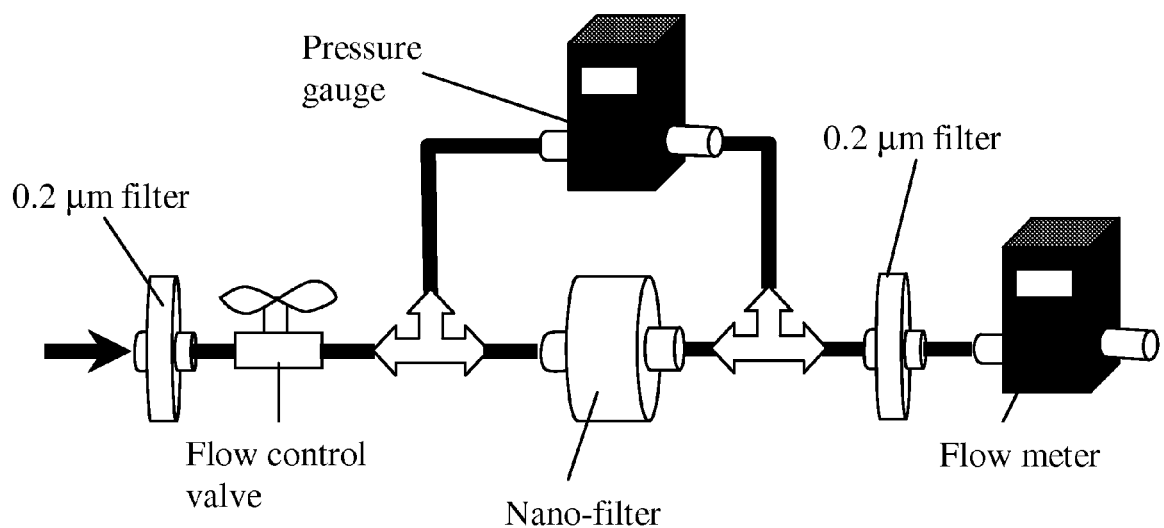
FIG. 25 illustrates an exemplified device for measuring the air resistance of nano-fiber filters.

As one embodiment, one of these simple devices is illustrated in FIG. 25. This device can enable measurements of the filter resistance to air flow, as well as measurements of the maximum pressure that the filter can withstand without destruction.

In a typical experiment, nano-fibers can be deposited onto a circular disk that is punched from a polyester mesh. The disk diameter can be ~25 mm. The disk may be attached to a hole with a similar diameter cut in a large (100×200 mm) mesh and placed in the middle of the chamber used to manufacture nano-mat(s) on the mesh. This procedure of cutting a standard size substrate mesh before deposition may help prevent the nano-filter from being damaged during the cutting procedure. Deposition may be performed at a positive potential on a metal capillary (e.g., OD=0.25 mm) connected to a syringe pump. Neutralization of the nano-fibers deposited on a mesh may be performed by a cloud of negative ethanol ions that is generated by electrospraying absolute ethanol from a glass capillary, ~20-~50 μm in OD, placed on the other side of the mesh dividing the chamber.

In another typical manufacturing procedure, as shown in FIG. 14, a mesh can be attached to an extractor connected to a vacuum pump with a tubing. Polymer fibers may be produced by electrospinning from the first capillary and may be neutralized in the air by oppositely charged electrosprayed products generated from the second capillary. Neutral fibers may be captured on a mesh by pumping air through the mesh, thus forming a nano-mat.

Quality of the deposition may be inspected under an optical microscope to ensure uniformity of deposition and lack of cracks and other defects. The nano-filter may be placed faced up on the supporting grid of the standard 25 mm filter holder and covered by another disk of the same mesh. The sandwich may be pressed with a rubber O-ring by connecting the two parts of the filter holder together.

Figure 26:
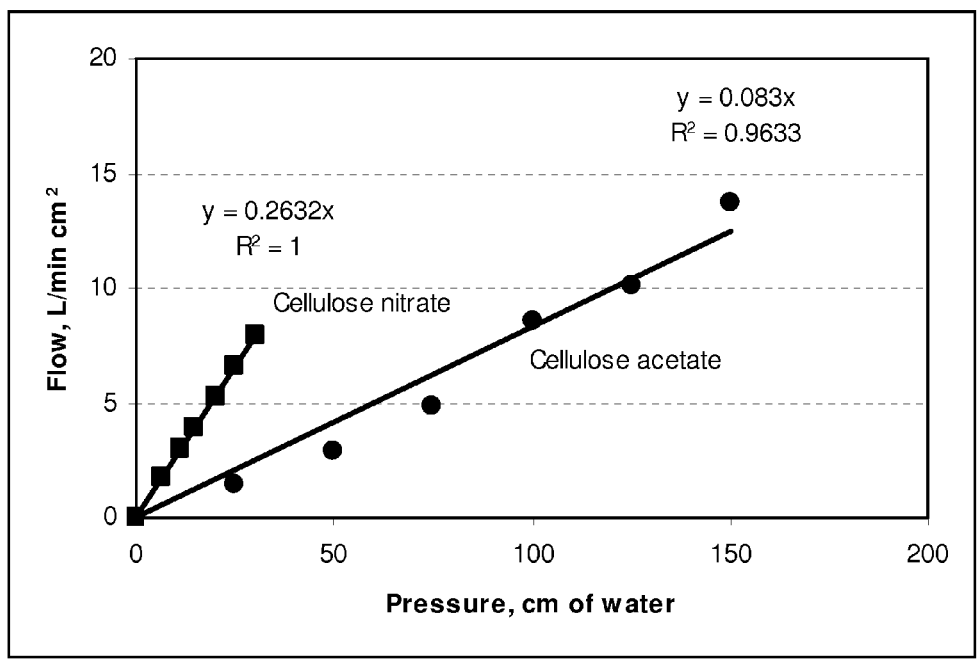
FIG. 26 shows air flow dependence on pressure difference through a nano-filter, 25 mm in diameter manufactured by neutralizing CA and NC nano-fibers on a mesh with ethanol counter-ions.

Using the device depicted in FIG. 25, a flow control valve may be used to control and/or change the flow path via the nano-filter. Differential pressure on the nano-filter sides may be measured with a flow meter. Examples of flow-pressure dependencies used to determine air resistance are represented in FIG. 26.

Figure 27:
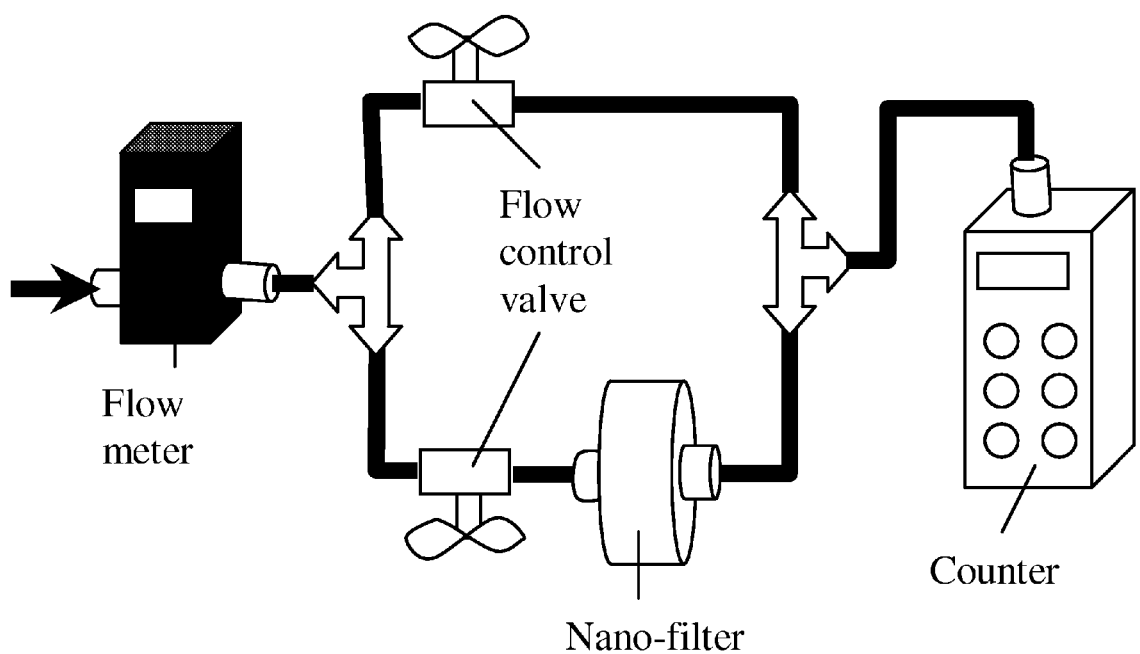
FIG. 27 shows an exemplified device for measuring the efficiency of capturing aerosol particles in the air.
Figure 28:
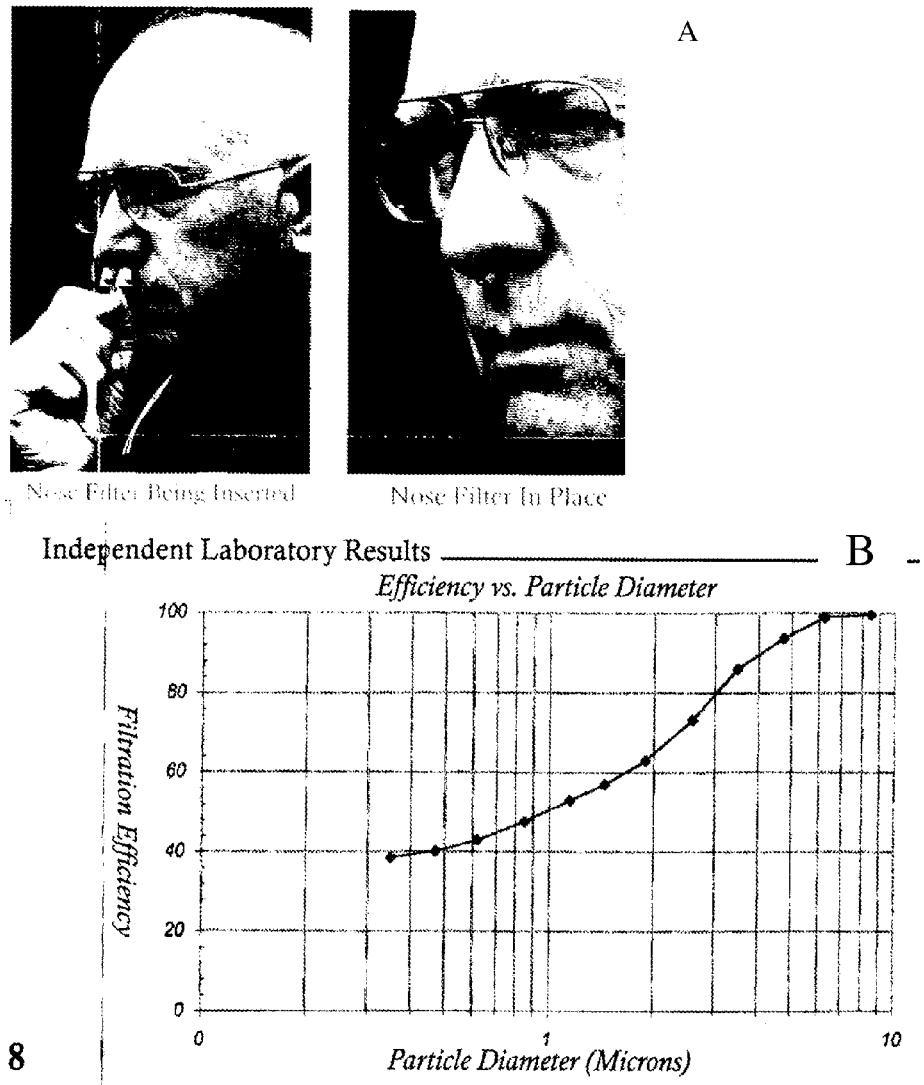
FIG. 28 shows Toby's Nose Filter, where A is the general view and installation, and B is the filtration efficiency of the filter.
Figure 29:
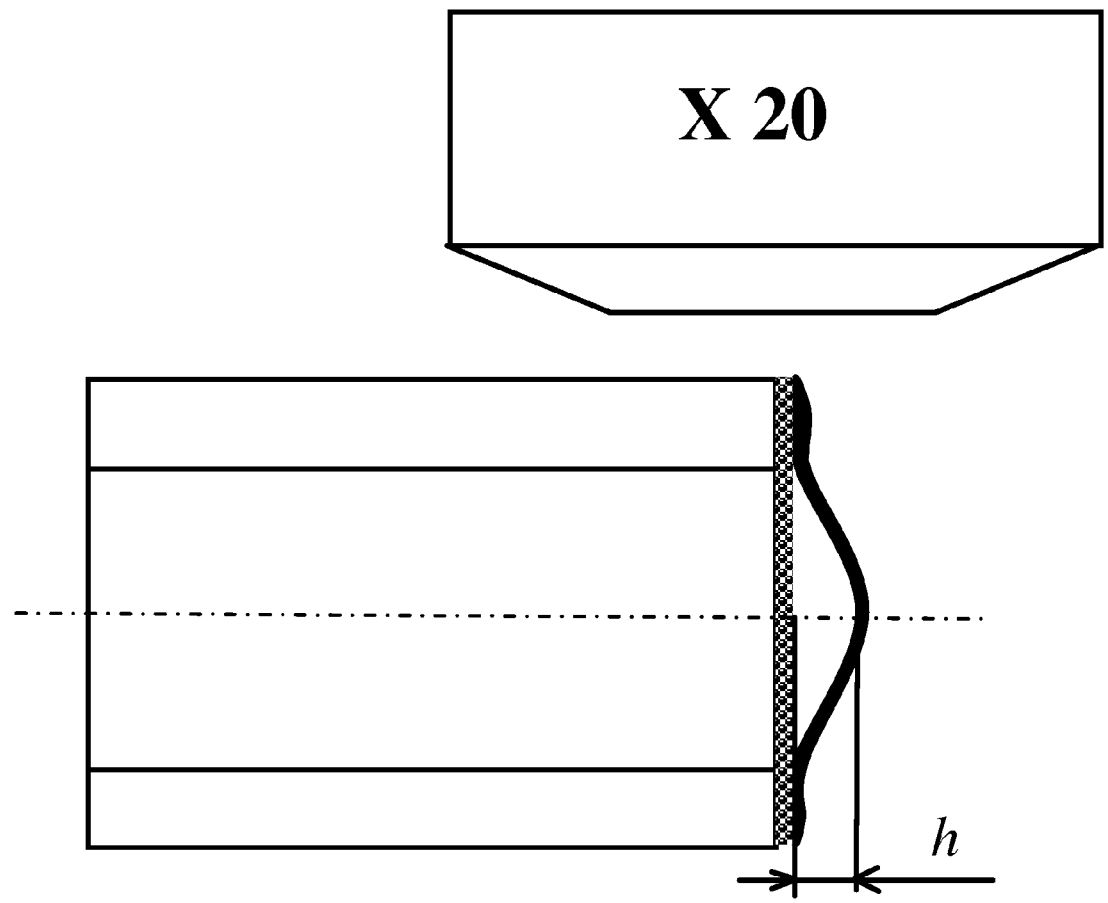
FIG. 29 shows microscopic measurements of nano-filter deformation (bulging) under applied pressure.

The efficiency of nano-filters in capturing aerosol particles may be measured by attaching the nano-filter to the aerosol particle counter. The efficiency of capturing may be characterized as a ratio of (a) the difference between aerosol concentration measured in the ambient laboratory air and its concentration in the air that passed through the filter, versus (b) the aerosol concentration in the ambient air. As illustrated in FIG. 27, a flow meter may be introduced before the nano-filter to account for the reduction of the air flow due to resistance of the nano-filter. The flow rate may be equalized through the nano-filter and the control channel by properly adjusting control valves.

D. Testing the Nano-filter

To test the nano-filter, the nano-aerosol generator may be used. Well defined amounts of fluorescent beads or quantum dots can be aerosolized and captured by the nano-filter. The efficiency of the capture may be estimated by counting the beads or dots under a microscope, such as a fluorescent microscope.

Alternatively, a nano-filter tester may be designed for testing the strength and the transport characteristics of nano-filters. Transport characteristics include (i) capture efficiency as a function of the size of aerosol particles, (ii) resistance to air flow, and (iii) maximum pressure the filter can withstand without destruction.

The nano-filter tester may include a digital differential pressure sensor a digital flow-meter, and an aerosol counter. The aerosol counter may be sensitive to particles with a diameter exceeding ~300 nm.

E. Acetate Cellulose and/or Nitrocellulose Nano-filters v. Commercial Nasal Filters Cellulose polymers soluble in acetone, cellulose acetate, and nitrocellulose can readily form nano-fibers without the formation of globular aggregates along the fibers. These nano-fibers are often strong enough to withstand ~10-20% deformations. Their availability, coupled with low price, make such polymers a good choice as materials for manufacturing nano-mats and nano-filters.

The efficiency of aerosol capture and resistance to air flow for two filters prepared from these cellulose derivatives may be measured and compared to commercially available nasal filters, such as Toby's Nose Filters of Merritt Island, Fla. As seen in FIG. 28, Toby's nasal filter has two elliptical semi-spheres with an array of holes at the bottom. A porous material with area of ~0.3 $cm^2$ and a thickness of ~5.6 mm is installed in each sphere to serve as a filter.

TABLE 4 summarizes experimental data on characteristics of nano-filters manufactured according to the claimed invention. A comparison of these nano-filters with commercial nano-filters (e.g., Toby's Nose filters) makes it clear that nano-filters of the claimed invention have considerably higher capturing ability, especially for sub-micron particles where efficiency of the commercial filter is low. In addition, the resistance of the nano-filters of the claimed invention to air is about 3 to about 5 times lower.

Nitrocellulose nano-filters provide a capture efficiency of about 2 to 3 times better than Toby's Nose Filters, while having only a two-fold larger resistance to air flow. This difference can be easily compensated for by increasing the filtration area. Being much thinner than Toby's Nose Filter, the nano-filter can be folded in order to increase the filtration area several times. This ability to fold opens the possibility of manufacturing extremely small filtering devices that are cheap and disposable.

The cellulose acetate and nitrocellulose filters may be manufactured using the sieving to collect nano-fibers neutralized in the air as described herein. It can be seen in TABLE 4 that such filters hold many, if not all, the aerosol particles with a size exceeding about 0.7 μm while providing a moderate resistance to air flow characterized by the Darcy's coefficient of ~$6.7\times10^8$ $m^{-1}$ for NC filter.

TABLE 4

Comparison of Aerosol Capture Efficiency for Cellulose Nano-filters and Commercial Nasal Filters

| Filter | Filter mass, mg/cm² | Efficiency of capture, % for aerosol size 0.3 μm | 0.5 μm | 0.7 μm | Darcy's resistance (1/m) $\times10^{-7}$ |
|---|---|---|---|---|---|
| Toby's cellulose | 110 | 56 ± 6 | 79 ± 39 | 88 | 2.45 |
| Toby's carbon cellulose | 110 | 33 ± 2 | 33 ± 10 | 39 ± 19 | 3.27 |
| Cellulose acetate[a] | ~0.003 | 95 | 100 | 100 | 1.1 |
| Cellulose acetate[b] | ~0.003 | 95 | 100 | 100 | 1.1 |
| Cellulose acetate[c] | ~0.09 | 99 | 100 | 100 | 1.6 |
| Cellulose acetate[d] | | 100 | 100 | 100 | 49.7 |
| Nitrocellulose[e] | | 74 ± 10 | 80 | 98 | 6.71 |
| "Stix-On" nanofilter[f] | 0.055 | 81 | 99.5 | 100 | 0.72 |

Notes

[a]Nano-fibers were deposited from a 10% CA solution in acetone on a polyester mesh CMY-105-D (Small Parts, Inc., FL) at the rate of 16 μL/min for 1 min. Acetone was pumped at the rate of 27 μL/min. Neutralization by 0.01% epoxy solution in absolute alcohol. Distance from the spinneret tip and from neutralization capillary to the sieving mesh was 45 mm, 1 L/min through the sieve, 25 mm in diameter.

[b]Same conditions as in (a) except for acetone rate which was 11 μL/min. Same conditions as in (a).

[c]CA solution in acetone (7.5%) with 0.1% Tetraethylammonium trifluoromethane-sulfonate (TEA) added. 30 μL/min for 2 min.

[d]Nano-fibers were deposited up to a density of 0.6 ± 0.1 mg/cm². Neutralization on mesh.

[e]Density of nano-fibers is 0.25 mg/cm². Neutralization on mesh.

[f]Commercial glue, "Stix-On", diluted with acetone, 1:4, is electrospun against pure ethanol. 2 min spinning time from single-tube spinneret.

F. Nano-mat Deformation Under Pressure—Measuring Ultimate Pressure

To further characterize nano-filters, a new technique was developed to measure deformation of nano-mats under applied pressure. This technique may also determine the ultimate pressure the nano-mat could withstand without irreversible deformation or failure. The arrangement used in these measurements is schematically presented in FIG. 29, which illustrates how bulging was measured.

In this figure, the nano-filter is glued to the end of a plastic or glass capillary having a 3 mm internal diameter. A layer of epoxy or photo-glue is applied to the end of the capillary, which is then pressed against a nano-filter that is placed face-down onto a piece of Whatman paper. After solidification, the protruding mesh is cut off with a razor blade and the capillary is fixed onto a stage of an optical microscope equipped with a crosshair scale reticle used to measure the filter bulging, h.

Poilane et al. (2002) showed that the bulging of a circular membrane, h, subjected to a pressure, P, follows the equation:

$$P=Ah+Bh^3, \text{ where}$$

$$A=(16/3)[Ee^3/(1-\nu)(1+\nu)a^4] \text{ and}$$

$$B=(2.88-0.8\nu)[Ee/(1-\nu)a^4]. \quad (6)$$

Here, E and ν are Young's modulus and Poisson coefficient, respectively, e is the membrane thickness, and a is the membrane radius. Analysis shows that at h>>e the following approximation is valid:

$$h \sim \{(1-\nu)a^4/Ee(2.88-0.8\nu)\}^{1/3} P^{1/3} \quad (7).$$

Figure 30:
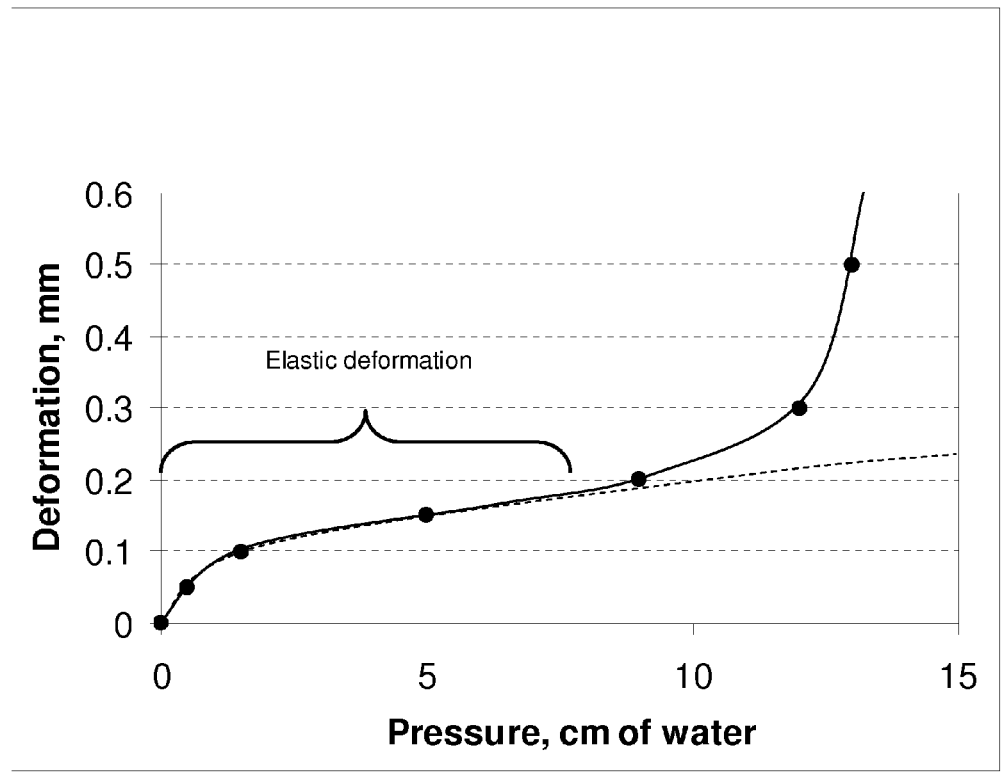
FIG. 30 shows deformation (bulging) of a CA nano-mat under pressure. The nano-mat was manufactured by sieving neutral CA nano-fibers through a mesh.

This approximation describes the initial reversible deformation of nanomats. In this experiment, the nano-mat was not glued to the mesh. Rather, it was glued to the edge of the tube. Upon pressure, application of the nano-mat was deformed independently on the supporting mesh. As illustrated in FIG. 30, bulging as a function of pressure follows the cubic root dependence up to P=~8-9 cm of $H_2O$. At P>9 cm, $H_2O$ deformation deviates from the elastic behavior, and deformation becomes irreversible, reflecting the membrane creep and failure.

The nano-filter in FIG. 30 may be prepared by electrospinning a 10% CA solution in acetone at positive potential on the CMY-0105-D polyester mesh. Neutralization may be made by spraying EtOH with 0.01% of 5 min epoxy mixture added. Measurements may be performed more that one hour after manufacturing.

It is important to note that the nano-mat usually does not break into pieces upon failure. Rather it may either produce an opening, as illustrated in Frame A of FIG. 31, or long threads, as illustrated in Frame C of FIG. 31. Such result is of practical importance, since formation of a fibrous aerosol due to nano-filter failure would likely create a problem of human protection from such aerosol.

Frame A shows failure of a CA nanofilter at pressure P=13 cm of water. The filter was manufactured on a bare mesh from 10% CA in acetone, and neutralized with electrosprayed absolute ethanol containing 0.01% epoxy.

Frame C shows the filter failed at pressure of 25 cm $H_2O$. The filter was manufactured from 10% CA in acetone against 0.1% SK-9 dissolved in EtOH followed by 1.5 min UV irradiation. Filter mass density was determined to be 0.2 mg/cm$^2$. No glue was applied on the mesh.

Figure 31:
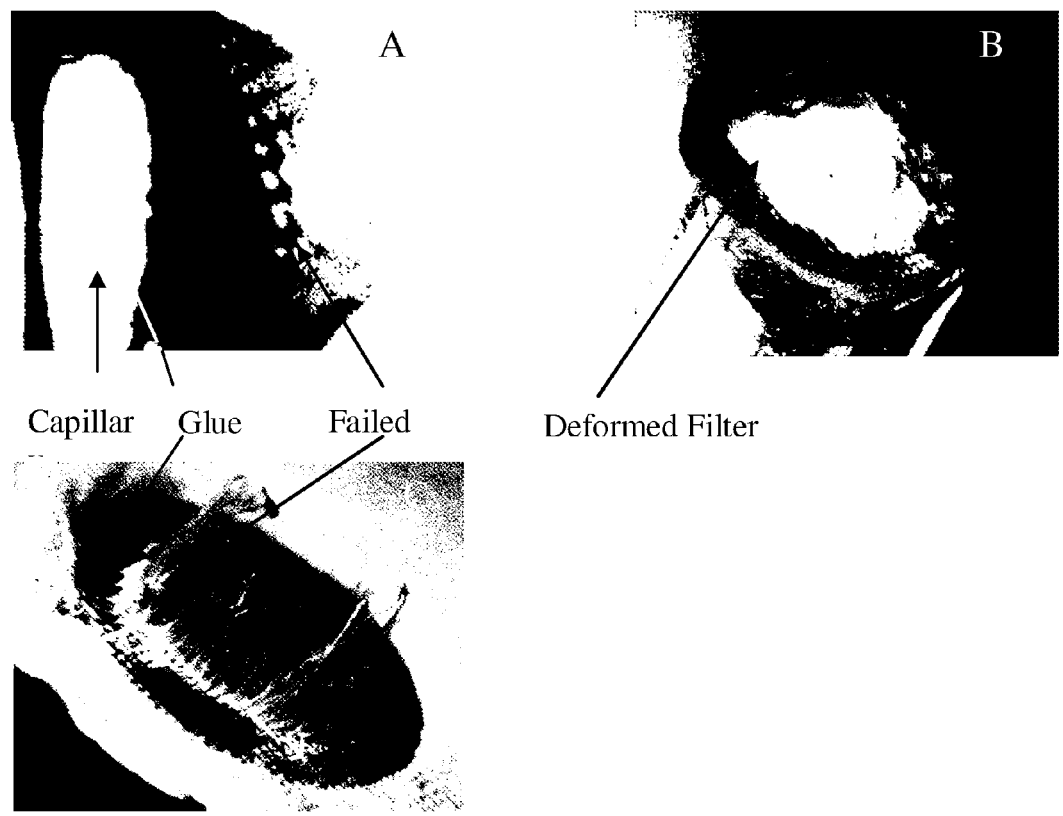
FIG. 31 shows images of filters broken by application of high pressure.

When nano-mats are glued to the mesh, as exemplified in Frame B of FIG. 31, a complete failure is not likely to be reached. Only some irreversible deformations of the whole filter accompany application of excessive pressure.

Frame B shows irreversible deformation of a CA nanofilter after applying pressure, P=100 cm $H_2O$. The filter was manufactured using a single-tube spinneret from 10% CA in acetone, neutralization by absolute EtOH with 0.1% of SK-9 photo-glue added. The mesh used for collecting neutral nano-fibers was also coated with the same glue. After deposition, the filter was irradiated by UV for 1.5 min. Filter mass density was determined to be 0.24 mg/cm$^2$.

G. Deformation and Air Flow through Nano-filters

Figure 32:
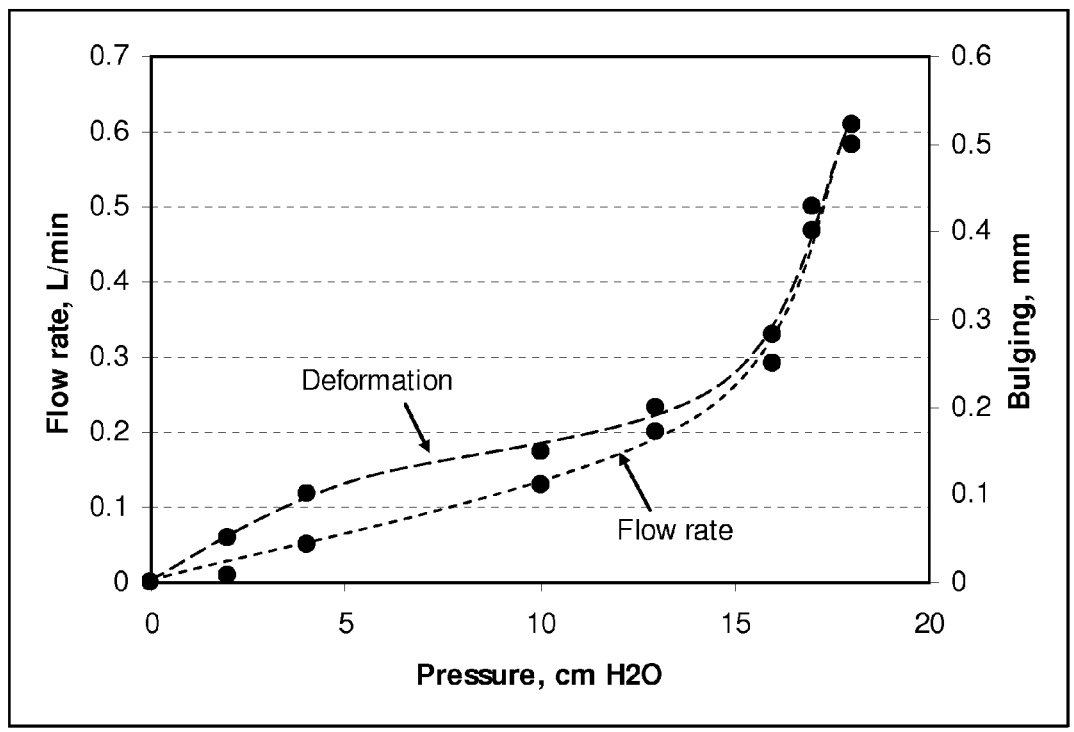
FIG. 32 shows deformation and air flow through a nano-filter as a function of pressure.

While bulging changes as a cubic root of pressure, air flow tends to be proportional to the applied pressure within the elastic deformation. This proportionality can be seen in FIG. 32, where both these parameters are plotted against pressure. Thus, notable membrane deformation within the range of elastic deformations tends not to result in changes of air flow. When nano-fibers start breaking at larger deformations, both flow rate and bulging dramatically increase at P>15 cm $H_2O$ for the filter, as shown in FIG. 32. The nano-filter was manufactured from 10% CA in acetone by neutralization with a 0.7% solution of NOA-61 photo-glue in absolute ethanol. The filter is glued to a capillary, 3 mm ID. No UV treatment. It may be concluded that the range of elastic deformation determines the working pressure of the filter. However, one should keep in mind that this critical pressure may strongly depend on the diameter of the capillary to which the filter edges are glued.

H. Nano-Filter Reinforcement

1. Cross-Linking Nano-Fibers in Nano-Filters

Various experiments have been performed to determine if nano-filters could be strengthened by the introduction of inter-filament bonds. The ES-neutralization process employed in manufacturing nano-filters allows even application of different glues to the surface of fibers by including glues in the neutralizing solution. Nano-fibers coated with nano-droplets of glue are likely to establish strong bonds upon contact.

In one series of experiments, "5-minutes" epoxy glue was freshly prepared and dissolved in absolute alcohol. This solution was used in the neutralization of CA nano-fibers. Such nano-filter displayed a notable decrease in bulging as compared to a similar filter that has been prepared without epoxy glue.

Figure 33:
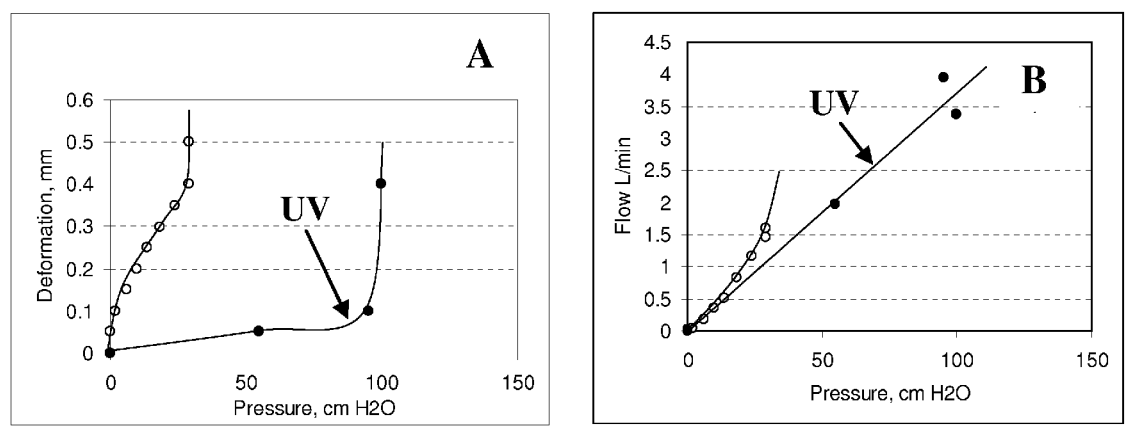
FIG. 33 shows a comparison of bulging deformation (A) and flow rate (B) in CA nano-filter before (empty circles) and after photo-cross-linking fibers (solid circles). The filters were prepared by neutralizing CA nano-fibers on a mesh with ethanol counter-ions and oppositely charged nano-droplets of UV curable glue, SK-9.

In another series of experiments, a single component acrylate/methacrylate photopolymer (e.g., SK-9, obtained from Edmund Optics, Barrington, N.J.) was added to the neutralizing absolute ethanol. From the data presented in frames A and B of FIG. 33, UV irradiation of such filters may result in a 3-fold increase in critical pressure without notably affecting the flow rate. The filters were fabricated from a 10% CA solution in acetone by neutralizing fibers on mesh with a 0.1% solution of SK-9 in EtOH. Similar results have been obtained with Norland optical adhesive, NOA-61, and with Summers UV curing lens bond, J-91, both purchased from Edmund Optics.

One potential problem that might be encountered in cross-linking with both epoxy and with photo-adhesives is incomplete solidification. Filters modified with such adhesives and then UV-cured may leave traces of liquid droplets when pressed against a clean glass surface. Thus, the data presented in FIG. 33 should be treated with caution. The notable reinforcement observed here might not be due to gluing but rather to capillary forces resulting from the presence of liquid monomers forming contacts between fibers and between fibers and the supporting mesh.

To avoid this problem, the fibers may be cross-linked by a briefly exposing the fibers of a CA nano-filter to acetone vapor. CA tends to swell in the acetone vapor, and the polymer chains acquire a mobility, which allows them to penetrate into the contacting fibers. This procedure is expected to result in self-gluing between contacting nano-fibers.

Figure 34:
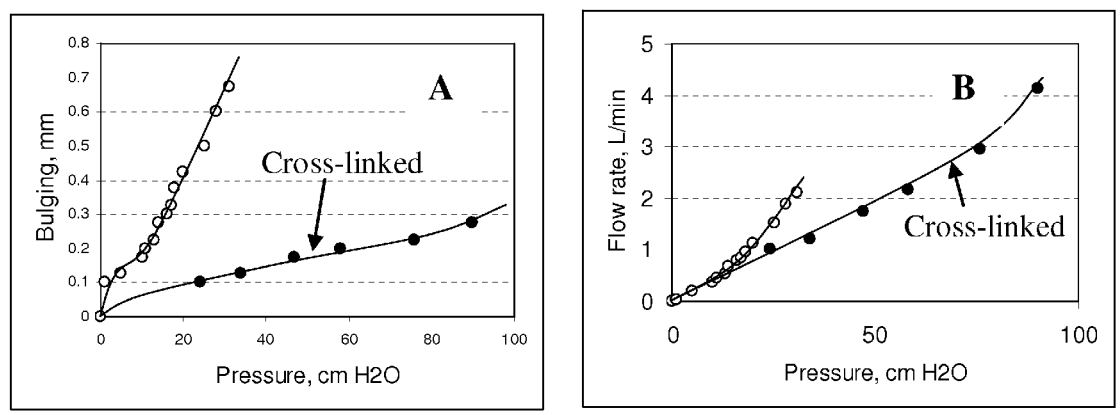
FIG. 34 shows deformation (A) and flow rate (B) in CA nano-filter before exposure to acetone vapor (open circles) and after 2 min exposure to 90% saturated acetone vapor (filled circles). Nano-mat was prepared by directly neutralizing CA nano-fibers on a mesh with ethanol counter-ions.

FIG. 34 reflects findings of cross-linked fibers of a CA nano-filter that have been briefly exposed to acetone vapor. Bulging was dramatically inhibited after exposure to acetone vapor, indicating a notably stronger structure. On the contrary, air flow was only mildly affected. This method can enhance nano-filter reinforcement because of its simplicity, and it can be suitable for industrial manufacturing.

2. Gluing Nano-Mats to a Mesh

Considering small nano-mat bulging, if h<<a, that is the amount of bulging is much less than the membrane radius, the following equation can be obtained for the membrane strain:

$$\in = (1/6)(h/a)^2 \quad (8).$$

From (7) and (8), it appears obvious that the critical pressure, $P_{cr}$, is related to the critical strain, $\in_{cr}$, as:

$$P_{cr} = C \in_{cr}^{3/2}/a \quad (9)$$

where C is a coefficient dependent on E, e, and ν.

From this simple analysis, it may be concluded that by decreasing the diameter of a frame to which the nano-mat is attached, the critical pressure can be enhanced without any changes in the filter structure itself. Thus, taking from FIG. 34 that $P_{cr}=10$ cm $H_2O$ for the circular frame with a diameter of ~3 mm, it can be estimated that after being attached to a mesh with ~0.1 mm openings, the critical pressure will likely increase to ~0.3 atm. Combining this reinforcement with approximately a 10-fold increase in the nano-mat strength after cross-linking in acetone vapor (see FIG. 34) $P_{cr}$ may be raised to ~3 atm. The latter value will probably suffice for most practical applications of nano-filters.

VI. SPINNERETS

Experiments conducted on electrospinning of polymer solutions previously described employ the simplest spinneret, which consists of a thin hypothermal needle, approximately 0.2 mm in OD. This simple design has one major drawback when applied to electrospinning of polymer solutions. Parts of the solution dried at the tip tend to cause clogging. This dry deposit may change the electrospinning conditions, and may also completely stop the spinning process. To solve this problem, two different designs may be used.

Figure 35:
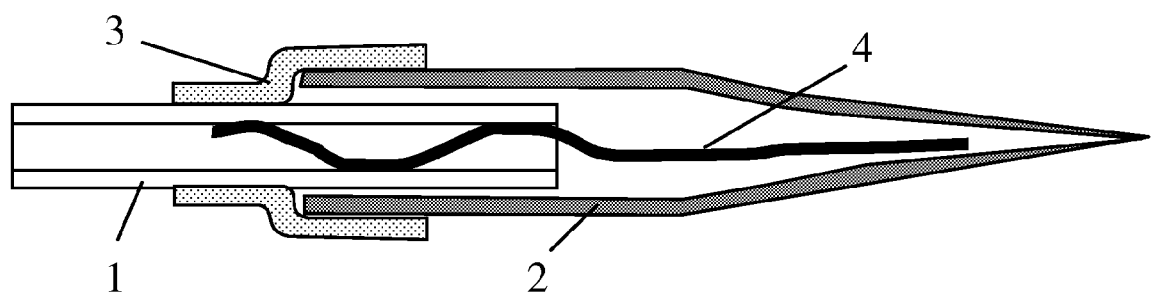
FIG. 35 shows an exemplified design of a spinneret with a thin capillary tip, where 1 is metal tip, 2 is glass capillary, 3 is rubber tubing and 4 is platinum wire.

In the first design, as illustrated in FIG. 35, the diameter of the capillary tip may be reduced dramatically in the hope that more effective spinning from thin tips (20-50 μm in diameter) might prevent formation of the dry deposit. A glass capillary (2) may be attached onto a hypodermic needle (1) with a heat-shrinkable plastic tube (3). A platinum electrode (4) may connect the polymer solution to a high-voltage power supply. Testing this spinneret with a 10% CA solution showed that it may also suffer from tip fouling with dried polymer.

Figure 36:
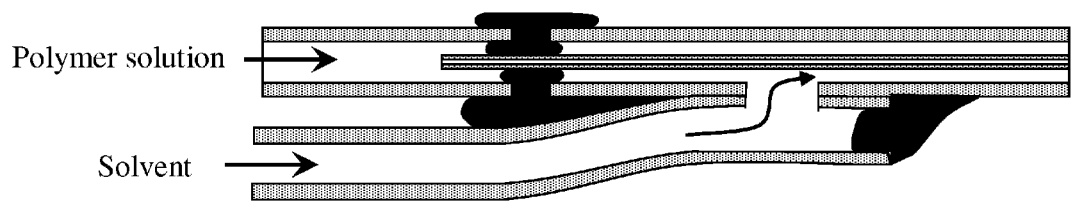
FIG. 36 shows an exemplified coaxial spinneret capable of enabling electrospinning of polymer solutions through solvent to prevent formation of dried polymer at the end of the spinneret. Black area represents welding.

Hence, in another design, as shown schematically in FIG. 36, the polymer solution is sprayed from a thin (0.2 mm OD diameter) stainless steel tube inserted into a larger stainless steel tube, 0.5 mm in diameter. The solvent can be slowly pumped between the two tubes, thus preventing formation of dried polymer at the tip.

The coaxial spinneret was successfully used in electrospinning of CA solution in acetone. No dry deposit was observed upon electrospinning of this solution, which is particularly prone to formation of dry deposits due to the high volatility of acetone.

VII. EXAMPLES

A. Example 1

Formation of a PVP Aerosol

In this example, 10 μL of 5% PVA solution in water was loaded into the capillary connected to the positive potential. A 50% ethanol solution was placed into the opposite capillary to neutralize the cloud of PVA particles. At a voltage of about 6-about 8 kV and a current of about 30-about 50 nA, an aerosol cloud was formed in seconds. The aerosol cloud was readily observed by passing a laser beam through the chamber. Unlike charged aerosol clouds, which disappeared in ~2 to ~5 sec after switching off the power, it was found that the neutral aerosol was still visible within the chamber up to about 10 to about 15 min after the voltage was disconnected. Such stability is a strong indicator of aerosol neutrality. In contrast to charged aerosols, particles in a neutral aerosol cloud are much less prone to interactions with chambers walls and are less likely to deposit there.

Since neutral aerosols decays in ~10 min, one can estimate the stationary concentration of the aerosol as following. Taking into account that ~$10^7$ microdroplets per second are ejected from the capillary into the chamber with a volume of ~$10^{-3}$ m$^3$, and that the stationary level is achieved in about 600 sec, it can be estimated that the stationary concentration is ~$10^7 \times 600/10^{-3} = $~$6 \times 10^{12}$ microdroplets/m$^3$, which can be thought of as rounded to ~$10^{13}$ microdroplets/m$^3$. For particles ~10 nm in diameter this stationary concentration corresponds to a substance concentration of ~10 μg/m$^3$. This concentration is about 100,000 times larger than aerosol concentrations in clean atmospheric air. It is likely that part of the aerosol will aggregate in ~10 min.

Passing air through the chamber did not change the electric current, indicating that electrospraying continued even when the air flow reached ~1.5 m/sec. No aerosol cloud appeared visible inside the chamber with the air passing through.

B. Example 2

Deposition of Aerosol on Chamber Walls

In this example, 10 μL of 0.5% methylene blue dye in 50% ethanol was electrosprayed at the positive potential against negatively sprayed 50% glycerol at a voltage of about 6-about 9 kV and a current of about 0.7-about 1 μA. The glycerol droplets formed a readily visible aerosol. Approximately 1 mL of water was then placed into the chamber; the water was moved over the walls to collect the deposited dye. When the OD of the dye was measured at ~608 nm relative to the wall area from which the aerosol was collected, it was found that about twice as much aerosol was deposited at the chamber bottom as compared to the top. Deposition on vertical walls was intermediate between the top and the bottom values. Such difference in deposition can be explained by the relatively large size of the aerosol (approximately more than 1 μm), which may be subjected to gravitational force.

C. Example 3

Formation of Molecular Nano-aerosol

In this example 0.05% PVP solution in water was electrosprayed from a positively charged capillary against pure ethanol electrosprayed from a negatively charged capillary. In contrast to the experiment described in Example 1, no visible aerosol was apparently seen upon illumination the chamber with a laser beam. However, freshly cleaved mica placed at the bottom of the chamber for ~5 min was covered with dots at approximately 2.3±0.6 nm high, as seen in FIG. 37. The density of dots was about 10 particles per square μm. It was estimated that the height corresponds to a hemisphere comprising a single polymer molecule with an average mol. mass of 200 kDa. The average surface density of the nano-particles deposited on mica in T=5 min was measured as N=10 particles per square micron. With the diffusion coefficient expected for such particles in the air (D=~$10^{-3}$ cm$^2$/sec) and the thickness of an unstirred layer over mica surface (H=1 cm) the stationary concentration of nano-aerosol (C) is roughly estimated as C=~NH/DT=~$3 \times 10^{15}$ particles/m$^3$ (i.e., nano-particles are separated by an average distance of 7 μm). The estimated nano-aerosol concentration is approximately 100 times higher than those reported for the commercially available ES-based aerosol generator, such as those by TSI Inc. of Shoreview, Minn.

D. Example 4

Formation of a Water Soluble Filter on a Mesh

Figure 38:
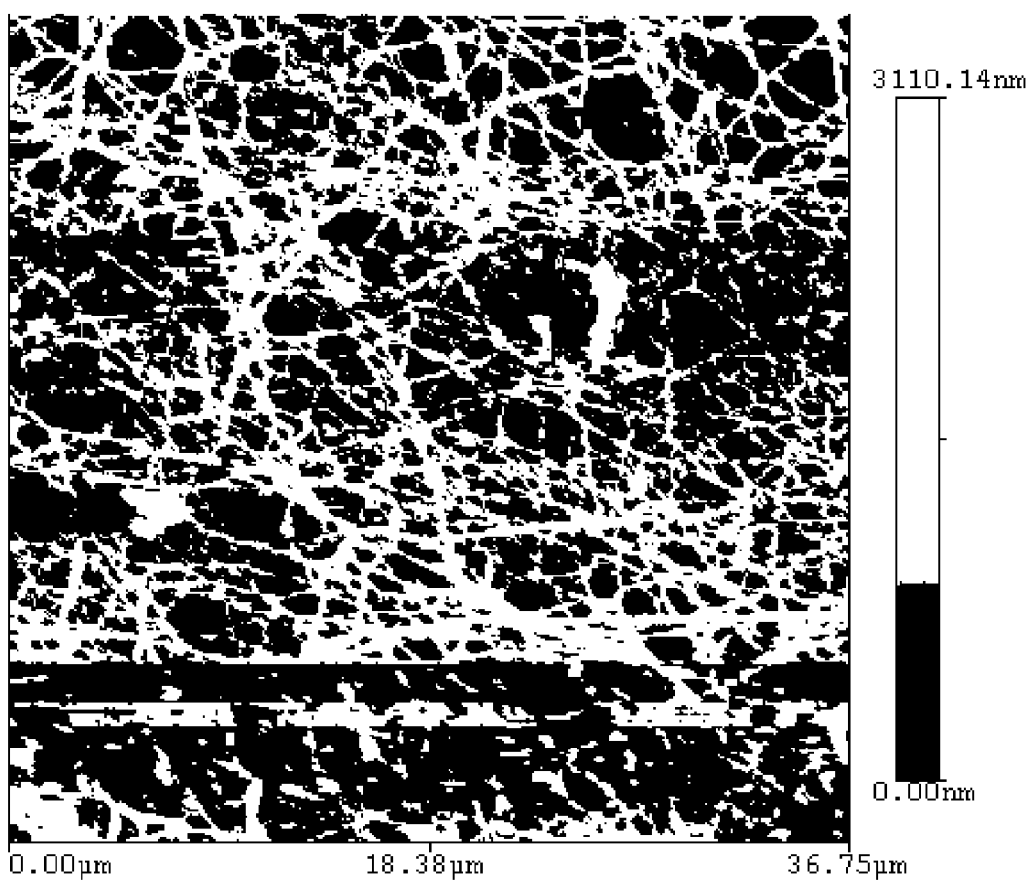
FIG. 38 shows an AFM image of a free nano-mat formed by neutralization of PVP nanofibers by ethanol ions. The nanomat was transferred onto a glass substrate for imaging.

A solution of 7% PVP was electrosprayed from the positive capillary against ethanol in the negative capillary. A dielectric mesh was introduced between the capillaries as shown schematically in FIG. 15B. After ~5 min deposition, the mesh became coated with a layer of thin fibers visible in an optical microscope with a dark field illumination. A few images of such coating are presented in FIGS. 11 and 38. It appears that the nano-web layer completely dissolved upon contact with water.

In the conventional technique of fabricating nano-filter by ES deposition, nano-fibers may be deposited on a metal mesh, as shown in FIG. 15A. Alternatively, nano-fibers may be deposited on a layer of carbon particles as a conducting support. Neutralization of nano-fibers may occur due to the motion of charges along the nano-fibers to the metal support. One may expect that parts of the forming membrane close to the metal wires will lose their charges first, and hence, became available for further deposition. Membrane thickness notably varies, displaying more dense packing close to contacts with support.

In another similar experiment, fibers were neutralized by electrospraying a solution of sodium fluorescein in ethanol. When viewed under an optical microscope, the fibers have a uniform yellow color. They were visible in a fluorescence microscope. The visibility indicates that fluorescein is likely to be uniformly distributed over all the surface of the electrospun fibers. This experiment demonstrates that a second substance (e.g., glue, antibiotics, disinfectants, etc.) can be introduced into nano-fibers during manufacture.

In yet another experiment the mesh separating the capillary was removed. In a few seconds after starting the process fibers became visible in the chamber floating under action of ionic winds. After certain time fibers formed, flocks, free webs and flat nano-mats soon became attached to the chamber walls.

E. Example 5

Formation of a Free Nano-Mat

It was found that upon deposition of nano-fibers electrospun in positive mode from about 10% water solution of PVA against absolute ethanol, flat leaflets are formed not only on the polyester mesh, as in the previous example, but also in other places of the chamber. This process was performed at a voltage of about 10 kV, current of about 100 nA, and a flow rate of ~5-~7 μL/min. Humidity was supported below 20%.

The free membranes with a size of a few square centimeters have a bluish color and an optically flat surface reflecting light. One of such films was attached to a microscope slide and subjected to AFM study. It was found that the film studied includes a flat network of welded nano-fibers at approximately 400 nm high. An AFM image of a thin part of such nano-mat is presented in FIG. 38. The total height of the film did not exceed ~1-2 μm.

Figure 17:
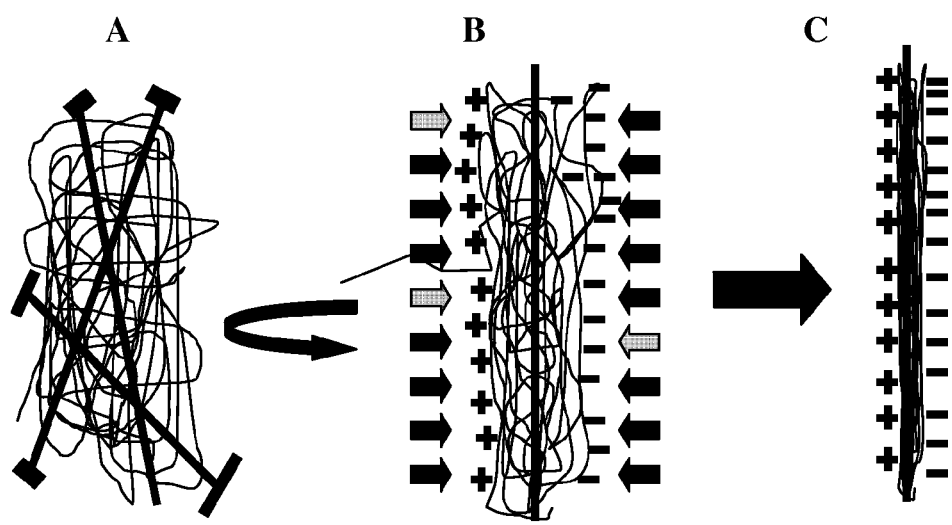
FIG. 17 shows an exemplified mechanism of forming free nano-membranes (nano-mats). (A) and (B) are frontal and side views of the mat formed on fibers (dark lines) which occasionally attach to the chamber walls, to mesh threads or to a frame. (C) illustrates the final state of the mat after the fibers have collapsed into a film due to electrostatic forces.

Formation of such thin nano-mats can be explained by the mechanism of neutralization, as shown in FIGS. 16-17.

In FIG. 16, the formation of free nano-mat in a hole dividing chamber into two compartments is shown. This view is followed by the free nano-mat's transfer to a supportive mesh. In the left compartment, nano-fibers are produced by electrospinning. In the right compartment, neutralizing counter-ions and modifier' ions (fluorescent molecules, glue molecules and nano-droplets, antibiotics, etc.) are formed.

Indicated in FIG. 17, nano-fibers landing on one side of the film and neutralizing ions landing onto the opposite side can make these sides electrically charged. Mutual attraction of these charges creates a pressure, which squeezes the mat material into a thin film. This mechanism explains the uniform thickness of the film and its optically flat surface. Thin areas on the growing membrane tend to "discharge" more rapidly. Rapid discharge generally attracts more charged nano-fibers. As a result of a preferential landing on thinner parts of the surface, the overall thickness of the membrane can be kept equal. The same mechanism should work in repairing defects, e.g., holes in the membrane.

F. Example 6

Formation of Filamentous Protein Nano-Aerosol

Gelatin A (Sigma product) was dissolved in water to a concentration of about 0.4% and dialyzed against double distilled water. The solution was electrosprayed at a positive potential against negatively electrosprayed 1% glutaraldehyde dissolved in absolute ethanol. The relative humidity in the chamber was supported ~85% during about 5 min of spraying. Freshly cleaved mica was exposed into the chamber throughout all the spraying. The mica was then scanned with AFM under dry air. Two types of clusters have been found: round flat semi-spheres (~1.2-~1.6 μm in diameter, ~20±3 nm high) and nano-clusters with the height of ~4.4±0.5 nm. It was estimated that the volume of the first species corresponds to the dry residue of a droplet with a radius of ~1 μm, which is close to the radius of mother droplets generated in the ES of well dialyzed solutions. Thus, one may conclude that at relatively high humidity, microdroplets may become neutralized before electrostatic decay starts. It may be assumed that the second 4.4 nm species might be nano-clusters of cross-linked glutaraldehyde.

In the second experiment, the same gelatin solution was sprayed at ~20-~30% humidity against pure ethanol. In contrast to the previous result, where a single fiber was not found, branched fibers with dimensions of about 2 nm to about 10 nm high, and about 1 μm to about 10 μm long were the predominant species in the AFM images. This experiment shows that dry nano-fibers tend not to collapse as a result of neutralization. It also shows a drastic effect on the final type of aerosol depending on the conditions at which the process of aerosol generation and neutralization occurs. Thus, humidity or relative vapor pressure of solvents is an important parameter to control the ES-based aerosol generator.

G. Example 7

Formation of Spherical Protein Particles by Electrospraying-Neutralization Process Ovalbumin (Sigma product) dissolved as 1.1% solution was thoroughly dialyzed against water and electrosprayed at a humidity of ~83%-~85% for about 10 min at a positive potential on the capillary. Absolute ethanol was sprayed from the opposite capillary. The process was performed with a voltage difference between the capillaries of about 9 kV and a current of ~40-~60 nA. Mica pre-coated with a monolayer of albumin was placed at the bottom of the chamber.

The mica was then placed for ~15 min in a Petri dish filled with vapor of ~25% glutaraldehyde solution. AFM was performed in a tapping mode under dry air. Particles with the height of ~160±40 nm were predominant in the image. These particles were observed both as separate particles and as "grapes" of aggregated particles. An image of such aggregate is presented in FIG. 19. Considering a spherical form for the particles, and assuming that the measured height is equal to the particle diameter, it can be estimated that the droplet from which the final bead was originated should have a diameter of approximately 0.7-0.8 μm. This size is close to the size of mother droplets generated in the ES. Thus, one may conclude that in humid atmospheres (as performed in this experiment) mother droplets were neutralized before they reached the Rayleigh limit of electrostatic stability. Also, one may conclude that most, if not all, of their content was concentrated in the residual particle. This scenario may be depicted in Part II of FIG. 5.

H. Example 8

Manufacturing of a Non-woven Nano-Filter from a Water-Insoluble Polymer

Commercial glue (e.g., Stix-on contact glue made by Power Poxy of Sussex, Wis.) was diluted 2.5-fold with acetone. A syringe was filled with this solution and the former was placed onto a syringe pump. The end of a syringe needle (e.g., 25G5/8) was rounded and connected to a positive electrode of a high voltage power supply. The negative electrode was connected to a platinum wire inside a glass capillary filled with absolute ethanol. Both the needle and the capillary were inserted into the generator chamber. A polyester screen having a size of about 6×4 cm was positioned in the middle of the chamber. The mesh was pre-coated with the optical cement (such as J-91 made by Edmund Optical of Barrington, N.J.).

Nano-filter manufacturing was performed for 5 min at a flow rate of ~9 μl/min, at a voltage difference of ~7-~10 kV, and at a current of ~100-~300 nA. To prevent accumulation of acetone vapor in the chamber, air was slowly pumped out of the chamber. Coating was observed on the mesh together with the formation of free mats at the chamber edges and at the edges of the mesh.

The mesh was placed under a UV lamp for 3 min to solidify the glue and to bind nano-fibers to the woven support. By touching the filter with a sharp needle under a low-power microscope, it was determined that the layer of nano-fibers cannot be detached from the support, in contrast to the untreated mesh. It was also found that this layer can be deformed substantially without breakage and without inducing irreversible deformations. Images of the filter fragment and the fibers crossing the mesh window are presented in FIG. 12.

Figure 39:
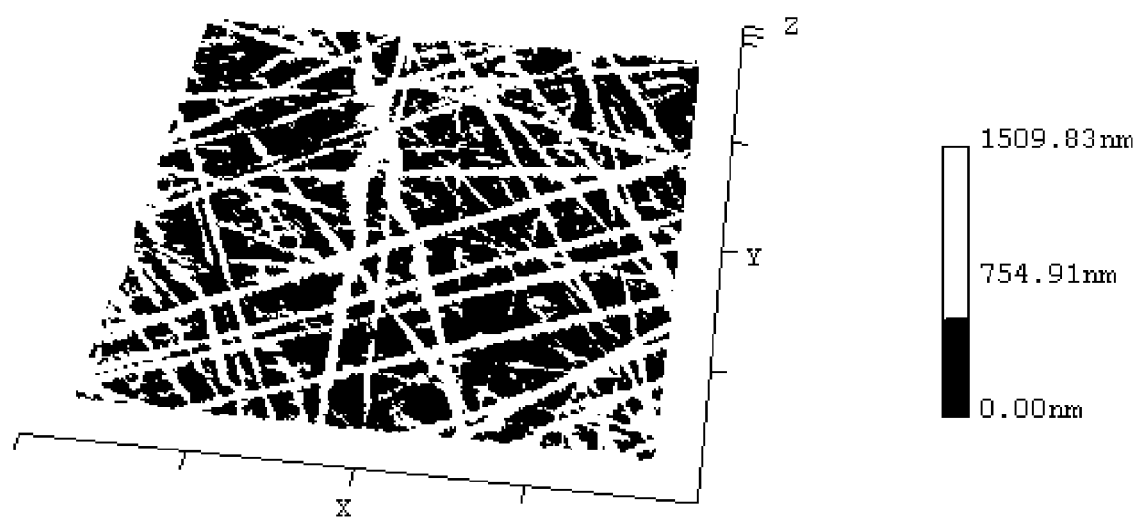
FIG. 39 shows an AFM image of a polyacrylate web deposited onto a polyester mesh.

The same procedure was successfully applied to manufacturing polyacrylic nano-filter on a polyester mesh. Polyacrylic plastic was dissolved at about 0.14% or at about 0.5% solution (W/V) in acetone and electrospun as described herein for the filter prepared from glue. The structure of a network of nano-fibers, at ~250 nm in diameter, is presented in an AFM image in FIG. 39. Scanning may be performed by transferring the web onto the surface of a microscopic slide.

I. Example 9

Water-Soluble Nano-Filter from PVP

PVP may be selected as the nano-fiber material. PVP is commercially available in many average molecular masses, and it is soluble in pure alcohol. Alcohol solutions tend to result in more effective electrospinning than water solutions due to lower surface tension of alcohol and higher solvent evaporation rate.

Figure 40:
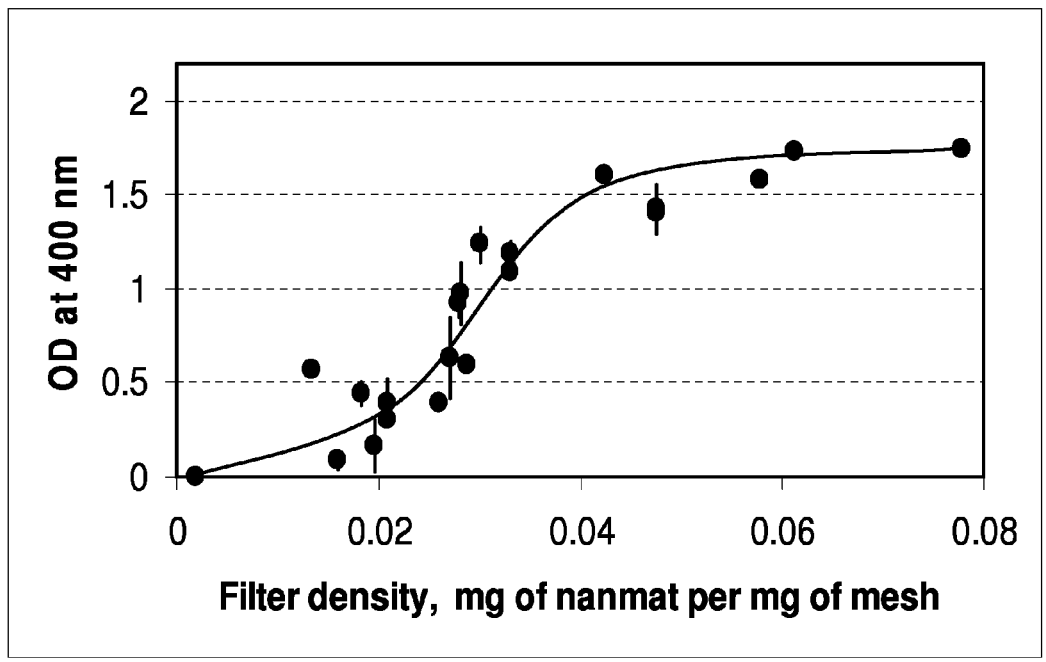
FIG. 40 shows optical density of water-soluble PVP nano-filters as a function of mass density of deposited nano-fibers.
Figure 41:
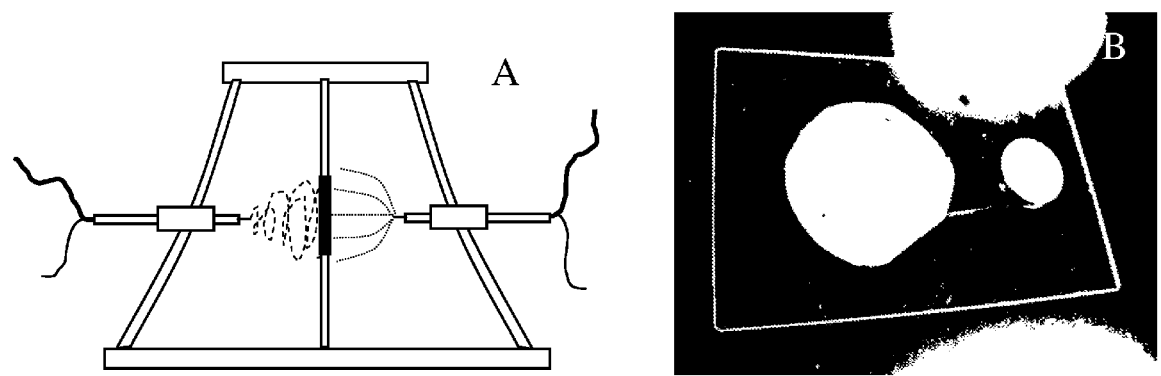
FIG. 41 illustrates an example of an apparatus for manufacturing free nano-mat in a hole in a plastic screen in the middle of the chamber (A) and image of nano-mat transferred onto a glass plate. In (B), a quarter is placed on the glass for scaling.

Using the ES-neutralization device described herein, in which neutralization of nano-fibers happens on a mesh, a number of nano-filters may be fabricated from 10% ethanol solution of PVP with an average mol. mass of 1,000 kDa. Observations under optical microscope showed that filter consists of uniform fibers, having a diameter of about 1 to about 1.5 μm. Surface density of fibers was estimated by direct weighting of meshes before and after filter deposition. FIG. 40 illustrates how optical density of such filters depends on the surface density of fibers. The mass of 1 cm² of mesh is 2.6 mg. Polyester mesh was obtained from Small Parts, Inc, FL (cat #CMY-0105-D). This curve was used to characterize uniformity and mass density of filters.

Resistance to air flow and capturing ability of these filters may be determined. TABLE 5 summarizes data observed. Even at low fiber density, 340 mg/m² for the filter in the first raw, the filter is capable of capturing ~70-~90% of all aerosol particles with size exceeding 300 nm. With the Darcy' coefficient of ~3.1×10$^8$ m$^{-1}$, one can pump about 11 liters of air per minute using ~1 cm² of such filter by applying a pressure of about 0.1 atm. This pumping can be easily achieved in a membrane pump.

TABLE 5

Properties of Water Soluble Nano-filters Manufactured from 10% Solution of PVP with an Avg. Mol. Mass of 1,000 kDa in Absolute Ethanol.

| Time of electrospinning[a], min | OD at 400 nm | Density[b], mg nanofiber/mg mesh | Darcy's coefficient ×10$^{-8}$ m$^{-1}$ | Captured aerosol particles, % | | |
|---|---|---|---|---|---|---|
| | | | | 0.3-0.5 μm | 1-2 μm | 2-5 μm |
| 1 | 0.57 ± 0.03 | 0.013 | 3.1 | 70 | 90 | 96 |
| 2 | 1.42 ± 0.13 | 0.048 | 31.8 | 92 | 99.3 | 100 |
| 4 | 1.59 ± 0.04 | 0.058 | 28.6 | 99 | 100 | 100 |

Notes
[a]Electrospinning of PVP solution was performed under the following conditions: voltage of ~10-~12 kV, current of ~30-~50 nA, humidity inside the chamber of ~60-~65%, distance from the spinneret and neutralizing capillary to the target mesh was 12 cm.
[b]Polyester mesh (Small Parts, Inc., FL. Cat #CMY-0105-D) density is 2.6 mg/cm².

It should be noted that PVP filters may not satisfy all the conditions listed above. For example, it may be the case where they cannot be used in an environment with a humidity exceeding about 70%. Although they may be stored overnight at room temperature at humidity less than about 75%, a further increase in humidity to about 80% may result in notable changes of fiber the morphology. At about 85% humidity, nano-filters may collapse on the supporting mesh.

Another limitation with PVP filters may involve $NH_4Cl$ aerosol. Filters may rapidly deteriorate and become more transparent for salt particles. At about 65% air humidity, salt particles may accumulate water from the air, which can dissolve nano-fibers. Salt may also directly affect stability of PVP nano-fibers.

In essence, PVP filters may have limited applicability for aerosol collection. As a response, more humidity-resistant polymer materials may be required to manufacture filters capable of working in a broad range of humidities.

J. Example 10

Manufacturing Smooth Filter by Gluing Nano-Mat to a Supportive Mesh

Formation of a free nano-mat as illustrated in FIGS. 16-17 may be employed in manufacturing mesh-supported filters. A simple set may be used as schematically illustrated in FIG. 41A. The chamber may be divided into two equal parts, connected with a hole in the wall, dividing the parts. The hole, ~6 cm in diameter was covered with a nano-mat, when PVP solution was sprayed from the left capillary and absolute ethanol from the right capillary. It was shown that the nano-mat can be easily transferred onto a support. In one experiment the nano-mat was transferred onto a glass surface. The resulting glass-supported mesh is illustrated in FIG. 41B. In another experiment the nano-mat was transferred onto a mesh, forming mesh-supported filter. This technique may solve the problem of preferential landing, since solid mesh elements tend not to be present during the nano-mat formation. As seen in FIG. 41B, a uniform nano-mat can be formed using this technology.

K. Example 10

Water-soluble Nano-Filters from Polyacrylamide with Disulfide Cross-links

Referring to FIG. 42, polymer chains containing free SH-groups can be spun into nano-fibers. When exposed to air in the presence of catalysts, thiol groups can be oxidized to form disulphide bonds, which may stabilize fibers against dissolution in water and against humid atmosphere. Thiol-disulphide exchange can also be used to form SS-bonds in the fibers.

After capturing aerosol particles, the fibers can be dissolved in a solution capable of breaking inter-chain links. For example, beta-mercaptoethanol, dithiotreitole or other substances known for their ability may be used to reduce disulphide bonds and turn cross-linked fibers into a polymer solution. Most proteins, including antibodies, are capable of tolerating the presence of such reducing agents in solution. Thus, immunoassay should not be compromised. The captured particles may be released into the solution.

It should be noted that other processes may be used to stabilize fibers in a humid atmosphere while keeping the fibers soluble in water under conditions where protein and DNA molecules do not lose their functional properties. Thus, sodium, ammonium, potassium and other salts of alginic acid tend to be readily water soluble. However, the acid itself and its calcium and other di- and polyvalent salts are generally not soluble. This solubility change may be used to form insoluble fibers from alginic acid. This process may be performed by electrospinning, for example, ammonium salt followed by an exchange of ammonium for protons in a vapor of HCl or any other volatile acid. After collection, the aerosol can be liberated by dissolution of the fibers in slightly basic solutions of NaCl.

NIPAM may serve as another class of polymers that can reversibly changing their solubility. In particular, NIPAM is generally soluble at low temperature but becomes insoluble at slightly elevated temperatures (e.g., ~37° C.). This ability to change helps allow fiber formation at low temperature, capturing of aerosol at higher temperatures and dissolving of the filter at low temperatures.

Any other mild chemistry not affecting protein and DNA molecules can also be used to reversibly bind polymer chains. For instance, C—C bonds with OH-groups on carbon atoms could be specifically broken by periodate ions. It is, thus, possible to cross-link polymer chains in fibers by links having such functionality and subsequently dissolving fibers in periodate solutions.

L. Example 11

Method and Apparatus for Neutralization of Charged Electrospray Products on a Solid Dielectric Surface The examples presented above describe two basic neutralization techniques. The first technique involves a cloud of electrospray-generated products that are neutralized in a gas phase with a cloud of counter-ions, clusters or nano-droplets. The second technique involves electrospray-generated products (e.g., fibers or nano-fibers) that were neutralized after attachment to a frame or mesh with a cloud of counter-ions. Both these substrates may enable access to counter-ions through the supportive substrate.

The example here describes a technique in which deposition of charged products and their neutralization are separated in space and/or in time by alternative access to the substrate surface for the electrospray products and counter-ions.

Figure 44:
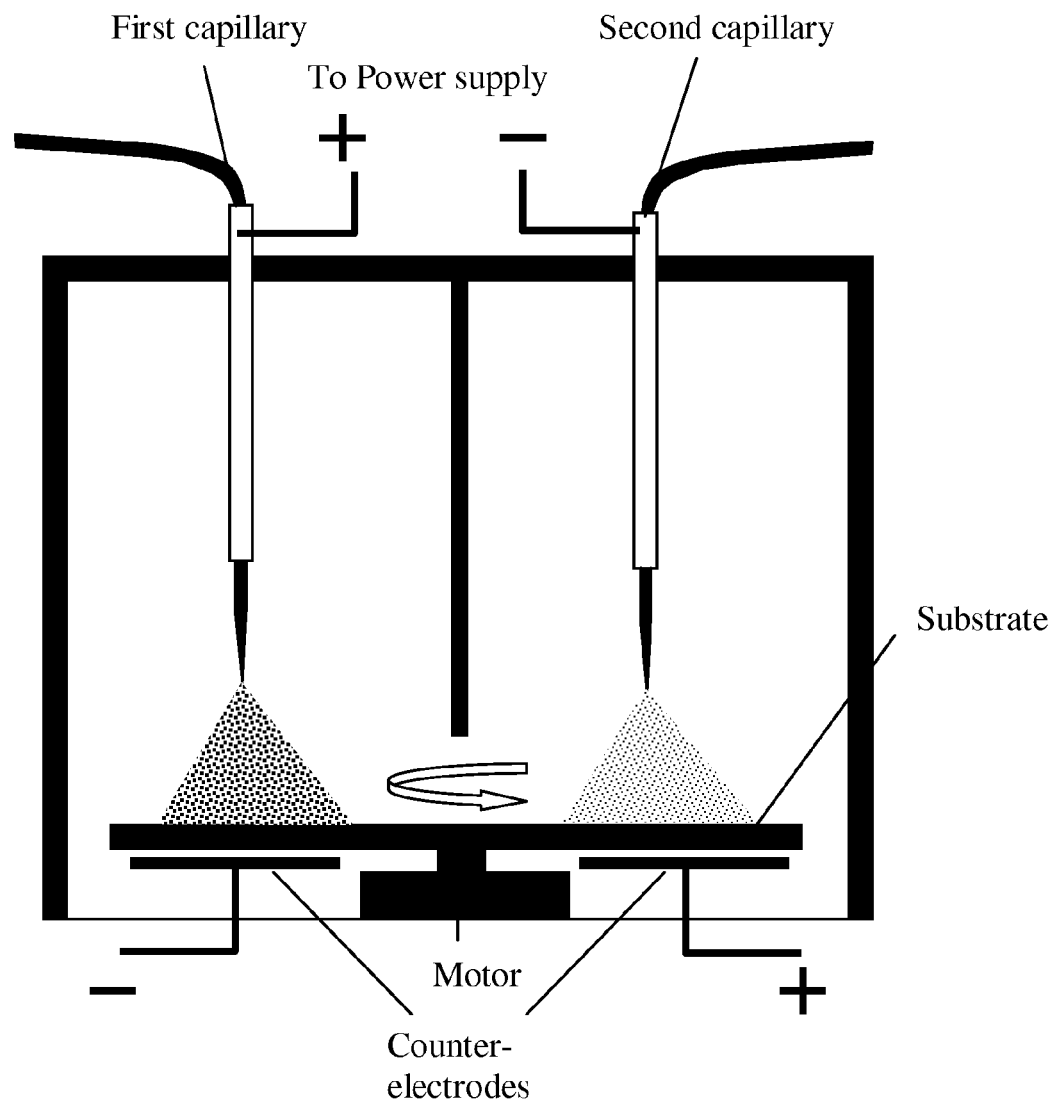
FIG. 44 illustrates an example of an apparatus for forming nano-structured materials by neutralization of electrospray-formed nano-structures on a rotating solid dielectric substrate.

In one embodiment, as presented in FIG. 44, the substrate is a disk of dielectric material (e.g., polycarbonate, Teflon, PMMA, etc.) connected to a motor. Charged products (e.g., liquid substrate) ejected from the first capillary may be deposited on one side of the disk. The surface of this side of the disk may be charged. Disk rotation should be performed. Without disk rotation, the deposited charges may soon create an electric field, which may stop further deposition. To allow continuous deposition (whether for a desired amount and/or time of deposition), the disk may be rotated, bringing the charged side to the part of the chamber where counter-ions, that may be formed in the second capillary, first neutralize the electrospray products. Afterwards, the substrate may be recharged to an electrical potential that is opposite of the electrical potential that is applied to the liquid substrate in the first capillary.

The prototype of the apparatus was successfully tested by deposition of a nano-mat from acetate cellulose onto a polycarbonate substrate.

Figure 45:
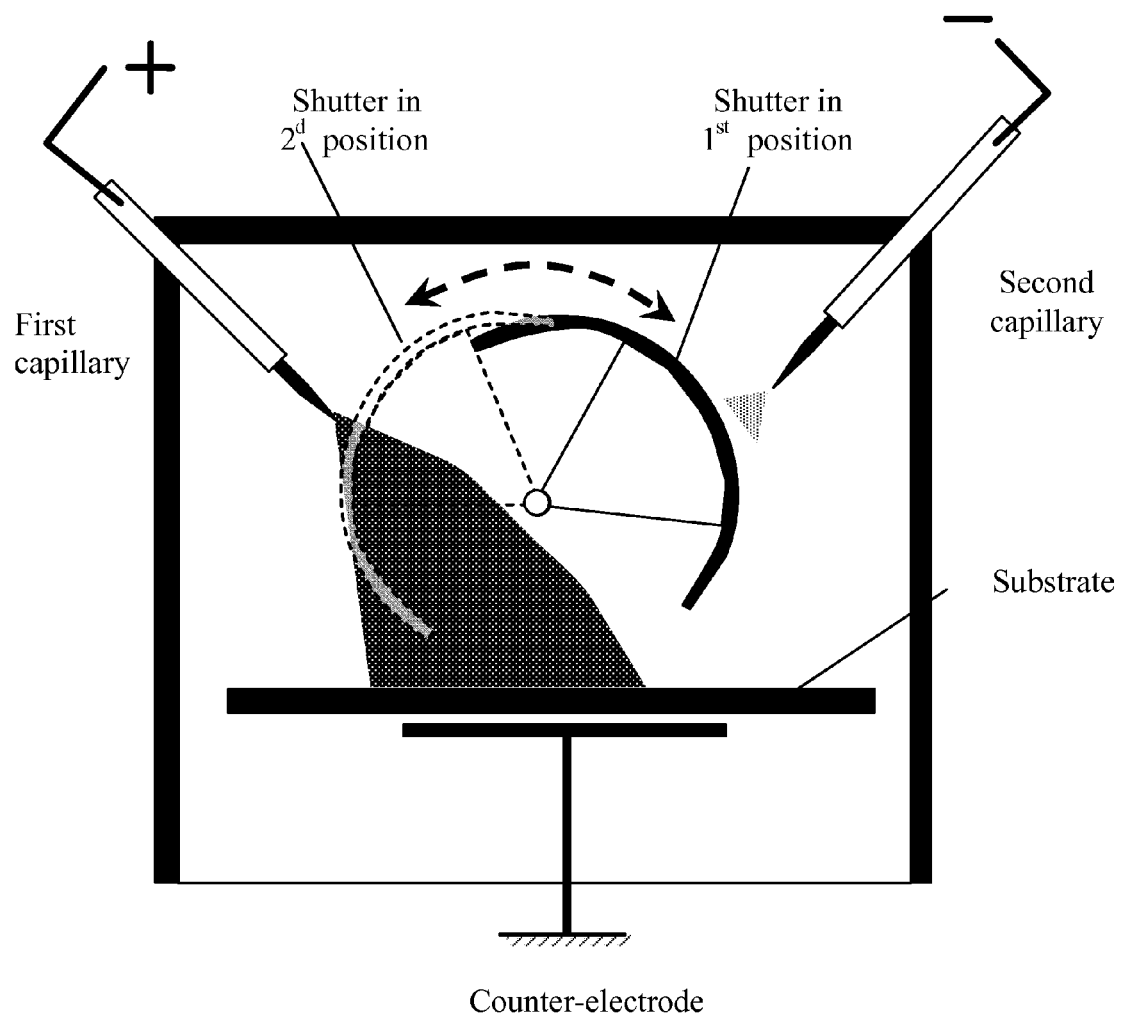
FIG. 45 shows an exemplified electrospray-neutralization apparatus employing a shatter to enable periodic exposure of the substrate to electrospray products, as well as to enable neutralization with counter-ions.

Various other prototypes may be used to practice the same principle. For example, the disk substrate may be replaced with a cylinder, ball or other any form that can be rotated. Also, the substrate itself may be made immobile. As indicated in FIG. 45, a shutter may be introduced in the chamber to allow for deposition of materials from the first capillary and from the second capillary in a sequential order. In the first position, shuttered electrospray products from the first capillary may be deposited on the solid dielectric substrate. In the second position, oppositely charged electrospray products from the second capillary may neutralize the shuttered electrospray products from the first capillary.

In addition to the desired amount and/or time of deposition, periodical recharging techniques may allow nano-mats to be layered. This layering may be accomplished by intercalating layers of nano-structures fabricated from the first liquid substance in the first capillary with layers of nano-structures fabricated from the second liquid substance in the second capillary.

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments. For example, the claimed invention may be used as masks for emergency responders (e.g., such as firefighters, emergency medical technicians, doctors, etc.), military personnel, civilians, etc. The claimed invention can also be used as masks to prevent breathing pathogens that may result in respiratory infections, such as severe acute respiratory syndrome ("SARS"), influenza or influenza-like illness, etc.

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

REFERENCES

1) Bukatina, A. E., Morozov, V. N., Gusev, N. B., Sieck, G. C. (2002) Mechano-chemical effects of $Ca^{2+}$ in cross-linked troponin-C films, *FEBS Letters,* 524, 107-110.
2) Camelot, D., Marijnissen, J. C. M., Scarlett, B. (1999) Bipolar coagulation process for the production of powders. *Ind. Eng. Chem. Res.,* 38, 631-638.
3) De La Mora, J. F. Navascues, J., Fernandez, F. and Rosell-Llompart, J. (1990) Generation of submicron monodisperse aerosols in electrosprays *J. Aerosol. Sci.* 21, 673-676.
4) Edwards, D. A., Man, J. C., Brand, P., Katstra, J. P., Sommerer, K., Stone, H. A., Nardell, E., and Scheuch, G. (2004) Inhaling to mitigate exhaled bioaerosols. *PNAS,* 101, 17383-17388.
5) Gibson, P., Schreuder-Gibson, H., Patterned electrospray fiber structures. INJ Summer, 34-41.
6) Hamouda, T., Baker, J. R. Jr. (2000) Antimicrobial mechanism of action of surfactant lipid preparations in enteric Gram-negative *bacilli. J. Appl. Microbiol.* 89, 397-403.
7) Hamouda, T., Hayes, M. M., Cao, Z., Tonda, R., Johnson, K., Wright, C., Brisker, J., Baker, J. R., Jr. (1999) A Novel Surfactant Nanoemulsion with Broad-Spectrum Sporicidal Activity against *Bacillus* Species. *J. Infect. Diseases* 180, 1939-49.
8) Hinds W. C. *Aerosol Technology. Properties, Behavior, and Measurement of Airborne Particles.* John Wiley & Sons. New York, Chichester, Brisbane, Toronto, Singapore, 1982.
9) Hirabayashi, A., De la Mora, J. F. (1998) Charged droplet formation in sonic spray. *Int. J. Mass Spectrom Ion Processes* 175, 277-282.
10) Ijesebaert, J. C., Geerse, K. B., Marijnisseen, J. C. M., Lammers, J. W. J, Zanen, P. (2001) Electro-hydrodynamic atomization of drug solutions for inhalation purposes. *J. Appl. Physiol.* 91, 2735-2741.
11) Kebarle, P. Ho, Y. (1997) In: R. B. Cole (Ed.), *Electrospray Ionization Mass Spectrometry*, Wiley, New York, Chap. 1.
12) Kwon, K., Kidoaki, S. Matsuda, T. (2005) Electrospun nano- to microfiber fabrics made of biodegradable copolyesters: structural characteristics, mechanical properties and cell adhesion potential. *Biomaterials* 26, 3929-3939.
13) Li, D., Xia, Y. (2004) Electrospinning of nanofibers: reinventing the wheel. *Advanced Materials,* 16, 1151-1170.
14) Michelson, D. (1990) *Electrostatic Atomization.* IOP Publishing, New York.
15) Morozov V. N., Morozova T. Ya. (1999) Electrospray deposition as a method for mass fabrication of mono- and multi-component microarrays of biological and biologically active substances. *Anal. Chem.,* 71, 3110-3117.
16) Morozov V. N., Morozova T. Ya. (1999) Electrospray deposition as a method to fabricate functionally active protein films. *Anal. Chem.,* 71, 1415-1420.
17) Morozov V. N., Morozova T. Ya. (2002) Electrospraying solutions of substances for mass fabrication of chips and libraries. U.S. Pat. No. 6,350,609 B1.
18) Morozov V. N., Morozova T. Ya., Kallenbach, N. R. (1998) Atomic force microscopy of structures produced by electrospray of synthetic and natural linear polymers. *Internat. J. Mass Spectrom. Ion Processes,* 178, 143-159.
19) Morozov V. N., Seeman N. C., Kallenbach N. R. (1993) New methods of depositing and imaging molecules in scanning tunneling microscopy. *Scann. Microscopy,* 7, 757-779.
20) O'Callaghan, C. Barry, P. W. (1997) The science of nebulized drug delivery, *Thorax* 52 (Suppl 2): 31-44.
21) Poilane, C., Delobelle, P., Lexcellent, C., Hayashi, S., Tobushi, H. (2000) Analysis of the mechanical behavior of shape memory polymer membranes by nanoindetion, bulging and point membrane deflection tests. *Thin Solid Films* 379, 156-165.
22) Radtchenko, I. L., Sukhorukov, G. B., Mohwald, H. (2002) Incorporation of macromolecules into polyelectrolyte micro- and nanocapsules via surface controlled precipitation on colloidal particles. *Colloids and Interfaces,* 202, 127-133.
23) Rayleigh, L. (1882) *Phil. Mag.,* 14, 184.
24) Salata, O. V. (2005) Tools of Nanotechnology: Electrospray. *Current Nanoscience* 1, 25-33.
25) Schreuder-Gibson, H. L., Gibson, P., Senecal, K, Sennett, M., Walker, J., Yeomans, W, and Ziegler, D. (2002) Protective Textile Materials Based on Electrospun Nanofibers," *J. Advanced Mat.,* 34, 44.
26) Swihart, M. T. (2003) Vapor-phase synthesis of nanoparticles. *Current Opinion in Colloid and Interface Sci.* 8 127-133.
27) van der Eijjk et al., (1973) *Nucl. Instr. Meth.* 112, 343-351.
28) Zeleny, J. (1914) *Physical Rev.* 3, 69.

What is claimed is:

1. A method for producing "nano-aerosol and nano-structured materials" comprising:

a. electrospraying at least one first liquid substance by applying an electrical potential to said first liquid substance, creating a charged electrosprayed product, said first liquid substance comprising at least one non-volatile substance; and b. electrospraying at least one second liquid substance by applying an opposite electrical potential to said second liquid substance, creating an oppositely charged electrosprayed product, c. said charged electrosprayed product and oppositely charged electrosprayed product contacting each other to maximize a product with a neutral charge in a gas phase.

2. The method according to claim 1, wherein said "nano-aerosol and nano-structured materials" are produced in a chamber having at least one entrance port and at least one exit port.

3. The method according to claim 2, wherein a substrate is introduced into said chamber to collect said product.

4. The method according to claim 3, wherein said substrate is a dielectric substrate.

5. The method according to claim 2, further comprising introducing air into said chamber via said entrance port to assist in said contact and to outflow said product via said exit port.

6. The method according to claim 1, comprising controlling said electrical potential and said opposite electric potential with at least one electrode controller.

7. The method according to claim 5, comprising collecting the product at the exit port.

8. The method according to claim 7, wherein a perforated structure is disposed at said exit port and gas is pumped through said perforated structure to collect said product.

9. The method according to claim 1, wherein said at least one second liquid substance comprises a non-volatile substance.

10. The method according to claim 1, wherein electrospraying at least one of said at least one first liquid substance and said at least one second liquid substance comprises electrospinning.

11. The method according to claim 10, comprising forming at least one of:

a. at least one fiber; and b. at least one nano-mat.

12. The method according to claim 1, comprising:

a. at least two chambers, each supplied by a sprayer and at least one of a counter electrode and an O-ring; and b. a third chamber configured to receive said charged electrosprayed product and oppositely charged electrosprayed product.

13. A method for producing "nano-aerosol and nano-structured materials" comprising:

a. electrospraying a charged electrosprayed product comprising at least one liquid substance and an oppositely charged electrosprayed product comprising at least one different liquid substance towards each other at substantially the same time; and b. allowing the oppositely charged electrosprayed product to interact with the charged electrosprayed product to maximize a product with a neutral charge.

14. The method according to claim 13, wherein said interaction occurs in a gas phase.

15. The method according to claim 13, wherein said "nano-aerosol and nano-structured materials" are produced in a chamber.

16. The method according to claim 13, comprising using a substrate configured to collect said charged electrosprayed product and said oppositely charged electrosprayed product.

17. The method according to claim 16, wherein said charged electrosprayed product is first collected at a dielectric substrate and then neutralized by said oppositely charged electrosprayed product.

18. The method according to claim 16, wherein said substrate comprises a perforated structure.

19. The method according to claim 18, wherein gas is pumped through said perforated structure to collect said product.

20. The method according to claim 16, wherein neutralization of the charge potential of both said charged electrosprayed product and said oppositely charged electrosprayed product, and collection of both said charged electrosprayed product and said oppositely charged electrosprayed product onto said substrate occur simultaneously.

* * * * *